(12) United States Patent (10) Patent No.: US 7,958,234 B2
Thomas et al. (45) Date of Patent: Jun. 7, 2011

(54) SYSTEM AND METHOD FOR MONITORING USER INTERACTION WITH WEB PAGES

(75) Inventors: Oran M Thomas, Carlsbad, CA (US); Robert F Gorman, Carlsbad, CA (US); Steven K Beal, Cardiff, CA (US); Steve Wilson, Carlsbad, CA (US)

(73) Assignee: Yahoo! Inc., Sunnyvale, CA (US)

( * ) Notice: Subject to any disclaimer, the term of this patent is extended or adjusted under 35 U.S.C. 154(b) by 107 days.

(21) Appl. No.: 12/397,780

(22) Filed: Mar. 4, 2009

(65) Prior Publication Data

US 2009/0271514 A1 Oct. 29, 2009

Related U.S. Application Data

(62) Division of application No. 09/587,236, filed on Jun. 2, 2000, now Pat. No. 7,523,191.

(60) Provisional application No. 60/139,915, filed on Jun. 17, 1999, provisional application No. 60/137,788, filed on Jun. 3, 1999.

(51) Int. Cl.
*G06F 15/16* (2006.01)

(52) U.S. Cl. ........ 709/224; 709/202; 709/203; 709/217; 709/218; 709/219; 709/223

(58) Field of Classification Search .................. 709/224, 709/217–219, 223, 202, 203
See application file for complete search history.

(56) References Cited

U.S. PATENT DOCUMENTS

| | | | |
|---|---|---|---|
| 5,649,187 A * | 7/1997 | Hornbuckle ........................... 1/1 |
| 5,796,633 A * | 8/1998 | Burgess et al. ................ 702/187 |
| 5,796,952 A | 8/1998 | Davis et al. |
| 5,878,384 A | 3/1999 | Johnson et al. |
| 5,893,091 A | 4/1999 | Hunt et al. |
| 5,896,497 A | 4/1999 | Halstead |
| 5,964,839 A * | 10/1999 | Johnson et al. ................ 709/224 |
| 6,006,260 A | 12/1999 | Barrick et al. |
| 6,055,542 A | 4/2000 | Nielsen et al. |
| 6,055,573 A | 4/2000 | Gardenswartz et al. |
| 6,073,241 A | 6/2000 | Rosenberg et al. |
| 6,078,956 A | 6/2000 | Bryant et al. |
| 6,105,069 A * | 8/2000 | Franklin et al. ................ 709/229 |
| 6,108,637 A | 8/2000 | Blumenau |
| 6,112,240 A | 8/2000 | Pogue et al. |
| 6,115,742 A | 9/2000 | Franklin et al. |
| 6,119,164 A | 9/2000 | Basche |
| 6,122,663 A * | 9/2000 | Lin et al. ....................... 709/224 |

(Continued)

OTHER PUBLICATIONS

Kamba et al., "Anatagonomy: a personalized newspaper on the World Wide Web," *International Journal of Human-Computer Studies*, 46:789-803, (1997).

(Continued)

*Primary Examiner* — Alina N. Boutah
(74) *Attorney, Agent, or Firm* — Brinks Hofer Gilson & Lione

(57) ABSTRACT

Systems and methods for monitoring usage of an electronic device are disclosed herein. A client component installed in a client device is operative to monitor usage of the client device in accordance with a monitoring profile, and to generate corresponding usage data. The monitoring profile typically includes information specifying which features of which application programs are to be disabled on the client device. A server component, installed on a server device in communication with the client device, provides the monitoring profile to the client device and receives the usage data from the client device.

16 Claims, 52 Drawing Sheets

U.S. PATENT DOCUMENTS

| | | | |
|---|---|---|---|
| 6,134,592 A | 10/2000 | Montulli | |
| 6,173,446 B1 * | 1/2001 | Khan et al. | 717/127 |
| 6,317,792 B1 | 11/2001 | Mundy et al. | |
| 6,321,256 B1 * | 11/2001 | Himmel et al. | 709/218 |
| 6,324,578 B1 * | 11/2001 | Cox et al. | 709/223 |
| 6,327,619 B1 | 12/2001 | Blumenau | |
| 6,330,592 B1 | 12/2001 | Makuch et al. | |
| 6,351,847 B1 * | 2/2002 | Sakamoto et al. | 717/127 |
| 6,359,557 B2 | 3/2002 | Bilder | |
| 6,366,298 B1 | 4/2002 | Haitsuka et al. | |
| 6,381,628 B1 * | 4/2002 | Hunt | 709/201 |
| 6,393,479 B1 | 5/2002 | Glommen et al. | |
| 6,446,119 B1 * | 9/2002 | Olah et al. | 709/224 |
| 6,449,604 B1 | 9/2002 | Hansen et al. | |
| 6,470,386 B1 * | 10/2002 | Combar et al. | 709/224 |
| 6,473,794 B1 * | 10/2002 | Guheen et al. | 709/223 |
| 6,584,568 B1 * | 6/2003 | Dircks et al. | 726/2 |
| 6,604,131 B1 * | 8/2003 | Warris et al. | 709/205 |
| 6,606,657 B1 | 8/2003 | Zilberstein et al. | |
| 6,725,377 B1 * | 4/2004 | Kouznetsov | 726/23 |
| 6,741,967 B1 | 5/2004 | Wu et al. | |
| 6,892,226 B1 | 5/2005 | Tso et al. | |
| 6,898,762 B2 | 5/2005 | Ellis et al. | |
| 6,925,442 B1 | 8/2005 | Shapira et al. | |
| 7,076,504 B1 * | 7/2006 | Handel et al. | 705/14.39 |
| 7,155,451 B1 | 12/2006 | Torres | |
| 7,155,493 B1 | 12/2006 | Weber | |
| 7,607,147 B1 * | 10/2009 | Lu et al. | 725/14 |
| 2002/0021665 A1 | 2/2002 | Bhagavath et al. | |
| 2002/0099812 A1 * | 7/2002 | Davis et al. | 709/224 |
| 2002/0124074 A1 * | 9/2002 | Levy et al. | 709/224 |
| 2002/0126140 A1 | 9/2002 | Gorbet et al. | |

OTHER PUBLICATIONS

Kurzke, et al., "WebAssist: a user profile specification information Retrieval assistant," *Computer Networks and ISDN Systems*, 30:1-7, (Apr. 1998).

International Search Report issued in International Application No. PCT/US00/15299, Apr. 10, 2000, 3 pages.

* cited by examiner

Report templates, parameter descriptions, and definitions are specified in the Database and read using DBOB.

Schedule Database Tasks

Edit scheduled tasks performed periodically by the database

Task: Truncate Detailed Data from Report DB

Enabled: ☐

Truncate data older than 90 day(s)

Scheduling
- ○ On Demand
- ○ One Time On Date  4/07/99
- ⦿ Recurring

At Time 4:00 AM

Occurs on day 3 of every 2 month(s), every 6 hour(s) starting at 4:00 AM

Change...

Execute Now !

OK   Cancel   Apply

*FIG. 61*

Pattern 1: Event Handler as Attribute of HTML Tag

```
                        HTML Page
<HTML>
<HEAD>
...
</HEAD>
<BODY onLoad=onLoadHandler()>

...

<SCRIPT>
function onLoadHandler()   {...}
</SCRIPT>

...

</BODY>
```

FIG. 65A

Pattern 2: Event Handler as Attribute of HTML Tag

```
                        HTML Page
<HTML>
<HEAD>
...
</HEAD>
<BODY>

...

<SCRIPT>
function onLoadHandler()   {...}

...

window.onload=onLoadHandler() ;
</BODY>

SYSTEM AND METHOD FOR MONITORING USER INTERACTION WITH WEB PAGES

RELATED APPLICATIONS

The present patent document is a divisional of application Ser. No. 09/587,236 filed Jun. 2, 2000 and International Application No. PCT/US00/15299 filed on Jun. 2, 2000, which claims priority from provisional Application Ser. No. 60/139,915 filed on Jun. 17, 1999, which claims priority from provisional Application Ser. No. 60/137,788 filed on Jun. 3, 1999, which is incorporated herein in its entirety by this reference.

FIELD OF THE INVENTION

This invention relates to a system for monitoring usage of computers and other electronic devices, and, more particularly, to a system for collecting information concerning user interaction with application programs and the host environment in accordance with defined monitoring profiles.

BACKGROUND OF THE INVENTION

Many commercial and governmental organizations are becoming increasingly reliant upon software applications to perform enterprise management and other functions. Expenditures relating to hardware, software and related support (collectively, "information technology") now represent a significant portion of the capital improvements undertaken by many entities. Since it is not atypical for a large corporation to utilize software products from hundreds of different vendors, it is not uncommon for difficulties to arise because of overlapping program functionality. Usage of a multitude of software products also tends to complicate delineation of training and line management responsibilities.

An enterprise may be motivated to make investments in information technology for a variety of reasons. For example, information technology assets may be utilized to generate revenue for the enterprise by facilitating accomplishment of essential tasks. Investments in information technology may also be motivated by a desire to reduce costs by streamlining or simplifying certain activities. Information technology may also be acquired as a form of insurance against losses from system failures or breaches in security, irrespective of whether the acquired assets enhance revenue or reduce costs.

Although relatively clear motivations may exist for considering investments in information technology, the selection of particular assets for acquisition has become a complex process. A primary difficulty confronting managers responsible for acquiring information technology is determining an expected rate of return in connection with the proposed investment. This is a difficult task because current monitoring systems are not designed to selectively track measure and analyze user activity most pertinent to determination of such an expected rate of return. Responsible management must also decide which applications should be purchased, and when such purchases should be made. It must also be determined how users will be trained, and how subsequent performance will be measured. Current monitoring systems are also ill equipped to provide assistance in making these types of decisions.

Management of large enterprises are also becoming interested in determining the total cost associated with ownership of particular information technology assets. A rudimentary measure of the cost of such ownership is obtained simply by determining the expense required to furnish each user with required hardware and associated software. More sophisticated measures of such ownership costs will also take into account an expected rate of return on the investment in information technology by ascertaining the extent of any increase in user productivity. Existing computer use monitoring systems have unfortunately not been specifically designed to measure such user productivity, and thus have tended to be of minimal assistance in facilitating determination of an expected rate of return on investments in information technology. Decisions regarding investments in information technology are thus likely being made without the benefit of relevant information relating to user productivity and expected rates of return.

SUMMARY OF THE INVENTION

In one aspect the present invention comprises a system for monitoring usage of an electronic device. A client component installed in a client device is operative to monitor usage of the client device in accordance with a monitoring profile, and to generate corresponding usage data. The monitoring profile typically includes information specifying which application programs, and which features of such application programs, installed on the client device are to be monitored by the client component. A server component, installed on a server device in communication with the client device, provides the monitoring profile to the client device and receives the usage data from the client device. The system may also include a data management component disposed to store the monitoring profile and to store the usage data provided to the server device. A data analysis component determines usage statistics associated with application programs installed on the client device based upon the usage data. The usage statistics may include measurements of usage time, number of uses, and sequence of usage of specified ones of the application programs.

Another aspect the present invention relates to a method for monitoring user interaction with a web page downloaded to a client device from a remote location. Monitoring instrumentation is initially embedded within the web page in accordance with a monitoring profile. This embedding may be effected by, for example, incorporating scripting language into the web page. Events relating to such user interaction are monitored, and corresponding usage data is generated using the monitoring instrumentation. The usage data is then transmitted from the client device to a monitoring server.

BRIEF DESCRIPTION OF THE DRAWINGS

In the accompanying drawings:

FIG. 61 provides a screen shot of a data management dialog of the Admin Console user interface.

FIGS. 65A and 65B illustratively represent two different patterns of a event handlers set up by a producer module

DETAILED DESCRIPTION OF THE INVENTION

Overview

Figure 1:
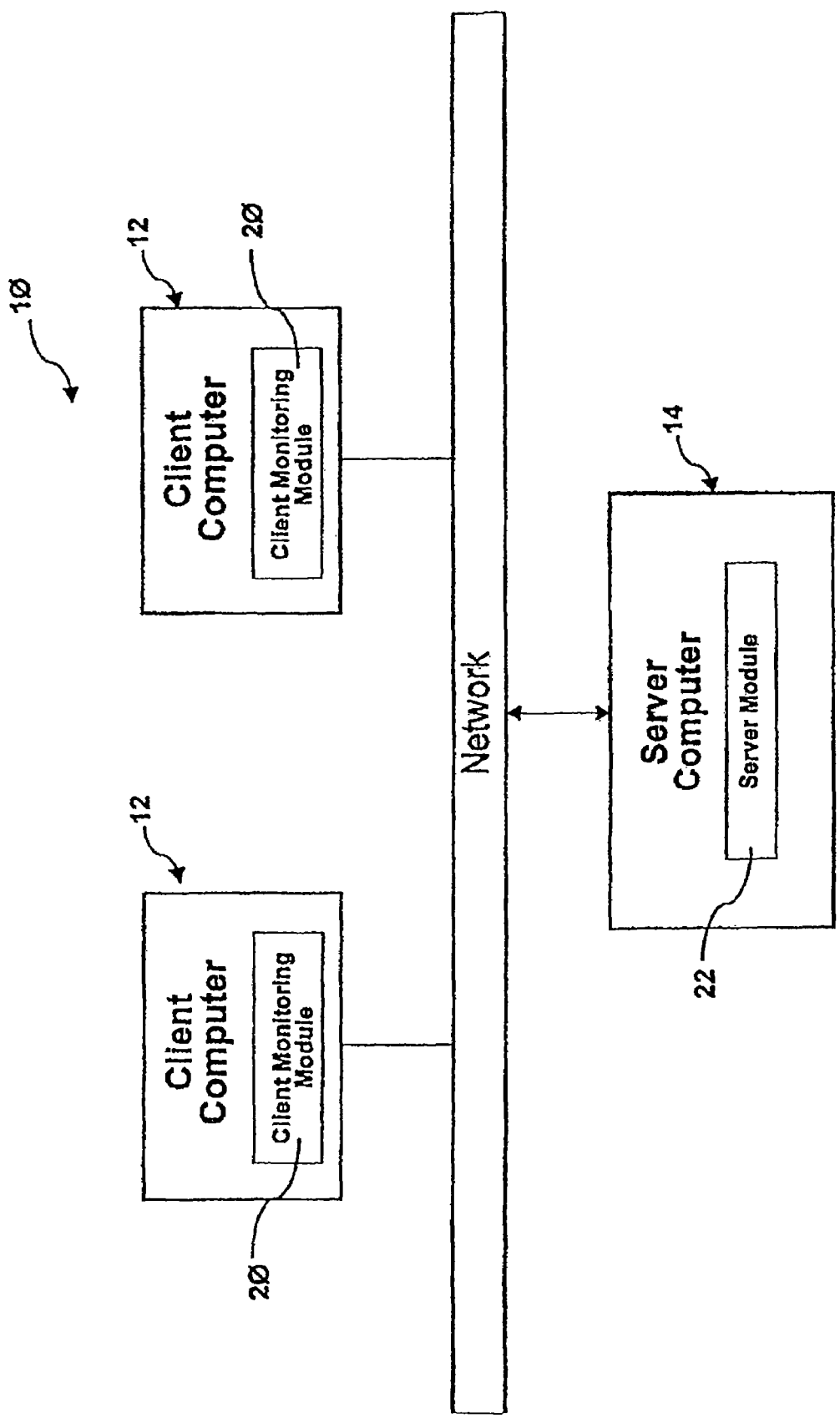
FIG. 1 illustratively represents a distributed computing system in which the computer usage monitoring system of the present invention may be embodied.

A preferred embodiment of the computer usage monitoring system of the present invention may be used in a distributed system 10 of the type shown in FIG. 1. The distributed system 10 includes a number of client computers 12 in communication with a server computer 14 through a network 18. Each of the client computers 12 may concurrently run a client monitoring module 20 for tracking usage of application programs installed on the client computers 12 in accordance with monitoring profiles (described below). The network may be any of a number of different types of networks, including local area networks ("LANs") or wide area networks. Usage data collected by each client monitoring module 20 is provided to a server module 22 running on the server computer 14. The server module 22 also provides monitoring profiles to the client monitoring modules 20.

Figure 2:
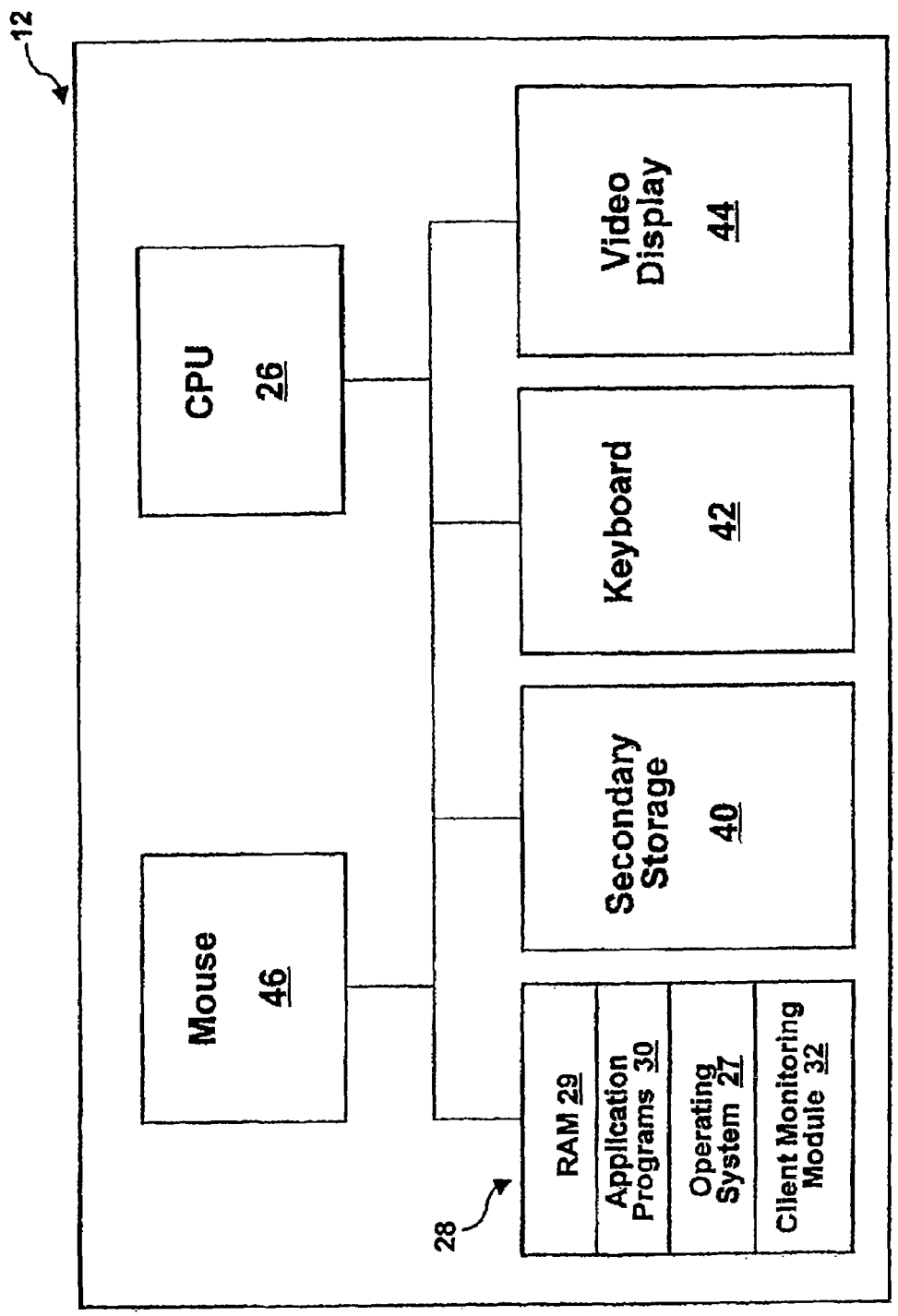
FIG. 2 is a block diagram of certain components contained in one of the client computers depicted in FIG. 1.

FIG. 2 is a more detailed block diagram of the components contained in one of the client computers 12. Each of the client computers 12 need not have this configuration, and this configuration is intended to be merely illustrative. The client computer 12 includes a central processing unit ("CPU") 26 and a memory subsystem 28. The memory subsystem 28 holds a copy of the operating system 27 for the client computer 12, such as the Microsoft Windows 95 Operating System sold by Microsoft Corporation. Also included within the memory subsystem 28 are RAM 29, application programs 30 and the client monitoring module 32, the latter two of which may be run on the CPU 26. The computer system 12 also includes a number of peripheral devices. These peripheral devices include a secondary storage device 40, such as a magnetic disk drive, a keyboard 42, a video display 44 and a mouse 46.

Figure 3A:
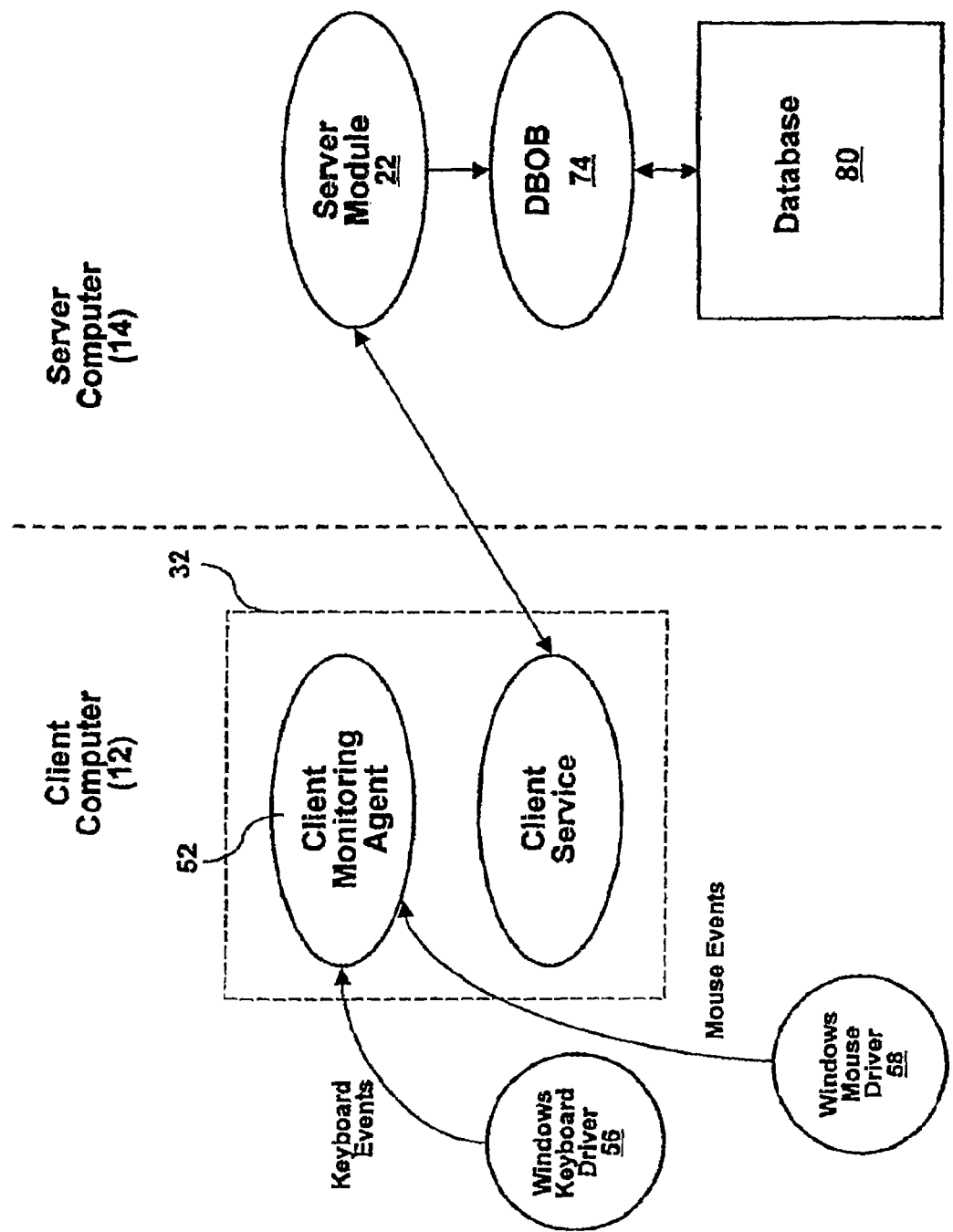
FIG. 3(a) provides a detailed representation of a client monitoring module operative to collect usage data on a client computer.
Figure 3B:
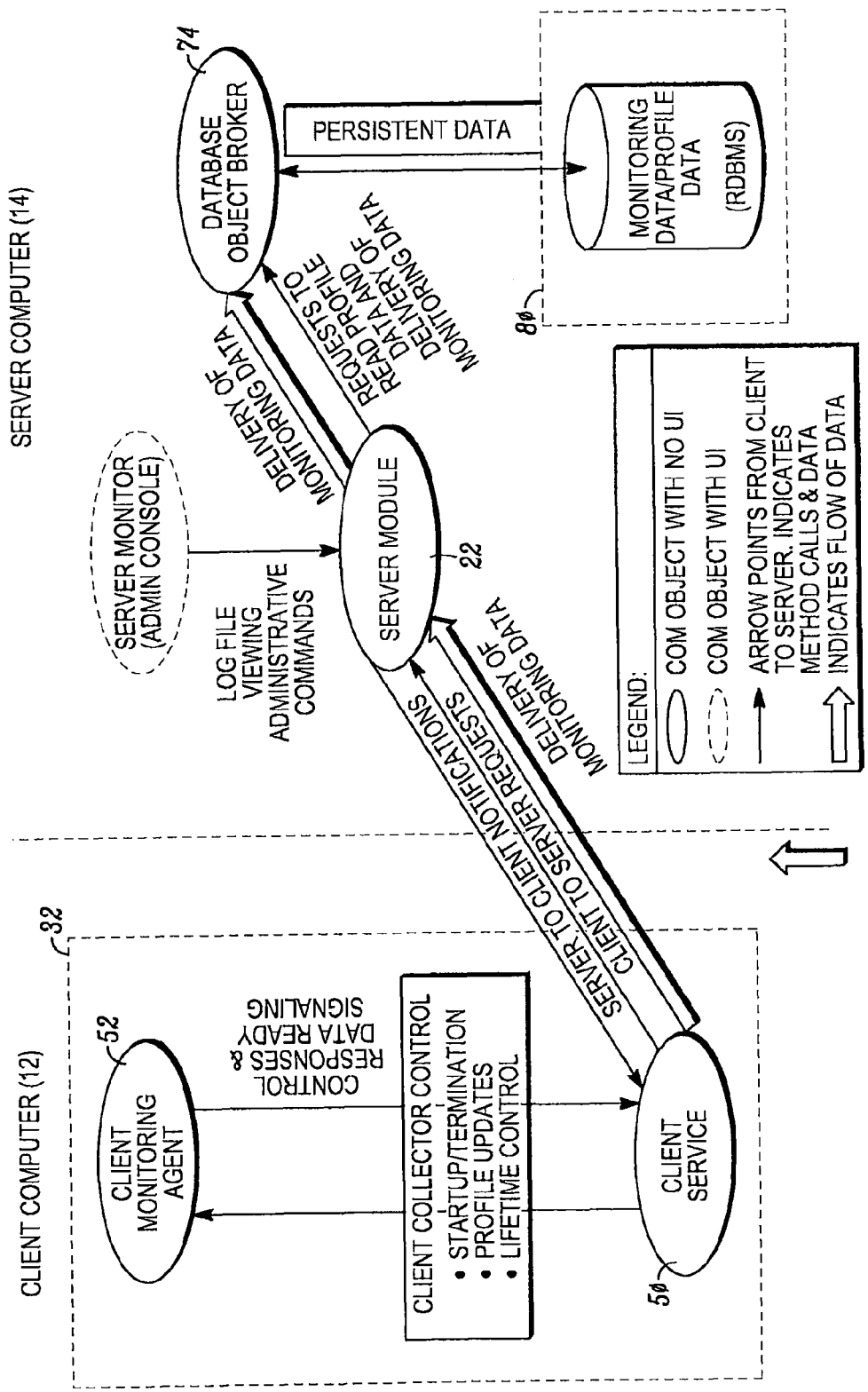
FIG. 3(b) provides an illustrative overview of certain client-based and sever-based components involved in monitoring user interaction with client computers in accordance with the invention.

FIGS. 3a and 3b provide more detailed representations of the client monitoring module 32 and associated server-based monitoring components. The client monitoring module 32 includes a client service 50 and a client monitoring agent 52, and is preferably implemented in the form of a Component Object Model ("COM") object operative within the Windows environment of the client computer 12. The Windows environment internally generates messages used by various modules to manage the operation of the computer and allocate its resources, and handles a vast array of overhead functions through the use of internal drivers. The internal drivers may include a Windows keyboard driver 56 and a Windows mouse driver 58. These drivers manage the overhead of manipulating mouse pointers, clicking the mouse buttons and entering information on the keyboard. User interface events such as mouse events and keyboard events are generated by the drivers 56 and 58. As is described below, each client monitoring module 32 monitors usage of application programs installed on its host client computer 12 in accordance with a monitoring profile. Each monitoring profile determines which application programs installed on a particular client computer 12 are to be monitored, and also specifies the usage data to be collected.

In order to minimize complexity and facilitate orderly relations among the various monitoring components, each component is designed to have only limited awareness of the system environment. This limited awareness simplifies communication between system components, and eases system administration. In particular, each client monitoring agent 52 is preferably made to be aware of only its client service 50. Similarly, each client service 50 is aware of only its assigned server computer and of its client monitoring agents 52. As is indicated by FIGS. 3a and 3b, the client service 50 is disposed to communicate with the server module 22 20 on the server computer 14. This communication is preferably carried out in accordance with the distributed COM protocol. The server module 22 20 accesses monitoring data and other information within the database 80 by way of a database object broker ("DBOB") 74 (described below).

Monitoring and Application Profiles

Figure 4:
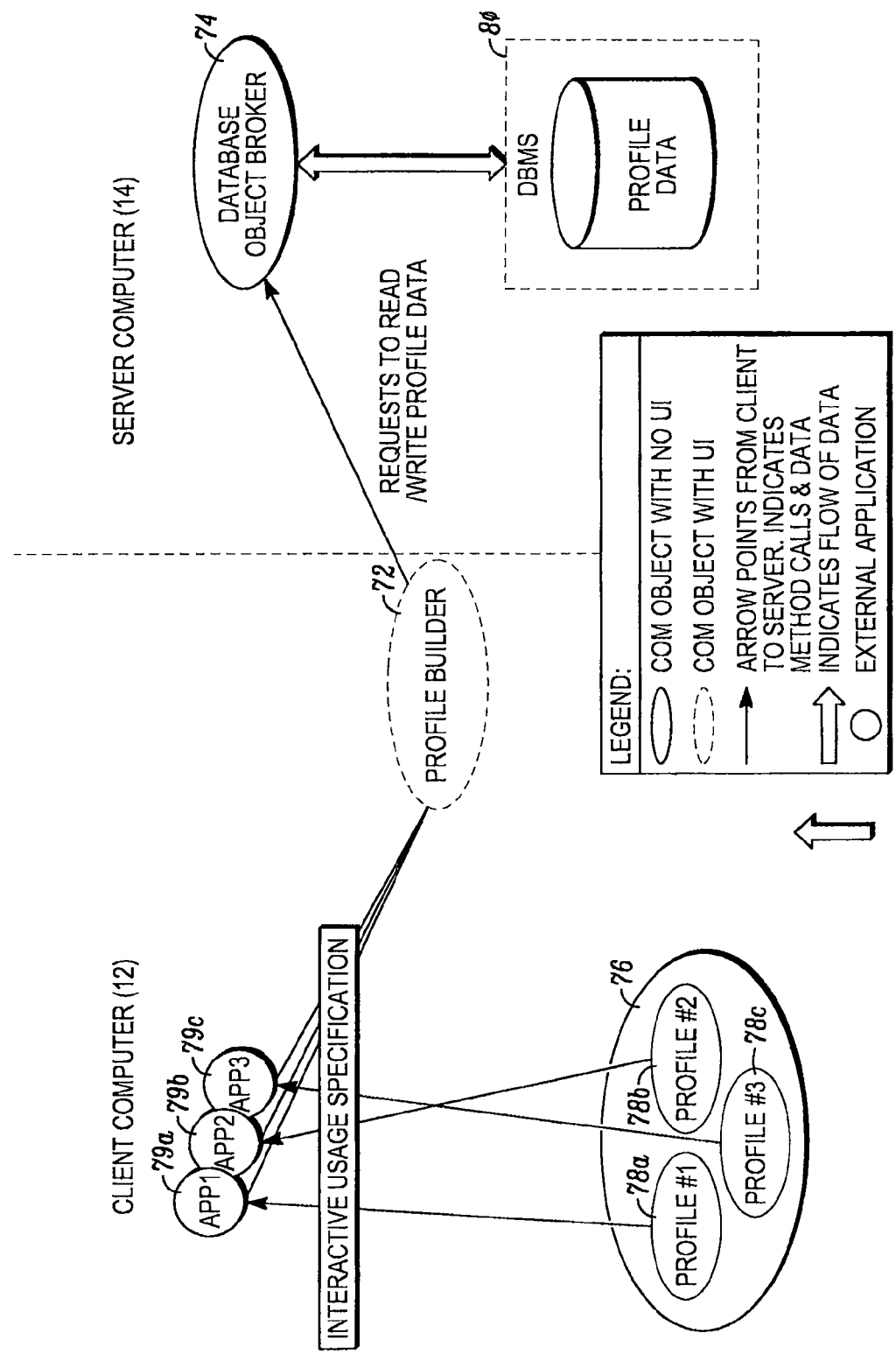
FIG. 4 is an illustrative representation of an architecture for a profile and user management subsystem of the present invention.

Referring now to FIG. 4, an illustrative representation is provided of an architecture for a profile and user management subsystem 70 of the present invention. The subsystem 70 provides a mechanism through which monitoring profiles can be created, stored, and provided to client monitoring modules 32. The subsystem 70 includes a profile builder 72, and the DBOB 74 executing on the server computer 14. In a preferred configuration the profile builder 72 and DBOB 74 are implemented as separate COM objects, and communicate in accordance with the distributed COM protocol.

The profile builder 72 is an application program designed to provide a mechanism for creating a monitoring profile 76 composed of one more application profiles 78. Each application profile 78 determines the type of usage of an associated application program 79 which is to be monitored. For example, an application profile 78 may specify that use of certain editing functions (e.g., "Cut" and "Paste" operations) are to be recorded, and that periods of inactivity of greater than a predetermined duration are also be noted. The monitoring profile 76 also specifies the frequency with which usage data collected in accordance with the application profiles 78 is to be reported to the server module 22 on the server computer 14. Such usage data may include, for example, information relating to the use of mouse actions verses accelerator keys, the frequency with which key application features are used, and the sequences of actions taken within an application or between applications. Each monitoring profile 76 may be assigned to a particular user or group of users.

In a preferred implementation a set of default application profiles associated with well known application programs are stored within a database 80 for the server computer 14. Default monitoring profiles which use default application profiles may also be stored within the database 80. The default application profile provides a template from which monitoring profiles 76 and application profiles 78 tailored to particular users may be developed using the profile builder 72.

One principal feature of the profile builder 72 is the ability to create application profiles applicable to essentially any Windows-based application. As is described below, the profile builder 72 allows for creation of an application profile 78 through selection of various items from the user interface presented by the associated application program. Items such as buttons, text fields, menus, and the like from the applicable user interface may be selected. Application profiles 78 that have been created in this manner via the profile builder 72 can be saved within the database 80 via DBOB 74 and used in combination with other monitoring profiles 78 in order to construct various monitoring profiles 76. The DBOB 74, in conjunction with the database 80, collectively serve as a repository for all monitoring profiles 76. The profile builder 72 uses the DBOB 74 to access an object corresponding to a monitoring profile 76 desired to be viewed and/or modified. The database 80 is preferably implemented as a relational database.

The profile builder 72 will preferably provide a graphical interface allowing for inspection and modification of the monitoring profiles 76 stored within the database 80. In this regard each monitoring profile 76 can be visualized as a treelike structure consisting of a plurality of application profiles 78. Each constituent application profile 78 may be selected and its contents edited. As is described below, the profile builder 72 also allows for definition of particular classes of users, hereinafter referred to as "groups". A particular monitoring profile 76 may be assigned to each such group, thereby allowing evaluation of the performance of each user in the group relative to the assigned monitoring profile 76. Groups are a mechanism to allow system administrators to easily define and maintain identical profiles for multiple users.

Figure 5:
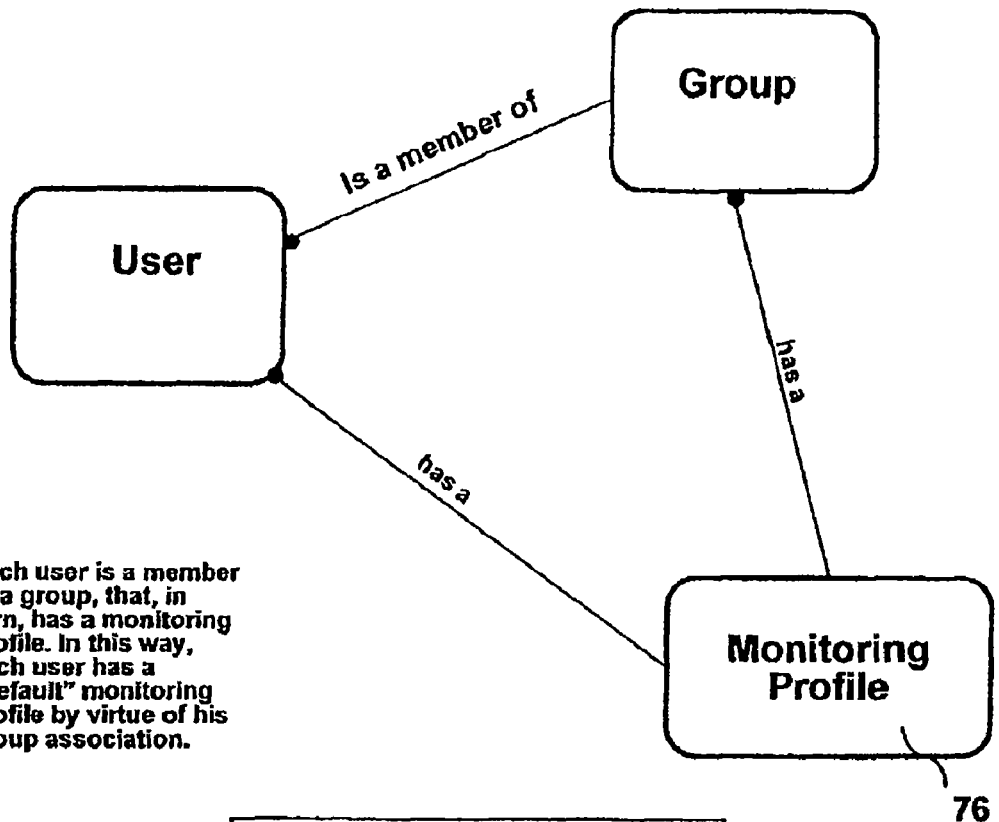
FIGS. 5 and 6 depict alternative types of associations between users and corresponding monitoring profiles.
Figure 6:
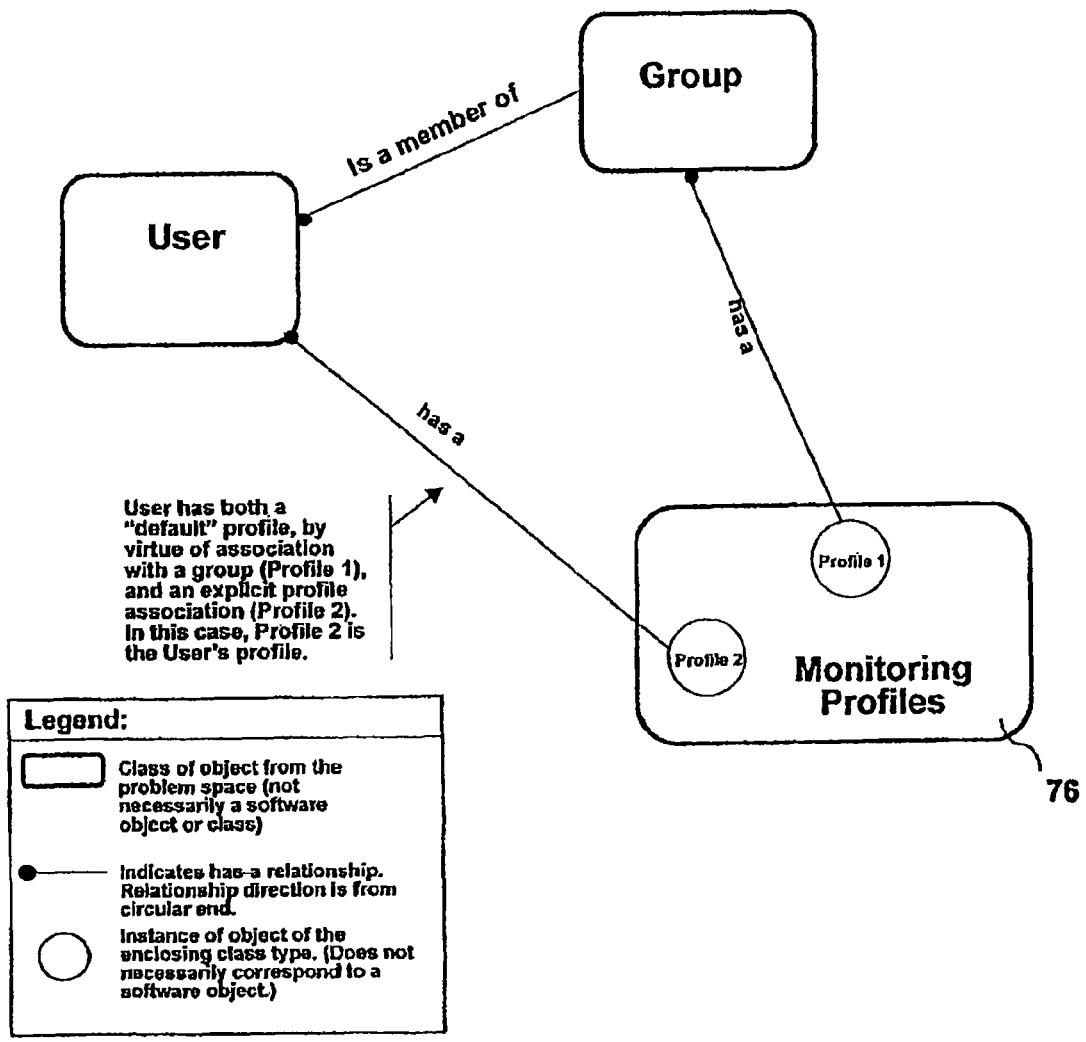

In a preferred implementation of the usage monitoring system of the present invention a monitoring profile 76 is associated with each user of a client computer 12. As is indicated by FIGS. 5 and 6, this association may be in the form of a direct assignment of the monitoring profile 76 to a given user. Alternately, this association may be effected indirectly by virtue of the user's inclusion in a group to which a monitoring profile 76 has been assigned. Each user may be associated with only one group at a time, and each group associated with only one monitoring profile. By default, a user is assigned the monitoring profile associated with his group (FIG. 6). This can be overridden for individual users by assigning a monitoring profile directly to the user. In FIG. 6, the monitoring profile identified as "Profile 2" has been assigned directly to user U1. If a monitoring profile 76 has not been so directly or indirectly assigned to a given user, the user's activity is monitored in accordance with a predefined default monitoring profile ("Default Monitoring Profile").

Figure 7:
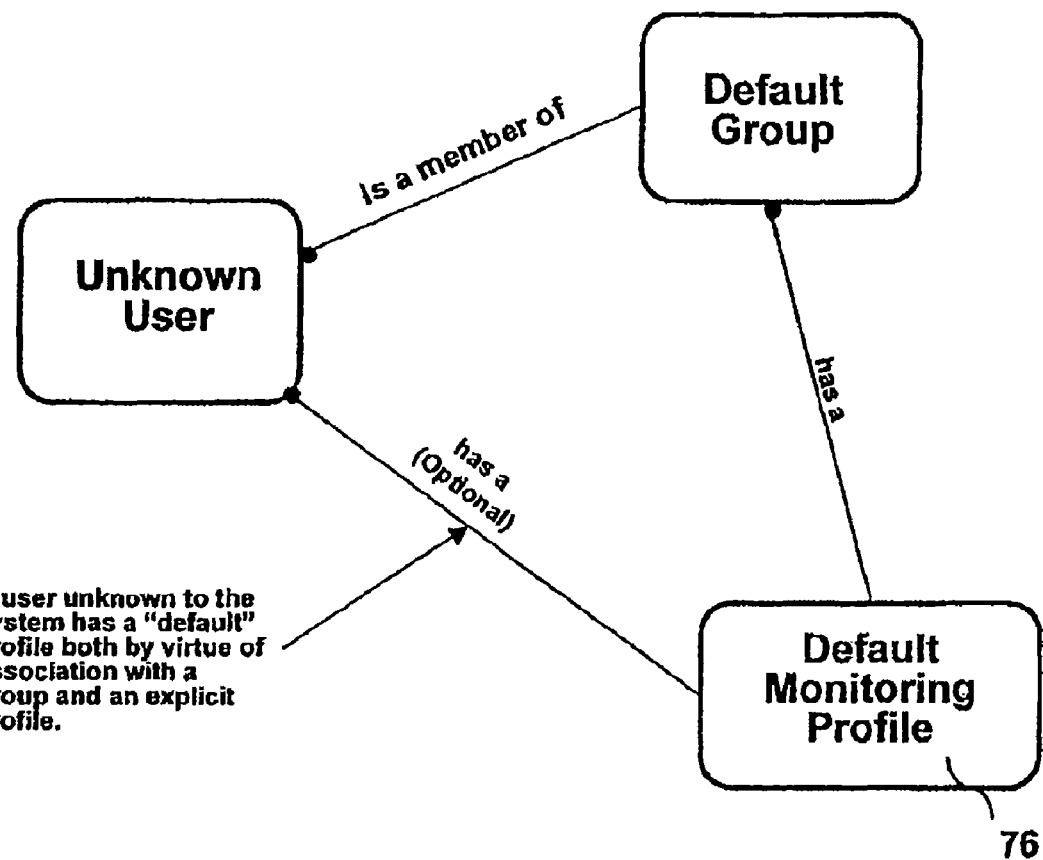
FIG. 7 provides a representation of allowed associations between monitoring profiles on the one hand, and users, groups, and computers/subnets on the other hand.
Figure 8:
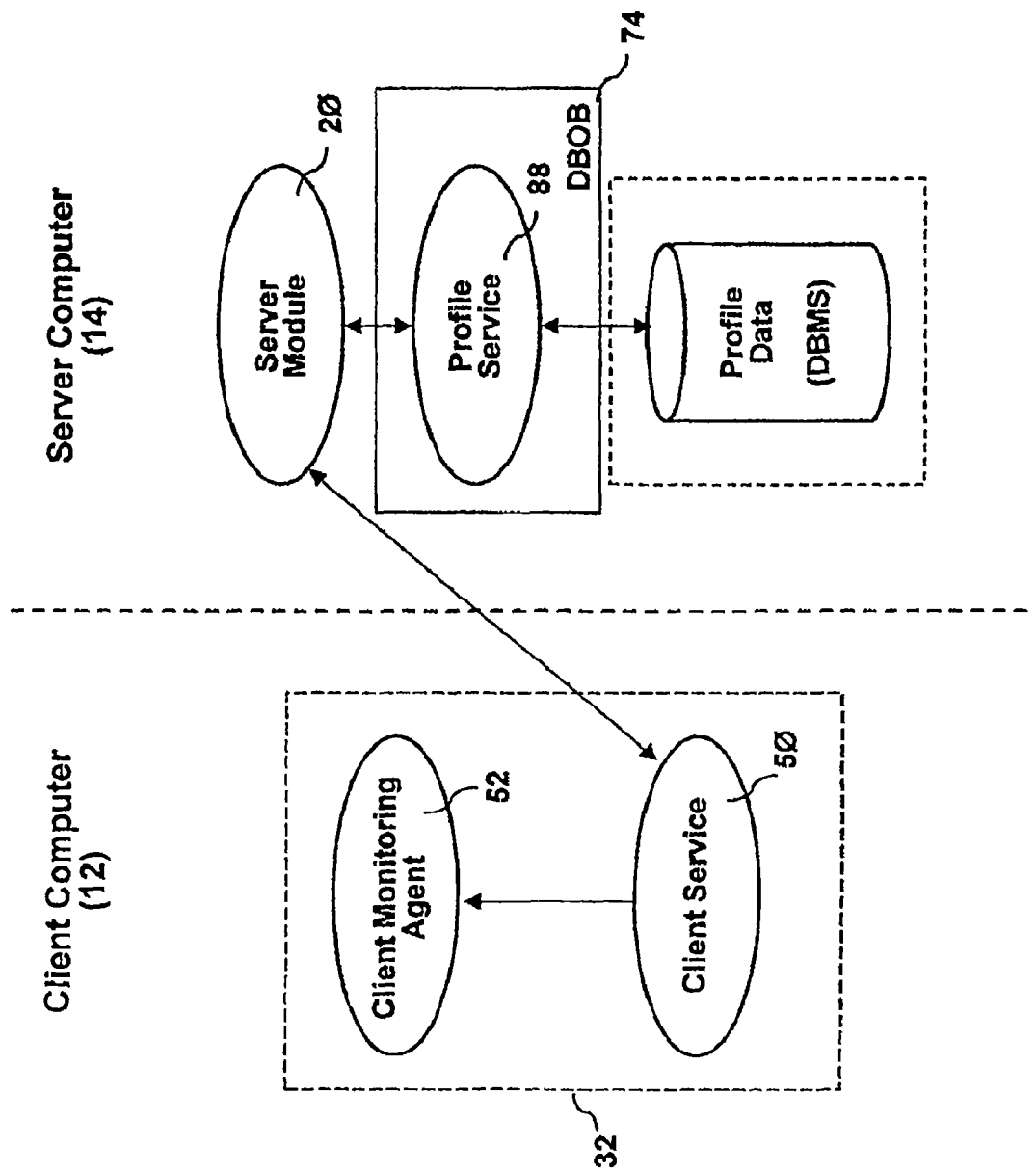
FIG. 8 depicts the relationship of a server-based profile service to other components of a computer usage monitoring system of the present invention.

When a user becomes logged on to a client computer 12, the client service 50 installed on the computer 12 requests a profile server 88 to deliver the associated monitoring profile 76. The client service then creates a client monitoring agent 52 and initializes it with the monitoring profile 76 (FIG. 8). In a preferred implementation each user is identified by a user name identical to the name used to identify the user within the applicable operating system (e.g., Windows 95 or Windows NT). Because it is possible for a previously unknown user to log onto a client computer 12, it is necessary to provide a mechanism for dealing with user names that are not otherwise recognized. Such an unknown user will often be encountered under the following circumstances: (i) a user logs onto a client computer 12 with a user name that has not been previously utilized; and (ii) a user may log onto a client computer 12 without specifying a user name, hereinafter an "anonymous user". In the former case, the profile builder 72 will add the new user to the list of known users and automatically assign the new user to a default user group (the "Default Group"). In the case described in (ii) above, the "Unknown User" becomes a member of the Default Group and is assigned the Default Monitoring Profile (FIG. 7).

As an initial step in identifying the appropriate monitoring profile for a given user, upon becoming logged on to client computer 12 it is determined whether the user has previously been assigned a monitoring profile. If not, it is determined whether the user is a member of any defined groups. If so, the monitoring profile for the applicable group is assigned to the user; otherwise, the profile for the default group is assigned to the user. Upon identifying the most specific monitoring profile applicable to the given user, the object corresponding to the identified monitoring profile 76 is provided by the DBOB 74 to the client monitoring agent 52 (via the server module 22 20) by the client service 50. The client monitoring agent 52 then begins monitoring user activity in accordance with the received monitoring profile 76.

Figure 9:
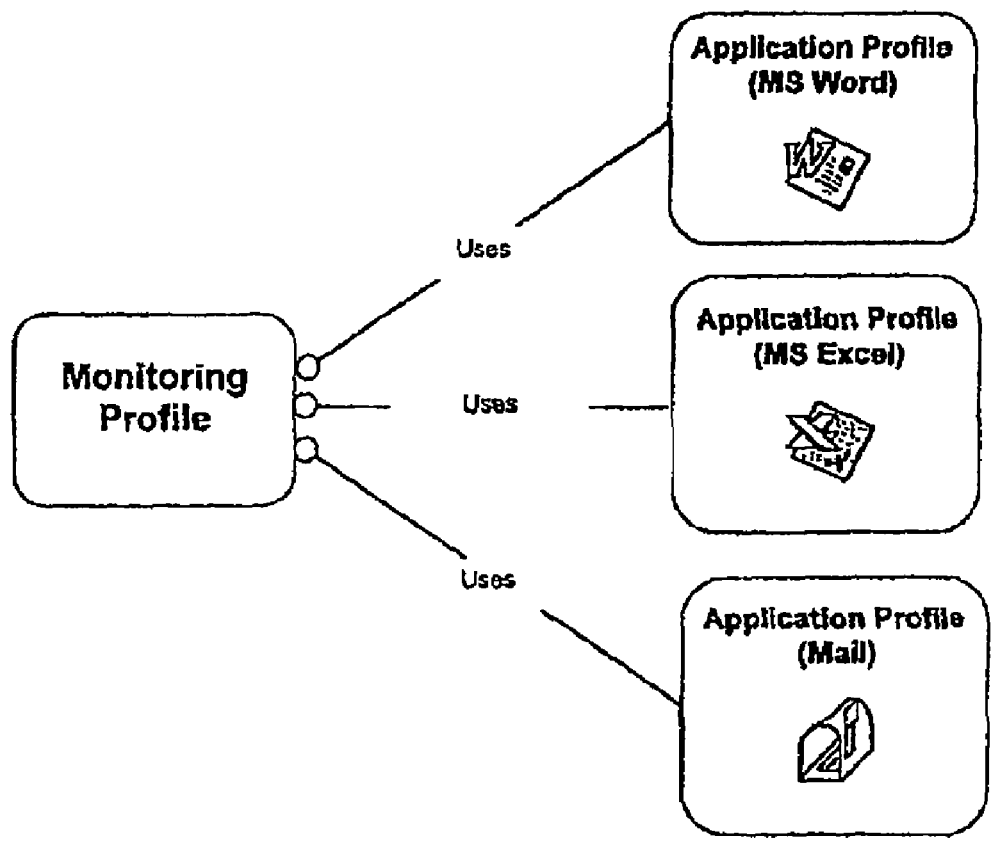
FIG. 9 depicts a set of application profiles incorporated into a monitoring profile via association links.

As is indicated by FIG. 9, one or more application profiles 78 are incorporated into a monitoring profile 76 via association links. Each application profile 78 contains attribution uniquely identifying those events to be recorded during the interaction of a user with a specific application program. It follows that each application profile 78 is specific to a particular application program, and in some cases is applicable only to a particular program version.

Each monitoring profile will typically specify the application programs, and the features in such programs, which should be tracked. Monitoring profiles by default record entry into and exit from each application program in order to measure the duration of usage of each application. Various monitoring profiles may also define a user inactivity threshold, which is compared to the duration of a user's inactivity. A user is deemed to be "inactive" when such user fails to interact with any application program for a period exceeding the inactivity threshold, and is otherwise deemed "active". Information relating to the schedule (e.g., time of day, days of week) during which a given user is to be monitored will be included in each monitoring profile 76.

Also preferably included in each monitoring profile are specifications pertaining to the reporting of monitoring data from the client service 50 to the server module 22. These data reporting specifications will typically specify an upper limit to the size of the file (or memory buffer) containing the monitoring data held on the client computer 12. In a preferred implementation the client monitoring agent 52 informs the client service 50 when this upper limit is exceeded (i.e., when data is available for transfer from the client monitoring agent 52). In turn, the client service 50 signals the applicable server module 22, which in its discretion calls back to the signaling client service 50 to collect the cached data. In a preferred implementation a nominal data reporting interval, relating to the minimum frequency with which reports need to be provided to the server module 22, is included in the data reporting specifications of each monitoring profile. This parameter ensures that the server module 22 obtains timely updates from the client monitoring agent 52 (i.e., at least once per nominal data reporting interval), even during periods of low user activity.

Figure 10:
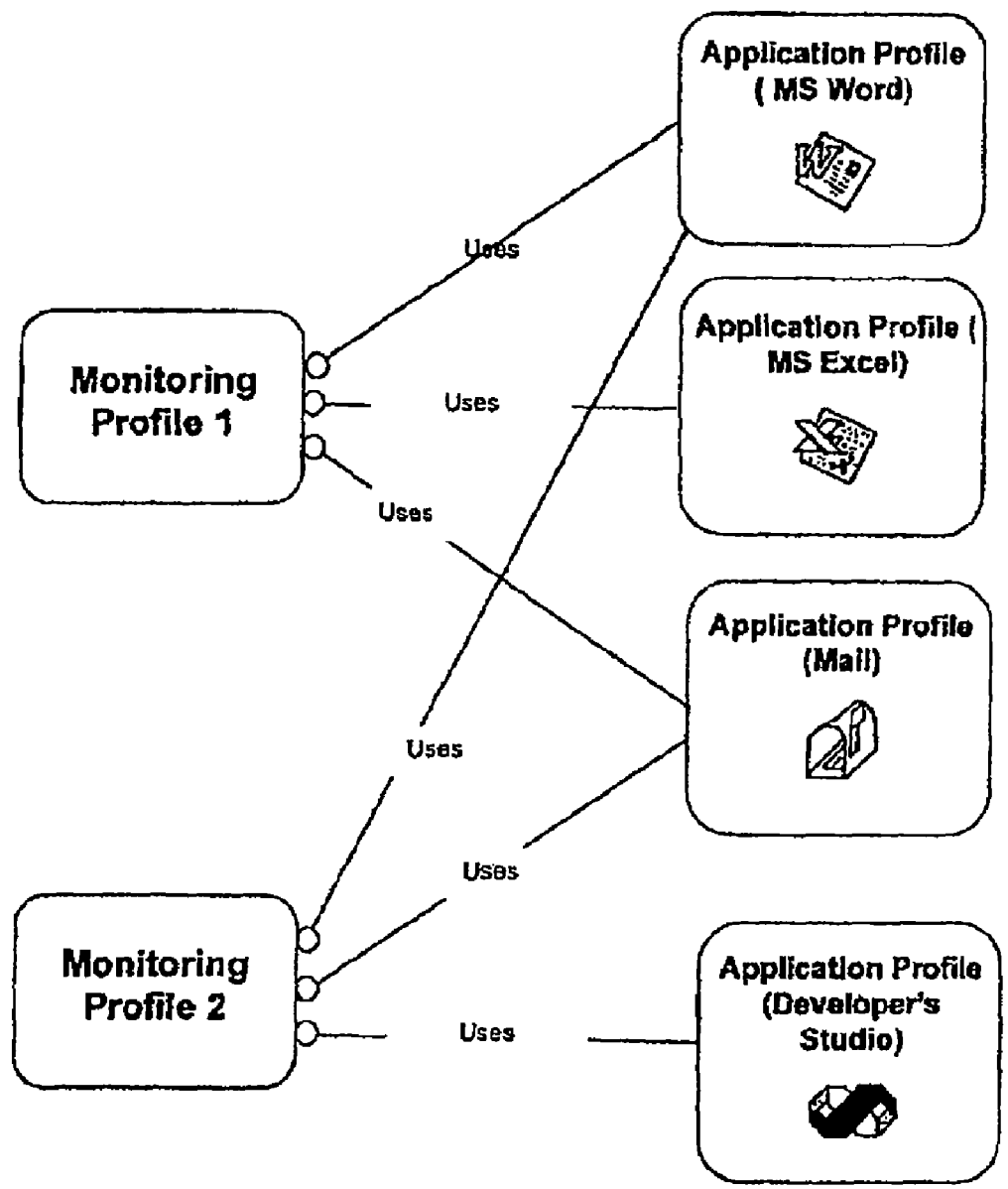
FIG. 10 illustratively represents potential associations between a set of application profiles and first and second monitoring profiles.

FIG. 10 illustratively represents potential associations between a set of application profiles 78*a*-78*d* and first and second monitoring profiles 76*a* and 76*b*. In order to facilitate ease of system administration, a given application profile 78*a*-78*d* can be simultaneously associated with either or both of the monitoring profiles 76*a* and 76*b*. This advantageously obviates the need to modify each monitoring profile with which a given application profile is associated upon making changes to such application profile. FIG. 10 should not be interpreted as implying that a particular application program may only be characterized by a single application profile. Rather, FIG. 10 illustratively represents that multiple application profiles may exist for a single application program even in the context of a single monitoring profile. In such a case a composite application profile for the application program could be generated by merging the specific application profiles. This merging process would involve concatenating the different program features to be tracked from each constituent application profile such that usage of each program feature is only reported once during each reporting period.

Each client monitoring agent 52 is also capable of collecting, in accordance with the applicable application profile, data pertaining to usage of defined "features" of application programs. In the context of the present invention the term "feature" is intended to refer to the operation or function performed by a series of keystrokes or mouse clicks. For example, the keystrokes required to enter text into a file path field, or to enter text into a main application window, could each be defined to correspond to a particular feature.

In an exemplary implementation the client monitoring agent 52 is disposed to track the following application features:

Menu Item Usage (via mouse and accelerator keys). Usage of menu items, whether invoked by mouse or keyboard actions.

Toolbar Control Usage. Usage of commonly seen "bitmap buttons" on toolbars, as well as utilization of more complex controls embedded on toolbars.

Dialog Usage. When, and how many times, a particular dialog is used.

Top Level Window Access. Requires determination of when a given top level window of an application having multiple top level windows has been accessed.

Control Usage. Use of individual controls appearing on various windows, including control usage within specific dialogs and popup windows.

Main Application Window State. Refers to the state of the main application window during use of the subject application program (e.g., whether the window was maximized, the window's position on the display screen, movement of the window).

Popup Menu Usage. Use of popup menus and specific menu items.

Duration of Feature Use. The time interval during which a user interacts with a given control (e.g., a text field).

Control State. The state of a given control upon activation by a user. As an example, the text typed into a text box (typically after truncation) could correspond to a Control State, as could the state of check boxes in a given application.

Methods of Tracking Application Usage

As is described in detail below, the client monitoring agent 52 generally uses one or both of two primary methods of collecting information relating to usage of application programs. A first technique involves monitoring and filtering the message traffic associated with particular user interface events of Windows-based applications. This information is accessed via hooks in the applications and Windows operating system which are associated with particular user interface events (collectively, "Windows Hooks"). Data relating to this message traffic may be analyzed to ascertain the existence of activities deemed to be of significance within an application. Such activities could include, for example, rates of mouse and accelerator key events useful in computation of general productivity metrics.

Figure 11:
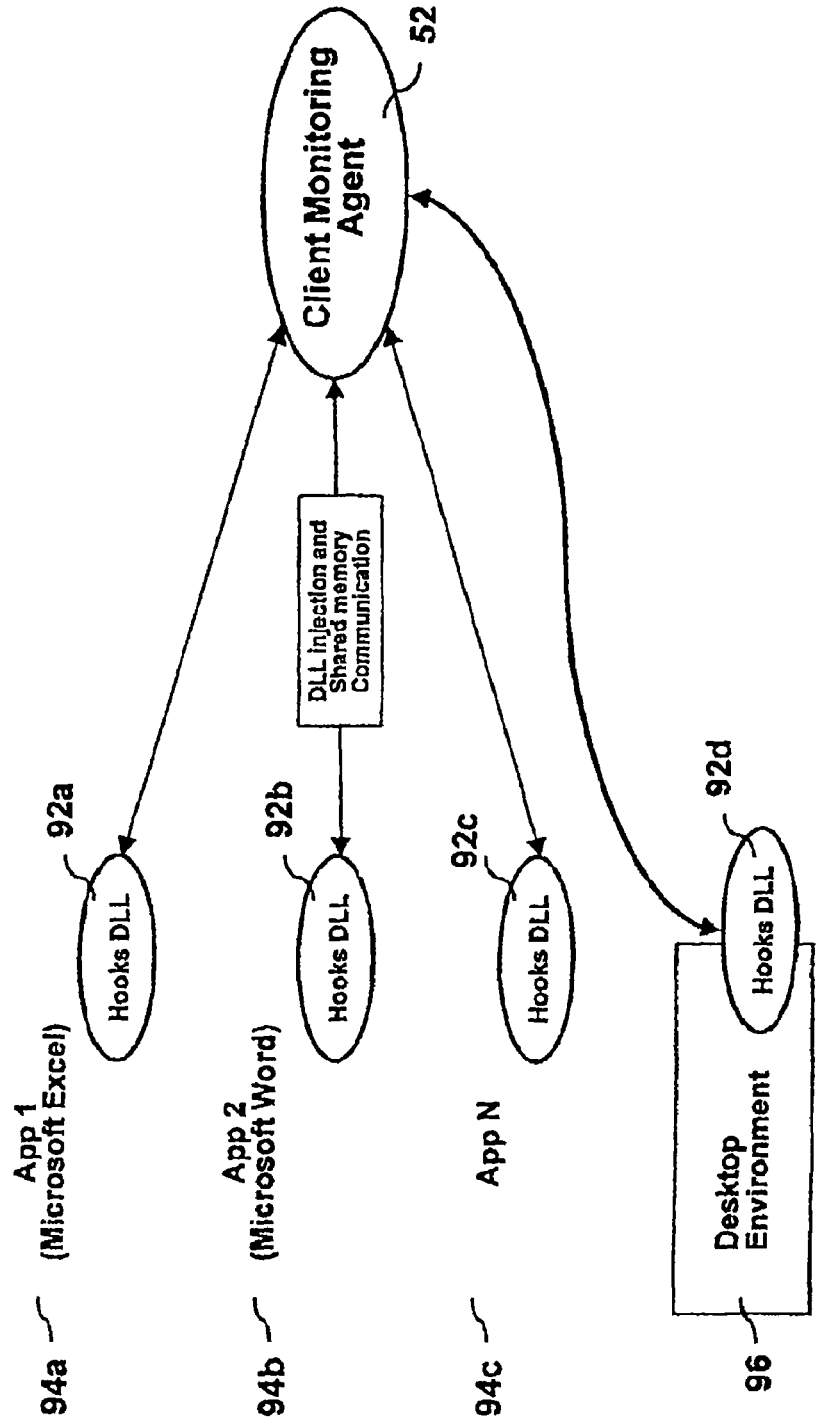
FIG. 11 provides an illustrative representation of an architecture for tracking user interface events via Windows Hooks.
Figure 21:
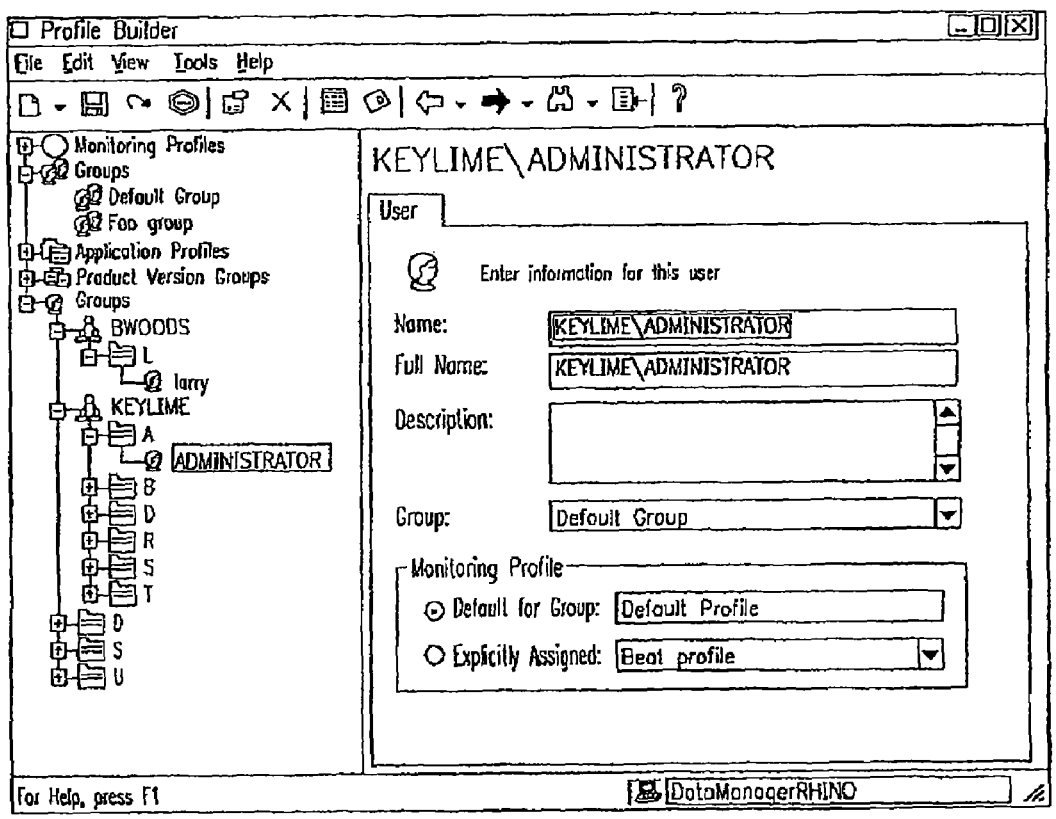
FIG. 21 shows a primary tree view from within the profile builder which enables users to navigate objects populating a system database.

FIG. 11 provides an illustrative representation of an architecture for tracking user interface events via Windows Hooks. As is indicated by FIG. 11, a dynamic linked library ("Hooks DLL") 92 is injected by the client monitoring agent 52 into each application program 94 that has been activated by the user. A Hooks DLL 92d generated by the client monitoring agent 52 is also used to monitor user interaction with the desktop environment 96. The Hooks DLLs are inclined to monitor prescribed Windows Hooks in the application programs 94 and desktop environment 96 so as to determine when specific user input events (e.g., mouse clicks and keystrokes) have been performed. Information relating to the monitored user actions is reported by the Hooks DLLs to the client monitoring agent 52, which then forwards the collected information to the client service 50 as described above. The client monitoring agent 52 and the application program hosting the Hooks DLLs 92 are preferably implemented as distinct processes with their own memory and processing threads. The Hooks DLLs 92 utilize the processing threads of the host application program being monitored. In the implementation of FIG. 21 the injected Hooks DLLs 92 and the client monitoring agent 52 communicate via asynchronous shared memory.

In implementations of the present invention within systems governed by recent versions of the Microsoft Windows operating systems (e.g., Windows 95, Windows 98, or Windows NT 5.0), information concerning usage of certain application programs may also be collected via Microsoft Active Accessibility application programming interfaces ("Accessibility APIs"). These Accessibility APIs allow more extensive information to be collected regarding usage of various application features. In this context an application "feature" is defined by an Accessible Object of the application program, where the term "Accessible Object" is intended to have the meaning provided within the "Microsoft Active Accessibility Software Development Kit," which has been made available at http://www.microsoft.com/enable/dev/msaa.htm. Accessibility APIs were designed primarily to provide limited internal access to an application program in order to facilitate utilization of alternative input and feedback mechanisms associated with third party applications.

Application programs incorporating Accessibility APIs create and destroy Accessible Objects during program execution. In a preferred implementation of the present invention the following process is employed to track usage of application features by monitoring associated Accessible Objects:

1. An administrator identifies the features to be tracked in a set of chosen applications.
2. This information is stored in an application profile, which is incorporated as described above into the monitoring profile associated with particular user(s).
3. Use of specific features within each chosen application are tracked according to the application profile during usage of the chosen applications by such user(s).

Since Accessible Objects are extinguished each time an application program is terminated, it is necessary to identify those of such objects corresponding to monitored features upon each subsequent invocation of the application program. TABLE I provides a list of attributes of Accessible Objects and accompanying explanations of the manner in which such attributes can assist in identifying objects corresponding to monitored features.

TABLE I

| Attribute | Explanation |
|---|---|
| Object Name | The Object Name is the name as reported by the object's accessibility interface. The Object name is usually (but not always) the same as its displayed caption. For example, a button's name is typically the same as its label. The same is true for menu items. |

TABLE I-continued

| Attribute | Explanation |
|---|---|
| Role | The Role is the Accessible Object's Role as reported by the objects accessibility interface. The set of allowable roles is defined by Microsoft as part of the Accessibility API. There are presently 61 defined roles. The role of an object is used to help identify when a particular feature is used. Roles include denotations such as button, menu item, popup menu, combo box and others. |
| Window Class | The Window class is the class name of the Object's parent window. The window class is included in the identification attributes to help distinguish between objects that have the same name and role, but whose window class may be different. |
| Top Level Window Class | This is the Top Level Window's Class of the window at the top of the Microsoft Window's window hierarchy chain. |

The client monitoring agent 52 examines the attributes of Accessible Objects set forth in TABLE I to identify objects corresponding to monitored features. However, examination of the four attributes listed in TABLE I will not always uniquely identify a monitored feature, although in most practical applications such an examination will suffice. As an example, consider the case in which the monitored feature consists of the Copy menu item on the Edit menu within Microsoft Word 97. The Copy menu item reports the following characteristics when examined through its accessible interface:

The Object Name is "Copy."
The Role is ROLE_SYSTEM_MENUITEM
The Window Class is "MsoCommandBar"
The Top Level Window Class is "Opus App"

Unfortunately, these features are also reported by the Accessible Object associated with a Copy menu item appearing on the popup menu which arises in response to a "right click" in the text area of a document. Accordingly, merely examining the values for the attributes listed in TABLE I leads to an ambiguous result. TABLE II lists the values for the attributes of the Accessibility Object for the "Copy" feature from the popup menu along with the attributes associated with the "Copy" feature from the menu bar:

TABLE II

| Attribute | (Copy) Popup Menu | (Copy) Edit Menu on Menu Bar |
|---|---|---|
| Object Name | Copy | Copy |
| Object Role | ROLE_SYSTEM_MENUITEM | ROLE_SYSTEM_MENUITEM |
| Window Class | MsoCommandBar | MsoCommandBarPopup |
| Top Level Window Class | OpusApp | MsoCommandBarPopup |

In the example of TABLE II, the values of the Window Class and Top Level Window differentiate between the two Copy items. Although it is believed that in most instances Accessibility Objects associated with specific features may be distinguished by inspection of the attributes described in TABLE I and TABLE II, the present invention provides a mechanism hereinafter referred to as "feature ancestry" for resolving any ambiguities.

The concept of feature ancestry may be appreciated by considering that every Accessible Object is a member of a tree structure of Accessible Objects stemming from a Top Level Window. In this context a given Accessible Object can generally be identified by a qualified name generated by concatenating the names of selected Accessibility Objects forming an ancestry of the given Accessible Object. It is noted that each potential ancestral Accessibility Object need not necessarily be used in the identification process. The following procedure may be utilized to determine the qualified name of an Accessible Object:

1. For each ancestor, specify whether or not such ancestor is to be used for identification purposes.

2. For each ancestor being used for identification purposes, select one or any combination of the following three attributes for examination: Object Name, Role, and Window Class.

As an example of the above procedure, consider the case of the standard "OK" button commonly found on dialog boxes. In the case of Microsoft Word 97, examination of the attributes of the Accessibility Object for the "OK" button on the dialog box brought up via the "Tools/Options . . . " menu item yields the following: Object Name is "OK", Role is ROLE_SYSTEM_PUSHBUTTON, Window Class is "bosa_sdm_Microsoft Word 8.0". Examination of the Accessibility Object for the "OK" button on the dialog box brought up by "File/Print . . . " menu item yields exactly the same information. However, the ancestral Accessibility Objects for each of these "OK" buttons are different as indicated by TABLE III:

TABLE III

|  |  | Tools/Options . . . Dialog OK button | File/Print . . . Dialog OK button |
|---|---|---|---|
| Ancestor1 | Name: | Options | Print |
|  | Role: | ROLE_SYSTEM_DIALOG | ROLE_SYSTEM_DIALOG |
|  | Class: | bosa_sdm_Microsoft Word 8.0 | bosa_sdm_Microsoft Word 8.0 |
| Ancestor2 | Name: | Options | Print |
|  | Role: | ROLE_SYSTEM_WINDOW | ROLE_SYSTEM_WINDOW |
|  | Class: | bosa_sdm_Microsoft Word 8.0 | bosa_sdm_Microsoft Word 8.0 |

As is indicated by TABLE III, the Accessibility Objects for the two "OK" buttons described in the preceding example can be distinguished only by comparing their respective ancestral Accessibility Objects.

Each feature identified by the applicable monitoring profile is tracked according to whether the feature is "used" or not. When features are monitored via associated Accessibility Objects, the definition of usage for a given feature is dependent upon the nature of the role defined by its associated Accessibility Object. TABLE IV below provides exemplary usage definitions for roles assumed by various Accessibility Objects associated with features likely to be tracked. Again, the role of an Accessibility Object may be examined by way of the defined set of Accessibility APIs. TABLE IV also provides, for certain roles, examples of the manner in which usage of an application program affects the state of a given role.

TABLE IV

ROLE_SYSTEM_BUTTONDROPDOWN
    1. Used if pressed.
    No Application Instances Appear To Exist.
ROLE_SYSTEM_BUTTONDROPDOWNGRID
    1. Used if pressed.
    No Application Instances Appear To Exist.
ROLE_SYSTEM_BUTTONMENU
    1. Used when Pressed.
    No Application Instances Appear To Exist.
ROLE_SYSTEM_CHECKBUTTON
    1. Used when State Changed (i.e. transitioned from check to unchecked or vice-versa)
    Check buttons are the commonly found check boxes in lots of places. The standard windows
    check box control has this role.
ROLE_SYSTEM_CLIENT
    1. Used when receives mouse clicks or keystrokes.
    Clients are frequently found as the interior area of framed windows. The interior area of Word
    documents are clients, as are excel and all tested applications.
    An object that is a Client is defined as Used if any mouse clicks or keystrokes are aimed at it.
ROLE_SYSTEM_COMBOBOX
    1. Used when any of its children are used.
    A combo box always has three children: the text area (sometime editable, sometimes not) the
    button that drops and undrops the list (sometimes visible, sometimes not), the window that holds
    the list.
    A combo box is defined as used if the user uses and of the child windows.
    The standard windows combo box has this role.
ROLE_SYSTEM_DIAL
    1. Used if child objects are used or if the dial object receives any mouse clicks or keystrokes.
    An object that is a dial is used if any of its child objects are used or if the object itself receives any
    mouse clicks or keystrokes.
    No Application Instances Appear To Exist
ROLE_SYSTEM_DIALOG
    1. Used when displayed to the user.
ROLE_SYSTEM_DROPLIST
    1. Used if any of its child objects are used.
    A drop list is like a combo box, it always has three children: the text area (sometime editable,
    sometimes not) the button that drops and undrops the list (sometimes visible, sometimes not), the
    window that holds the list.
    A list box is defined as used if the user uses any of the child objects.
    No Application Instances Appear To Exist.
ROLE_SYSTEM_GRIP
    1. Used if it receives any mouse down messages.
    No Application instances Appear To Exist.
ROLE_SYSTEM_HOTKEYFIELD
    1. Used if receives any keystrokes.
    Used if it receives any keystrokes.
ROLE_SYSTEM_LINK
    1. Pressed.
    Links act like buttons, but generally look like text or graphics.
ROLE_SYSTEM_LIST
    1. Used when one or multiple list items are selected/deselected.
ROLE_SYSTEM_LISTITEM
    1. A list item is used whenever its state toggles between selected and not selected.
ROLE_SYSTEM_MENUITEM
    1. Used when the menu item is selected.
    A menu item is selected when its state becomes "focused" and while focused it receives a mouse
    up event or return key press.
ROLE_SYSTEM_MENUPOPUP
    1. Used if any of its children are used.
ROLE_SYSTEM_OUTLINE
    1. Used if any mouse clicks or keystrokes are directed at it or if any of its children are used.
    The Outline is used if any mouse clicks or keystrokes are directed at it or if any of its children are
    used. The standard windows tree control publishes its role as outline.
ROLE_SYSTEM_OUTLINEITEM
    1. Outline Items are used if they receive any keystrokes or mouse clicks or the object's state
    toggles between selected/unselected.
    Items within the standard windows tree control publish their role as outline.

TABLE IV-continued

```
ROLE_SYSTEM_PAGETAB
    1. Used if any mouse clicks are directed at it.
    Tabs on tabbed dialogs appear as page tabs.
ROLE_SYSTEM_PROPERTYPAGE
    1. Used if any child objects are used.
    Used means the page was displayed.
ROLE_SYSTEM_PUSHBUTTON
    1. Used if pressed.
    The button was pressed, either by the user interacting with the control via the mouse or keyboard.
ROLE_SYSTEM_RADIOBUTTON
    1. Used if the button transitions between checked and unchecked states.
    A radio button is used if it transitions between the checked and unchecked states.
ROLE_SYSTEM_SCROLLBAR
    1. Used if any of its child objects are used or if the object itself receives any keystroke or mouse
    clicks.
    A scroll bar is used if any of its children are used.
ROLE_SYSTEM_SLIDER
    1. Used if the object receives any mouse clicks or keystrokes.
    The standard windows slider control publishes this role.
ROLE_SYSTEM_SPINBUTTON
    1. Used if the user clicks the mouse within the spin object
ROLE_SYSTEM_TEXT
    1. Used if there are any keystrokes or mouse clicks directed at the object.
ROLE_SYSTEM_TITLEBAR
    1. Used (gabbed) if a mouse down occurs on the object.
ROLE_SYSTEM_TOOLBAR
    1. Used if any of its children are used.
ROLE_SYSTEM_WINDOW
    1. Used if any of its children are used.
```

Figure 12:
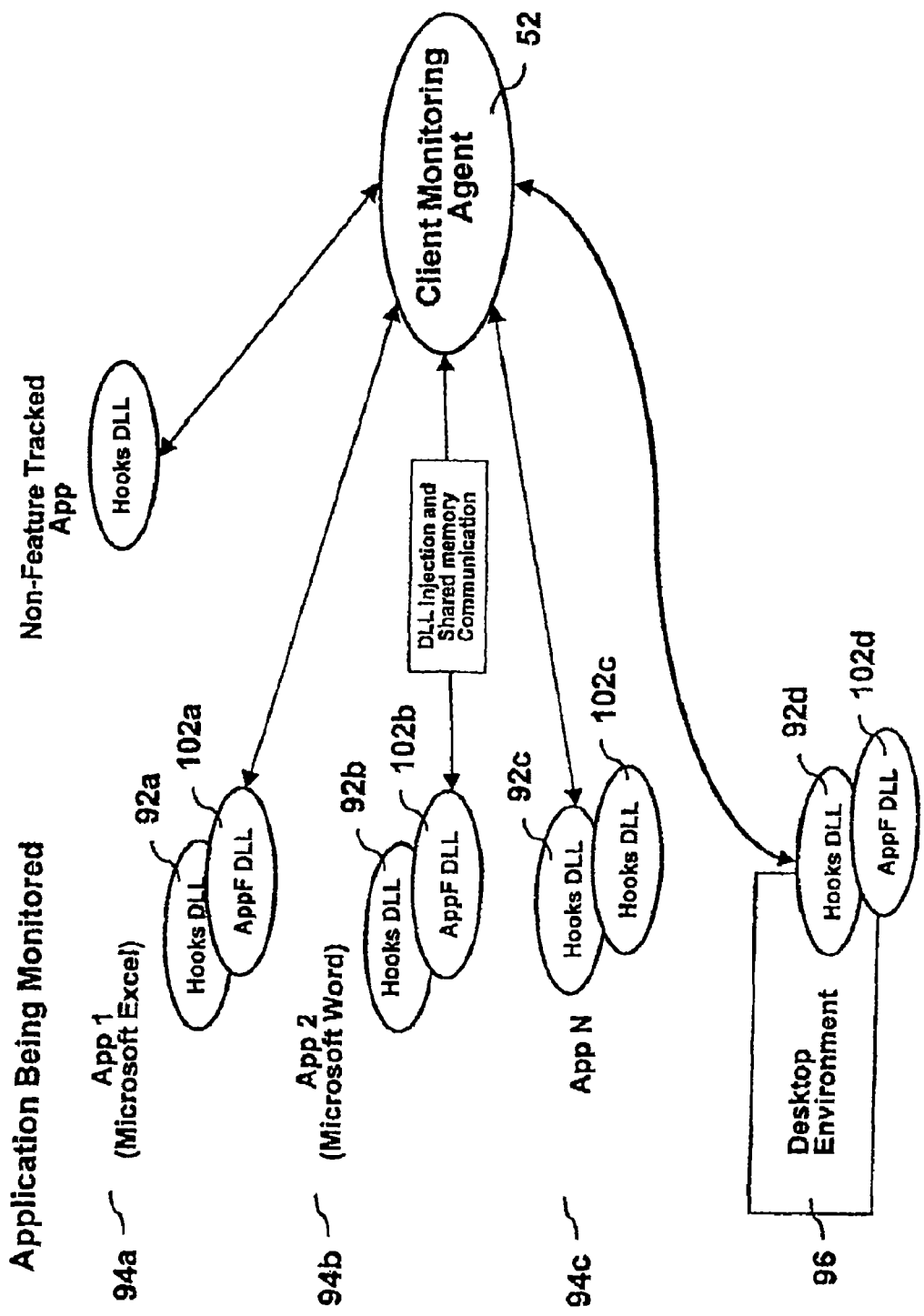
FIG. 12 provides an illustrative representation of an architecture for tracking user interface events via Windows Hooks and events registered by Accessibility Objects.

FIG. 12 provides an illustrative representation of an architecture for tracking user interface events via Windows Hooks and events registered by Accessibility Objects ("Accessible Events"). As is indicated by FIG. 12, a Hooks DLL 92 and an application features DLL ("AppFeature DLL") 102 is injected by the client monitoring agent 52 into each application program 94 that has been activated by the user. A Hooks DLL 92d and an AppFeature DLL 102d generated by the client monitoring agent 52 are also used to monitor user interaction with the desktop environment 96. The Hooks DLLs 92 monitor prescribed hooks in the application programs 94 and desktop environment 96 so as to determine when specific user input events (e.g., mouse clicks and keystrokes) have been performed. The AppFeature DLLs 102 are designed to monitor Accessible Events in order to determine whether each such Accessible Event relates to an Accessible Object for a feature being tracked.

In accordance with one aspect of the present invention, the AppFeature DLLs 102 internally use Windows Hooks in conjunction with Accessible Events to determine whether a feature is being used. Although the Accessibility API provides notification of occurrences of Accessible Events monitored by AppFeature DLLs 102, not all Accessible Objects generate notifications capable of being monitored by the AppFeature DLLs 102. Accordingly, the Windows-based events tracked by the Hooks DLLs 92 are used to trigger the AppFeature DLLs 102 to query the Accessibility API for information relating to the identity of the Accessible Object, if any, associated with the Window generating the event. The following is an exemplary sequence of Windows-based events capable of being monitored by an AppFeature DLL 102:

| | |
|---|---|
| WM_KEYDOWN | (Win32 Event) |
| WM_CHAR | (Win32 Event) |
| ACC_STATE_CHANGE | (Accessibility Event) |
| WM_KEYUP | (Win32 Event) |

Further details regarding various preferred mechanisms for tracking user events in accordance with the present invention are described below with reference to FIG. 13.

Data Analysis and Display

Figure 13:
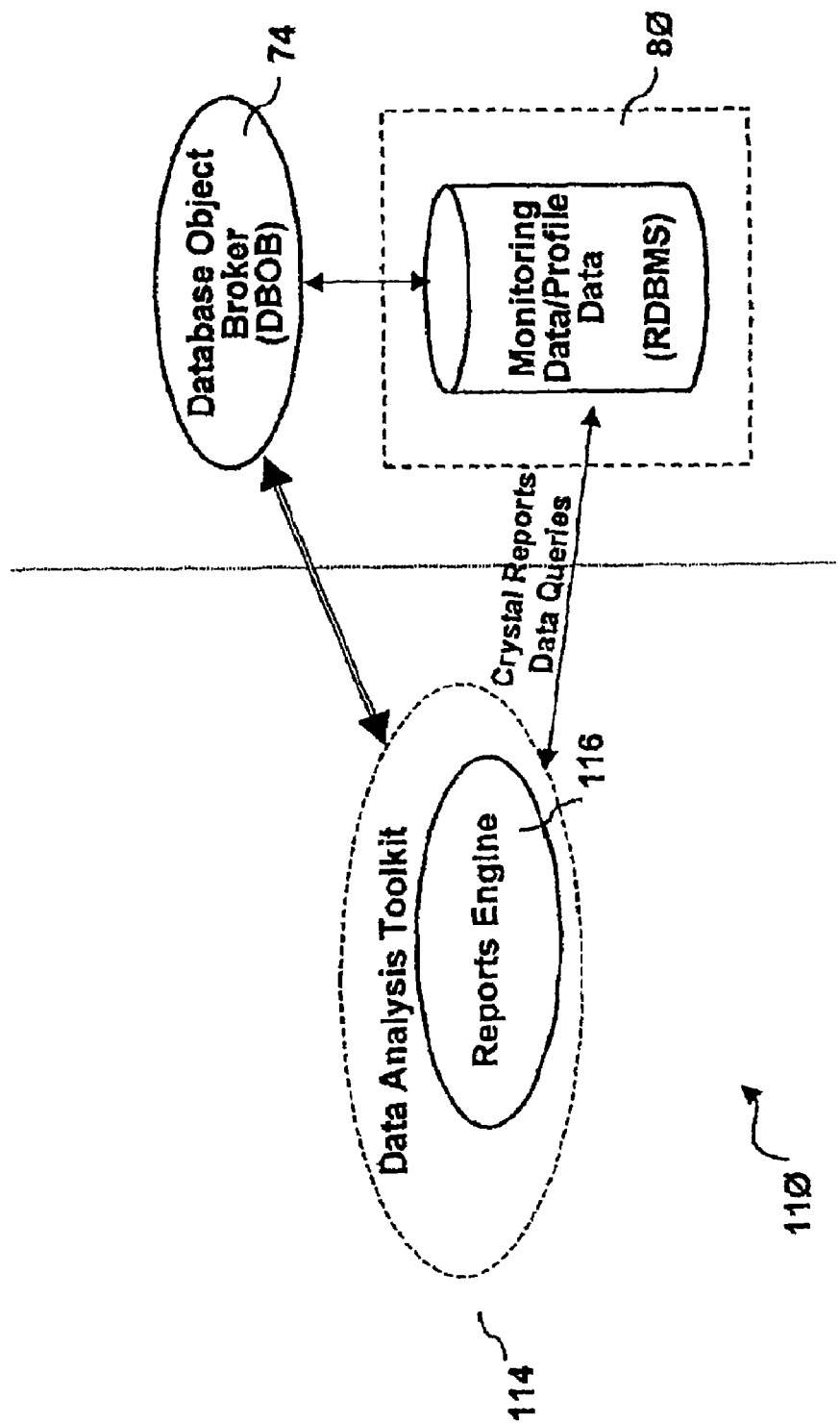
FIG. 13 illustratively represents the distributed architecture of a data analysis and display subsystem operative to collate and analyze the usage data cooperatively collected by client monitoring modules.

FIG. 13 illustratively represents the distributed architecture of a data analysis and display subsystem 110 operative to collate and analyze the usage data cooperatively collected by client monitoring modules 20. As a product of this analysis, the subsystem 110 generates various metrics relating to user productivity and also creates associated reports. The subsystem 110 includes a data analysis toolkit ("DAT") 114 incorporating a reports engine 116. The DAT 114 is resident on a client computer 12 and communicates with the DBOB 74 on the server computer 14. The DBOB 74 provides access to the collected monitoring data within database 80 which is operated upon by the subsystem 110. The database 80 also contains templates for creating reports generated by the subsystem 110, and includes embedded SQL commands for supporting queries concerning the stored monitoring data.

The DAT 114 provides the means to view and compare the data collected by the client monitoring modules 20. The DAT 114 uses the DBOB 74 to access the monitoring data within database 80. In addition, the reports engine 116 of the DAT 114 utilizes an Open Database Connectivity ("ODBC") connection to the database 80 in connection with data retrieval (FIG. 13). The following type of usage information may be generated by the DAT 114 on the basis of the monitoring data collected and reported by a specific client monitoring module 20:

Time Used: The time an application and/or a specific part of an application is actually used. This calculation is based upon receiving user input and/or updated events associated with the application/field.

Number of Uses: A count of how many times a specific part of an application is used.

Sequence of Use: Utilization events are time-stamped in order to show the sequence of how applications and parts of applications were used.

How Used: User input events associated with an application or field in an application are stored in order to record an exact history of how the application or field was used. This capability encompasses the state of a field or control following utilization by a user. The type of state information collected is dependent upon the nature of the control being monitored (e.g., the state of text field is determined by the associated text, and the state of a "check box" is either checked or unchecked).

In addition to facilitating acquisition of the type of usage information outlined above, the DAT 114 allows the monitoring data collected by the client monitoring modules 20 to be queried in a user-defined manner. This feature enables generation of usage reports focused upon user-defined usage parameters. In a preferred implementation the DAT 114 is also capable of providing various representations of historical usage activity for individual users.

An exemplary set of such presentations are described below:

Usage Histogram: The aggregate time which application invoked by a user within a predefined time period was actually used is displayed. Also displayed is the aggregate idle time associated with each application (i.e., the period of user inactivity associated with each application).

Usage Comparison: A comparison of the usage histograms associated with a given user over multiple periods of time (one day vs. another, or morning vs. afternoon).

Application Usage: A display indicative of the extent of usage of particular features of a given application.

The DAT 114 also preferably allows comparison of the histograms or other usage representations of two or more users through, for example, superimposing the histograms or representations on the same portion of a display screen. Each of the compared histograms or representations may constitute an average taken over many users.

The DAT 114 provides representations of the activity history associated with specific applications. This type of representation will typically be generated by the DAT 114 on the basis of the monitoring data collected from a group of users and reported by the client monitoring module 20. Set forth below are an exemplary set of such representations specific to a particular application:

Usage Histogram: For a given duration of time the total usage of the application is displayed. Displayed by time increment (1 hour). The number of active users during the increment and the percentage of actual usage are displayed.

Usage Comparison: Comparison of the usage histograms for an application corresponding to different time periods (one day vs. another, or morning vs. afternoon).

Application Usage: Information is displayed which is indicative of the average use of various application features by the monitored group of users.

Data Management Subsystem

Figure 14:
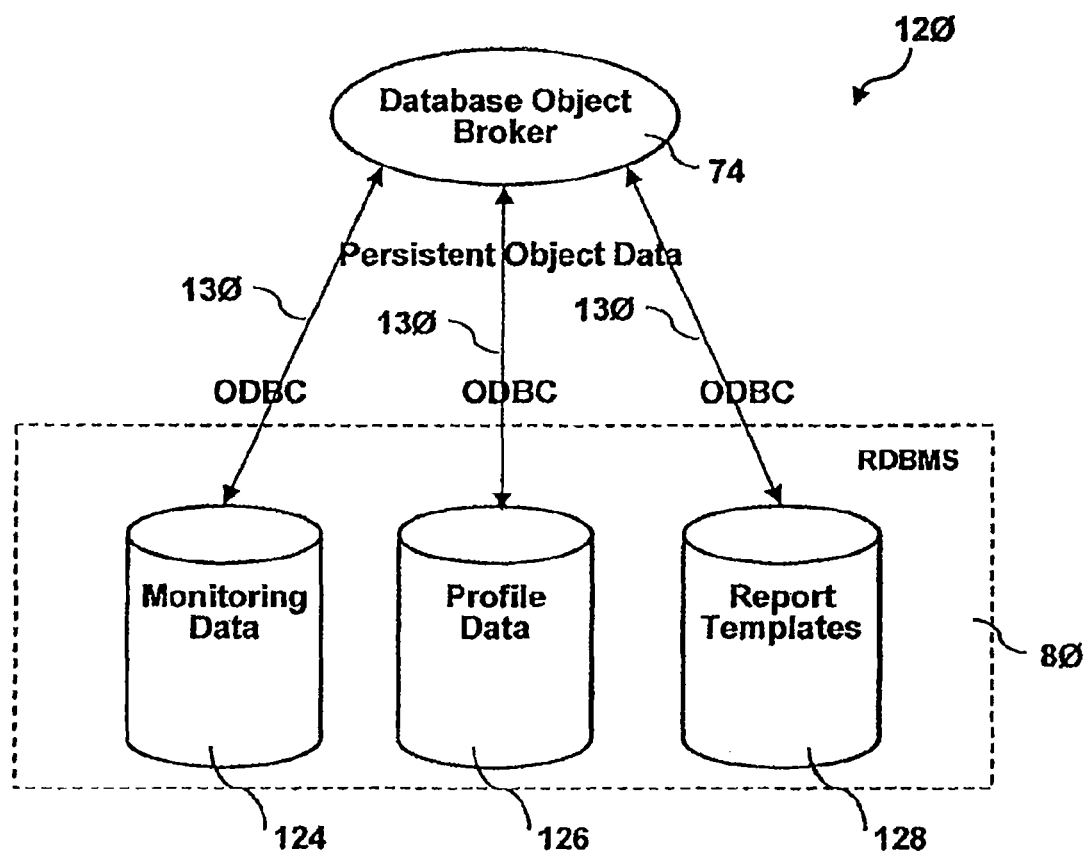
FIG. 14 shows a data management subsystem disposed to store persistent objects used by other components of the inventive data monitoring system.

Referring to FIG. 14, a data management subsystem 120 is disposed to store persistent objects used by other components of the inventive data monitoring system. The data management subsystem 120 includes the DBOB 74 and a database 80 having a schema divided into several interrelated logical sections. Specifically, the database schema 80 includes a monitoring data section 124, a profile data section 126, and a report templates section 128. The DBOB 74 is operative to access the sections of the schema 124, 126 and 128 using an ODBC interface 130, thereby allowing the DBOB 74 to remain independent of the specific implementation of the database 80.

A primary purpose of the DBOB 74 is to deliver appropriate objects to other requesting system components and to act as a common gateway for the relational database 80. In a preferred implementation a single DBOB 74 serves many instances of server module 22 20 (potentially on separate platforms), and each such DBOB is capable of accessing the database 80. This arrangement permits maximum utilization of certain finite resources, such as ODBC connectors. The interfaces of the DBOB 74 define the manner in which data within the database 80 is manipulated. In providing access to, and managing the database 80, the DBOB 74 isolates the low-level storage and methods used to access the database from the client monitoring modules 20 and other "clients" of the DBOB 74.

System Administration

Figure 15:
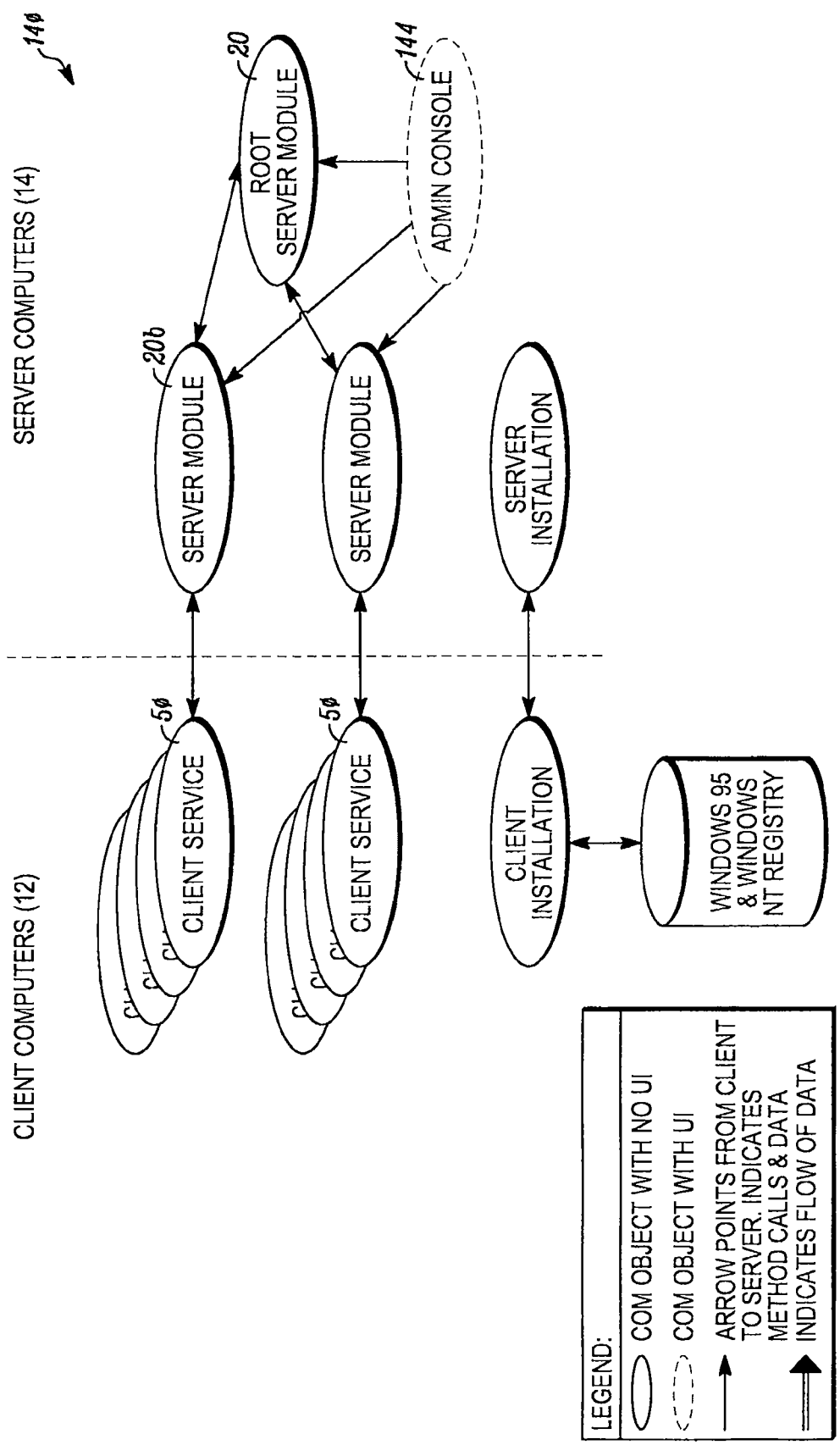
FIG. 15 provides a representation of the architecture of an exemplary implementation of a system administration subsystem of the present invention.

FIG. 15 provides a representation of the architecture of an exemplary implementation of a system administration subsystem 140 of the present invention. The system administration subsystem 140 is responsible for the central administration of the monitoring system of the present invention. It is responsible for configuration and control of the monitoring process. The subsystem 140 includes an administration console 144, preferably realized as a COM object with a user interface, installed on a particular server computer 14. These "server side" components of the subsystem 140 communicate with each other via a hierarchical arrangement of server module 22s 20, with server module 22 20a functioning as a superior server and the remaining server module 22s 20b acting as subordinate servers. This hierarchical configuration can parallel the relationship between work groups in an enterprise being monitored in order to facilitate enterprise-wide data collection and monitoring.

The administration console 144 is disposed to display an active client list, which allows the system administrator to monitor usage of the client computers 12. The administration console 144 will preferably allow a system administrator to determine if the client service 50 associated with a particular client computer 12 is installed and running. In addition, the administration console 144 is capable of causing a new monitoring profile 76 to be sent, by way of the applicable server module 22 20, to a client service 50 specified by a system administrator. The client monitoring agent 52 associated with this client service 50 then begins collecting usage data in accordance with the new profile.

Referring again to FIG. 15, the hierarchical arrangement of server module 22s 20 is intended to ensure that each server module 22 20 serves only that number of client monitoring modules capable of being adequately supported in light of the processing power of the host server machine. By configuring the servers 20b to be subordinate to the server 20a, a tree structure can be developed so as to mirror a desired parameter (e.g., network topology, business sectors, task groups). In this way management of certain "legs" of the tree can be delegated to subordinate administrators, while at the same time allowing oversight by other administrators with the requisite permission. When a hierarchical server arrangement is employed, the following operations will preferably be carried out recursively throughout the arrangement:

Start Monitoring
a Stop Monitoring
Reload Profiles
Sync clients with their server module 22
server module shutdown Flush collected monitoring data to server module
Flush client events to server module Methods of Restricting Application and Feature Usage As was discussed above, the client monitoring agent 52 generally uses one or both of two primary methods of collecting information relating to usage of application programs. In particular, a first technique involves injecting Hooks DLL into each application program that has been activated by the user. The Hooks DLLs are monitor prescribed Windows Hooks in the application programs and desktop environment so as to determine when specific user input events have been performed. In a second approach, information concerning usage of certain application programs may also be collected via Accessibility APIs. These Accessibility APIs allow more extensive information to be collected regarding usage of various application features.

The present invention also contemplates utilizing these methods of tracking application feature usage to restrict usage of application features. Advantageously, such restriction may be effected without modifying the application program in which restriction is to take place. Use of certain application features, or even access to entire application programs, can be restricted on the basis of individual user identity or group membership. As is discussed below, the ability to recognize the startup of an application program and the pending activation of an application feature via injected Windows Hooks and AppFeature DLLs provides an opportunity to restrict activation of the feature.

Figure 16:
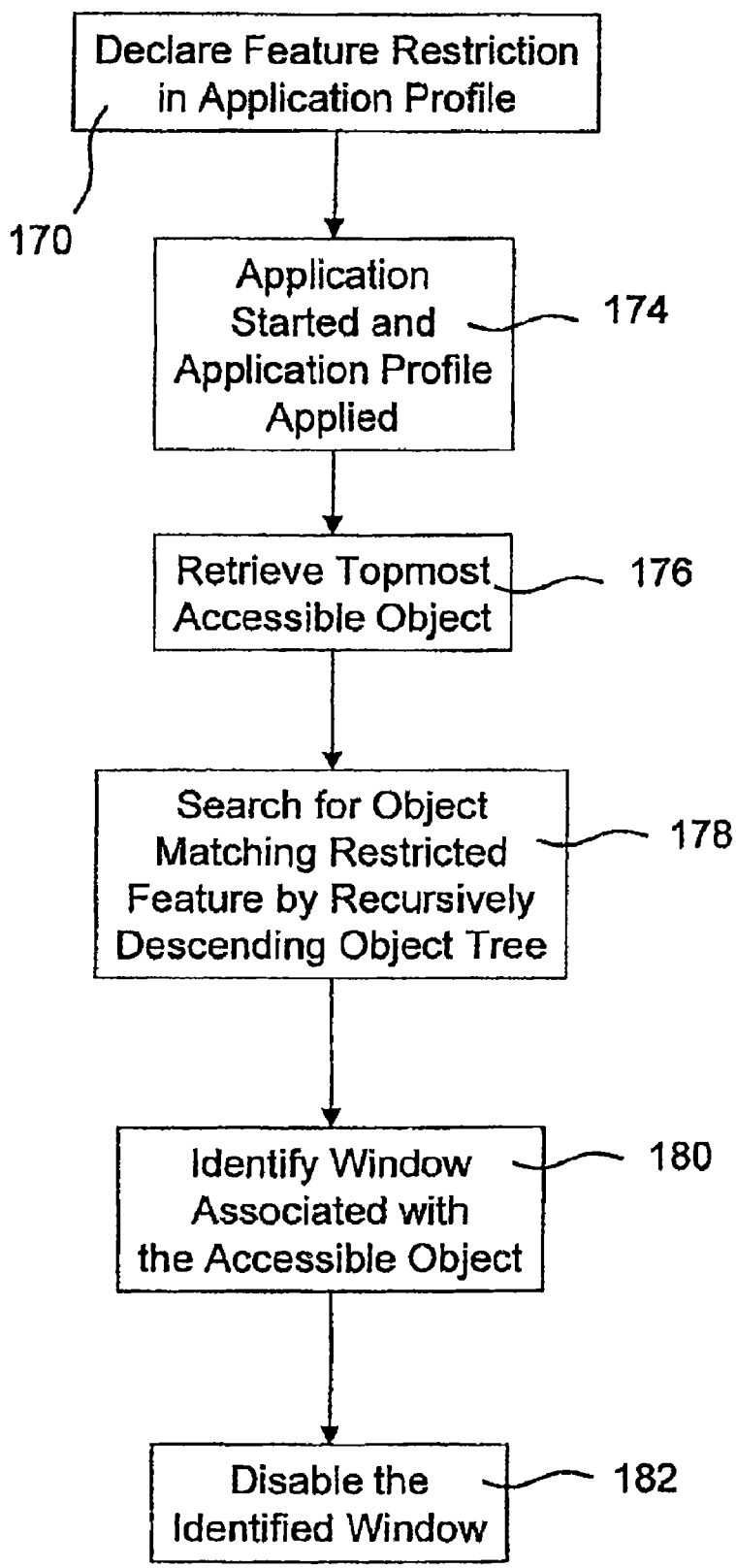
FIG. 16 is a flowchart representative of the process of restricting application feature usage in accordance with the invention.
Figure 17:
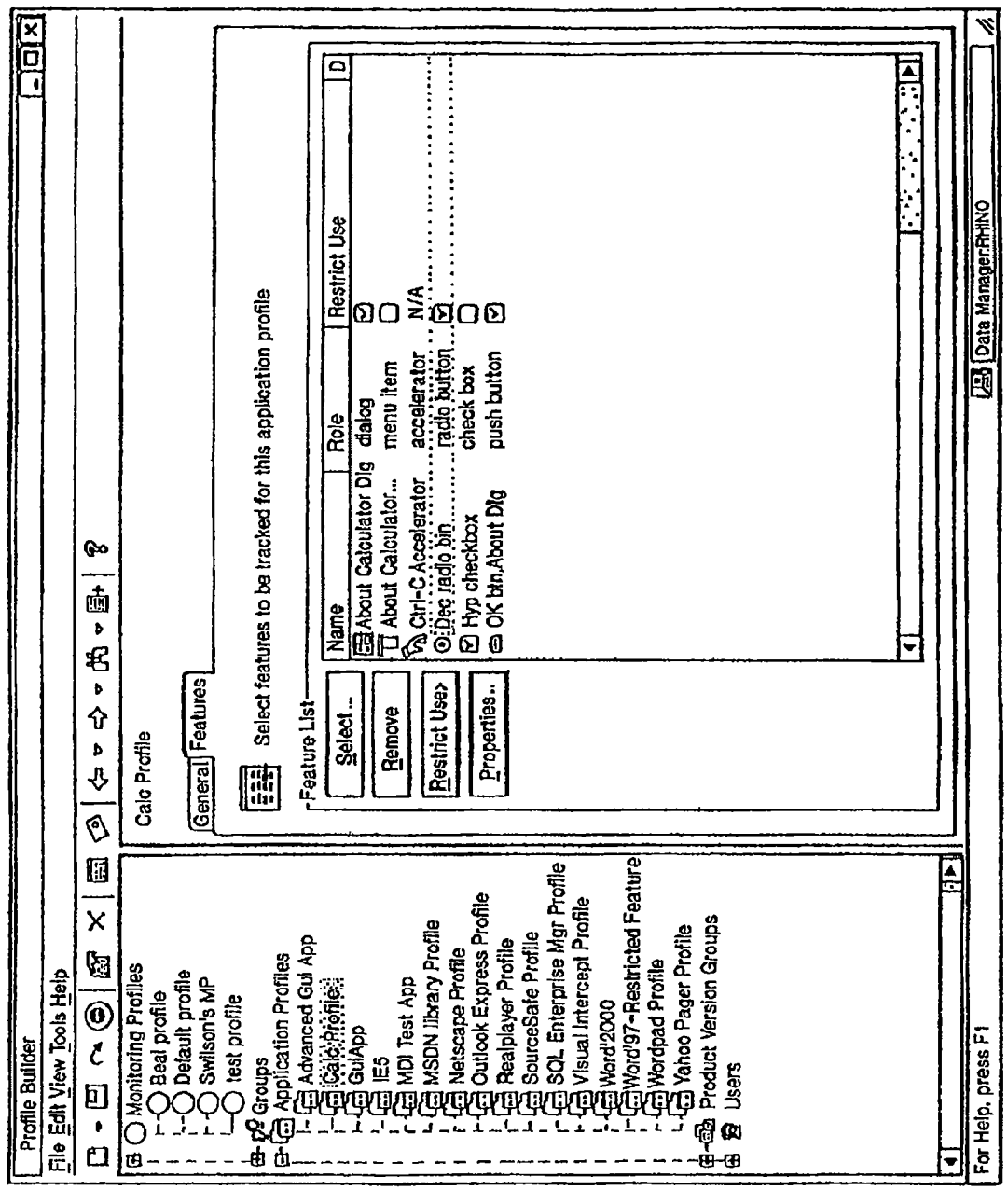
FIG. 17 depicts a view in the profile builder of an application profile containing restricted features.

FIG. 16 is a flowchart representative of the process of restricting application feature usage in accordance with the invention. In an initial step 170, one or more application features are declared by the system administrator to be restricted within the application profile applicable to the application program being monitored. This is illustrated by FIG. 17, which depicts a view in the profile builder of an application profile containing restricted features. When the application program is started, Hooks DLLs and AppFeature DLLs are injected into the running process and the applicable application profile is applied (step 174, FIG. 16). If the application profile indicates that certain features have been restricted, the window hierarchy of the running application is examined in order to identify restricted features. This identification may be effected in the same way as features specified by the application profile to be monitored are identified. Namely, a topmost Accessible Object within the available tree of Accessible Objects is obtained and evaluated to determine if it corresponds to the feature being restricted (step 176). The tree of Accessible Objects is then recursively descended until an Accessible Object is found which corresponds to the restricted feature (178). When the Accessible Object corresponding to the restricted feature is identified, the associated window-based control of the running application program is also identified (step 180). The identified control may then be disabled (step 182) using the Microsoft API call Enable Window(windowID, False). The window-based control is disabled, and the associated feature restricted, in the sense that the control is no longer capable of receiving user input (e.g., mouse clicks or keyboard entries). A control disabled in this manner typically appears "grayed-out", and cannot be activated by a user.

Usage of "transient" controls may also be restricted. Examples of transient controls are the buttons upon dialog boxes, which are created and destroyed in connection with each display of the dialog box. By trapping the user event indicating creation of a dialog, the recursive feature detection described above may be applied to disable the newly created control (i.e., the dialog box button).

Dialogs themselves, as well as other top-level windows of application programs, may also be restricted. Specifically, creation of the Accessible Object corresponding to the top-level window to be disabled is detected using Hooks DLLs as described above. This top-level window is then immediately closed and a dialog displayed indicating that use of the window is restricted. In order to avoid interfering with the timely processing of events, the dialog informing the user of the feature restriction is preferably displayed using a separate, dedicated process.

The feature restriction capability of the present invention may also be invoked to ensure that application programs permit only certain desired usage paths. Such desired usage paths may be developed by, for example, using monitoring data collected in the manner above to identify patterns of efficient usage. Once such patterns have been identified, usage of all unrelated features is restricted. Alternatively, a user could be "guided" through operations comprised of multiple steps. This is done by permitting the application program to enable only those features relevant to a current task to be completed. By limiting the set of features available during each task, the navigation of complex application programs offering many feature options may be appreciably simplified.

Monitoring User Interaction with the World Wide Web

In another aspect of the present invention, the monitoring technology described herein may be embedded in an internet browser on a client machine so as to enable tracking of user interaction with the browser. Usage data collected by the client monitoring agent incorporated within the browser would be transmitted to the location of the server module 22 via an HTTP protocol POST operation. The URL to which the data was posted could reference a Common Gateway Interface ("CGI") script disposed to read the posted monitoring data and forward it to the applicable server module 22 using the data notification scheme previously described.

A different approach may be taken to facilitate the monitoring of web-based applications built with JAVA, HTML, DHTML, Java Script, XML and the like delivered to host browsers via the world wide web (the "Web"). In this approach the client monitoring technology ("Collection Agent") is embedded within the HTML document provided to the host browser via the web. By configuring the Collection Agent as a Dynamic Link Library ("DLL") rather than as an independent executable program, its functionality can be packaged as an ActiveX Control or Netscape Plug-in or the equivalent. A reference to the control or plug-in is preferably embedded directly within the HTML document provided to the host browser. When the HTML document is fetched and rendered by the host browser, the object reference to the plug-in or control is resolved and the appropriate installation process begun. Depending on the current security settings in use on the client machine, the user may be unaware that a Collection Agent in the form of an ActiveX control has been installed. However, installation Collection Agents realized as certain types of plug-ins (e.g., a Netscape Plug-in) causes generation of a dialog allowing the plug-in to be accepted or rejected. An exemplary sample of HTML source containing a reference to an embedded ActiveX control is provided below:

```
<p>
<object ID="MakeLogin" WIDTH="249" HEIGHT="130"
CLASSID="CLSID:590669BA-3431-11D2-BEBB-60505AC
10000"          CODEBASE="http://www.A-
SoftTech.com/ActiveX/ASoftMakeLogin.CAB#version= 1,0,0,5 ">
  </object>
</p>
```

By embedding reference to a Collection Agent only within Web pages desired to be monitored, targeted monitoring of specific Web pages may be effected without undertaking a mass installation of monitoring software within each individual client. The targeted monitoring of Web pages via a downloaded Collection Agent is of significant potential value to entities engaged in "e-commerce" and "e-business". For example, an installed Collection Agent can provide nearly instantaneous feedback concerning the manner in which visitors interact with the applicable site. Such feedback may indicate: (i) whether users encountered any difficulties in utilizing the site, (ii) whether users hesitated while performing a given process or task, (iii) whether users abandoned an operation or task, (iv) to what sites users go upon leaving the monitored site, and (v) the manner in which users leave the site (e.g., via advertisement selection, other URL, text typed in the GOTO box, etc.). Information of this type is generally incapable of being derived from the logs conventionally maintained by web servers. These logs typically include information relating only to requests for, and postings of, documents.

Usage data collected by the Collection Agent may be provided to a server module 22 as described above. That is, the usage data would be transmitted to the location of the server module 22 via an HTTP protocol POST operation. A CGI script at the URL to which the data is posted would then read the posted monitoring data and forward it to the applicable server module 22 as previously described.

In accordance with another aspect of the present invention and as is more fully described herein, user interaction with the world wide web is tracked via monitoring mechanisms embedded within web pages downloaded to the user's browser. The web pages provided to the user's browser are preferably modified at the server to include scripting functions disposed to gather events and otherwise measure user activity while the web page is active on the client browser. Measured information may then be provided back to the server through one of several mechanisms, including hidden form fields and encoded URLs. Alternatively, a Java applet may be utilized to convey measurement information to the applicable server. In a preferred implementation the monitoring scripts are embedded within web pages using the JavaScript scripting language. Since JavaScript can be embedded within the page itself in text form, this implementation advantageously tends to have little or no impact on the time required to download web pages. In addition, JavaScript possesses built-in features for accessing all of the components of a web page and interacting with them. This concept is more completely described in the section below entitled "Document Object Model (DOM)". Finally, unlike an ActiveX control or Netscape plugin, JavaScript isn't able to interact with a user's desktop or files system. This characteristic of JavaScript may address the concerns of certain users with regard to the activation of monitoring mechanisms on their respective client machines.

Using an application similar to the profile builder 72 described above, a monitoring profile is generated designating which features should be tracked and which measures are of particular interest. The monitoring profile is then used to "instrument" (i.e., add JavaScript instructions to) the web page documents with which the user will interact. This instrumentation of web pages is performed independently of the content development process, and can even be effected in real time as the page is transmitted to a requester. The only corresponding instrumentation required at the server is incorporation of the applicable monitoring script in the page just after the <BODY> tag and in the page header. The general format of a web page instrumented in accordance with the present invention is set forth below:

```
<BODY BGCOLOR=blanchedalmond topMargin=50>
<SCRIPT LANGUAGE="JavaScript">
window.onload = startmonitor;
</SCRIPT>
```

An example given below describes the adding of the onload property to the document in order to complete the instrumentation and start the monitoring of a web page.

In cases where the web pages to be instrumented are dynamically constructed via CGI execution or completion of a document template by way of a data base query, the instrumentation will often be integrated into the server setup and web page construction process at the applicable web site. This integration of instrumentation into each web page may be straightforwardly effected by using the "server side include" operations currently supported by nearly all commercial web servers. Such operations allow a reference to a document to be embedded in other documents. When a document is served to a client the reference is resolved and additional content written from the other document is incorporated within the data stream provided to the client. This avoids the necessity of issuing secondary requests from the client to fetch the contents of the reference.

Transmitting the feature activations collected by an instrumented web page to the applicable server via the Internet poses several problems. First, in order to ensure passage through intervening infrastructure (e.g., firewalls and routers), the connection must be made on an open port. One approach to ensuring such passage is to use port 80, the HTTP protocol port. However, actually sending the data through this port is complicated by the fact that JavaScript does not possess any network privileges. Accordingly, a JavaScript instruction cannot simply open a socket connection to the data host on port 80 and transmit the data using the PUT operation of the HTTP protocol. Although the script could control an applet for creating the socket, applets are limited to establishing connections only to the server from which they were downloaded. In addition, the time required to download an applet also makes this solution unattractive. Instead, in a preferred embodiment two indirect means of data transmission using JavaScript are contemplated; namely, transmission via "cookies" and "hidden FORM fields".

Cookies are often used to give the illusion of persistence over the connectionless and stateless HTTP protocol. They were originally created to support CGI programming and are implemented as an extension to the HTTP protocol. The data in cookies is automatically transmitted between the browser and the HTTP server without the knowledge of the user. As is described further below, a cookie consists of a named value and four optional properties for controlling the lifetime, visibility and security of the cookie. The cookies associated with a particular page are made available to JavaScript through the cookie property of the document object.

Transmittal of monitoring data can also be performed using what is commonly referred to as a "hidden FORM". Such a hidden FORM is constructed using elements of a FORM defined with <INPUT TYPE=hidden>, which are not visible to the user. A FORM containing a single hidden element can be used to transmit data to a server without altering the appearance of the web page in which it is embedded. A simple example of a hidden FORM is shown below:

```
<FORM NAME=myform ACTION="/cgi-bin/nputdata.pl"
METHOD=GET>
<INPUT TYPE=hidden NAME="mydata">
</FORM>
```

A script may refer to the data item as myform.mydata and set the value to a string containing a compressed stream of monitoring data. The METHOD tag in the form definition controls whether the data is sent to the server appended to the ACTION URL (GET) or sent in the body of the HTTP request (POST). Examples are provided blow expressed in HTTP protocol notation.

```
GET http://www.limesoft.com/cgi-bin/nputdata.pl?mydata=<data>
HTTP/1.1
POST http://www.limesoft.com/cgi-bin/nputdata.pl HTTP/1.1
....[additional header entries here]
mydata=<data>
```

The "hidden FORM" approach to data transmission has certain advantages relative to data transmission using cookies. For example, in the hidden FORM approach the instrumenting script enables control over precisely when data is sent. Specifically, the data may be sent to the server at any time by invoking the submit( ) method of the FORM. This is significant since it is preferable to send monitoring data to the server during times when the user is not initiating any other server requests in order to avoid the impression of degraded performance. The data should preferably be sent during periods of inactivity (e.g., when a user pauses to view text or images after a document is loaded).

Real-Time User Help

Usage data collected by a Collection Agent or client monitoring agent can form the basis for providing essentially real-time assistance to end users. This may be effected by passing usage data through a structure (e.g., a decision tree or similar model) designed to detect situations where a user is in need of assistance. User behavior evidencing long pauses in certain fields, rapid switching among fields, repeated changing of control values, or aimless searching for features are likely indicators of user distress. Under such conditions a short list of subjects related to a best guess at the user's intention would be created and provided to the user. The user would have the opportunity to select an intention from the list, and optionally could indicate that operations associated with the selected intention be automatically carried out.

Since in certain implementations the collected usage data may only be intermittently reported to a server module 22, the above analysis may be conducted at the client In order to enable real-time assistance to be provided continuously. The module responsible for delivering such functionality ("Help Module") is preferably implemented as an adjunct to the standard client monitoring agent. The Help Module informs the client monitoring agent of the data items needed to discern a user's action/inaction as it occurs. The Help Module need not be highly integrated with the client monitoring agent, and may simply be disposed to receive a stream of specified data items.

Profile Management: Client Side Components

Figure 18:
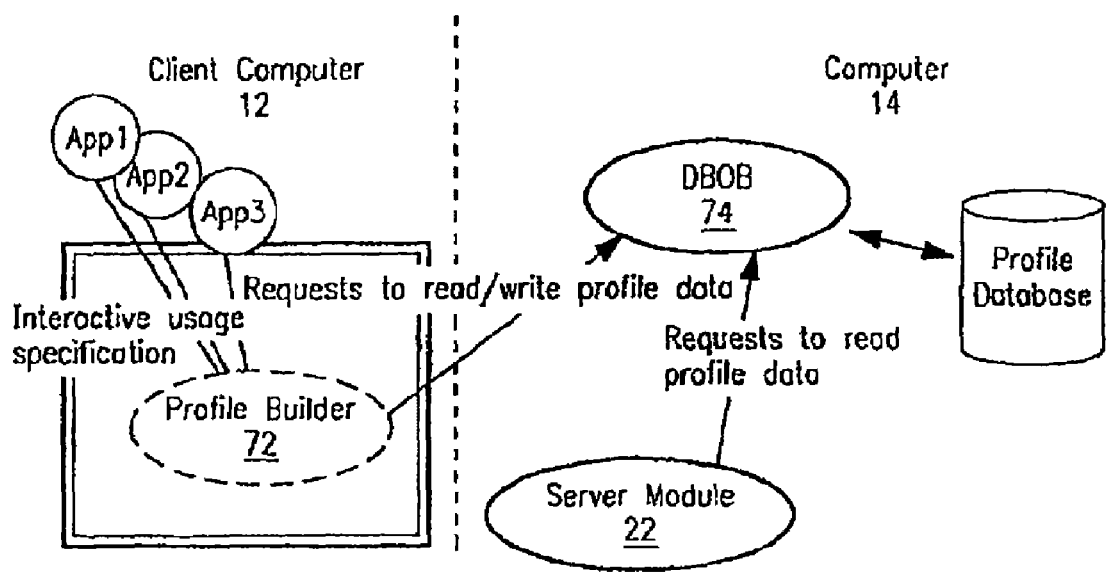
FIG. 18 illustratively represents a profile builder as included within a profile and user management subsystem.

FIG. 18 illustratively represents the profile builder 72 as included within the profile and user management subsystem 70. The profile builder 72 preferably (i) creates and manages the Profile Data Objects and their relationships, and (ii) provides an interactive means to create Application Profiles. The profile builder 72 builds Application Profiles by "pointing and clicking" within the running application to specify features to track. The profile builder 72 is preferably packaged as a Win32 based application.

Figure 19:
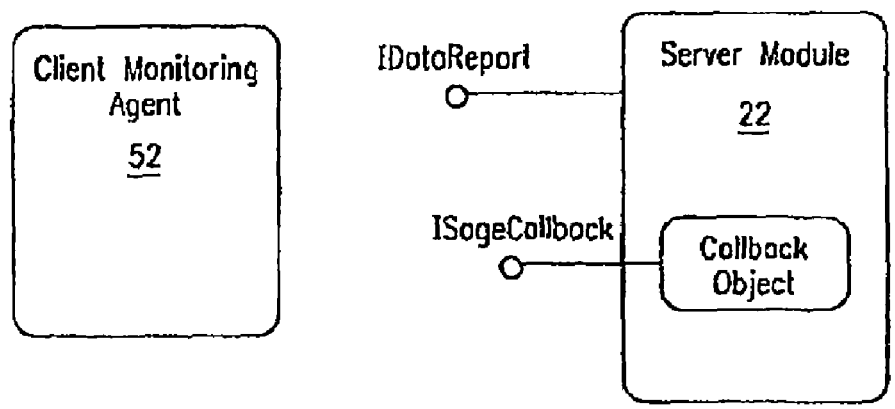
FIG. 19 depicts five main object types managed by the profile builder via its user interface.
Figure 20:
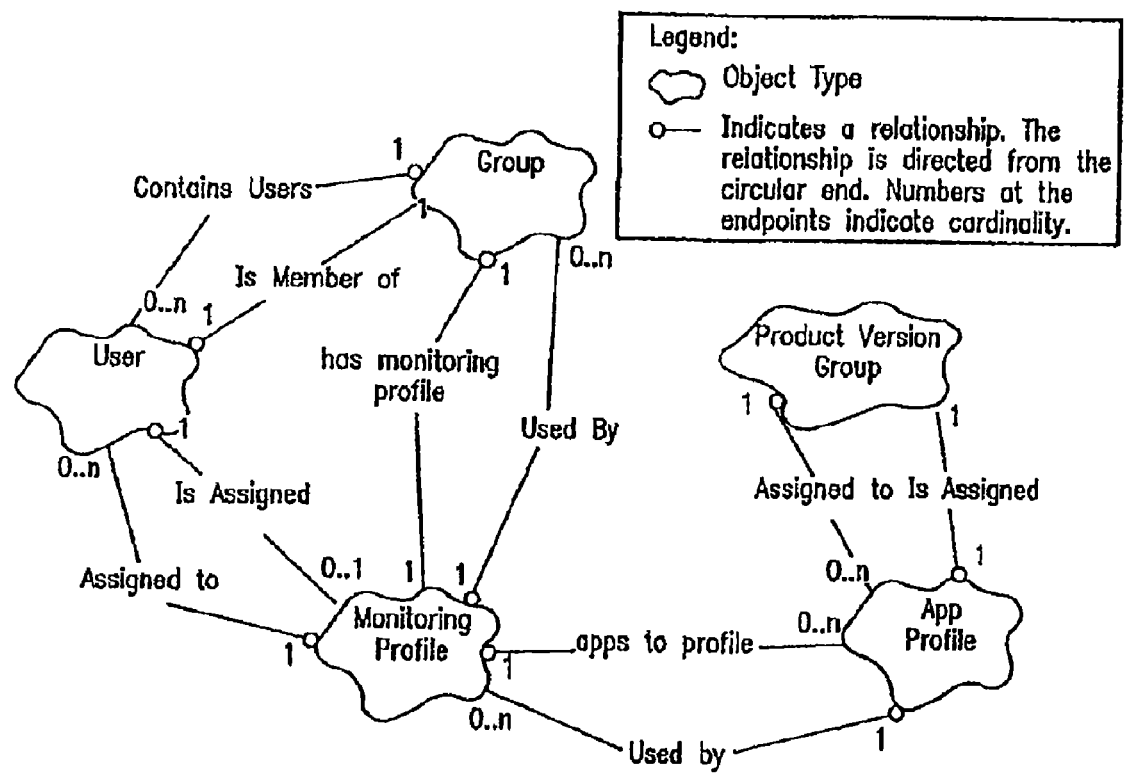
FIG. 20 is a class diagram representative of certain objects, and the relationships there between, managed by administrative users.

The profile builder 72 manages five main object types via its user interface (FIG. 19): (i) Users, (ii) Groups, (iii) Monitoring Profiles, (iv) Application Profiles, and (v) Product Version Groups. Administrative users (simply referred to as users throughout the rest of this section) will need to manage individual objects and also their relationships. The class diagram of FIG. 20 illustrates these objects and their relationships. From within the Profile builder, users can navigate the objects that populate the database 80 using the primary tree view (FIG. 21). Selected items are displayed on the right side of the user interface.

The profile builder 72 supports different views of the database 80. The view displayed is dependent on the type of object selected in the tree view. Selection of a root node in the tree view will present a list of all items contained beneath that node. In the "User's view" of FIG. 21, the root level group object has been selected by a user, with the appropriate view displayed on the right. Similar list views for each of the profile object types are obtained via user selection of the corresponding root node. Selection of a non-root node profile object will display the specific properties for that object.

From within the User's view, a system administrator is able to do the following: (i) modify the name of the user, (ii) modify the user's group, and (iii) explicitly assign the user's monitoring profile. This will result in overriding of the monitoring profile obtained through the user's group.

Figure 22:
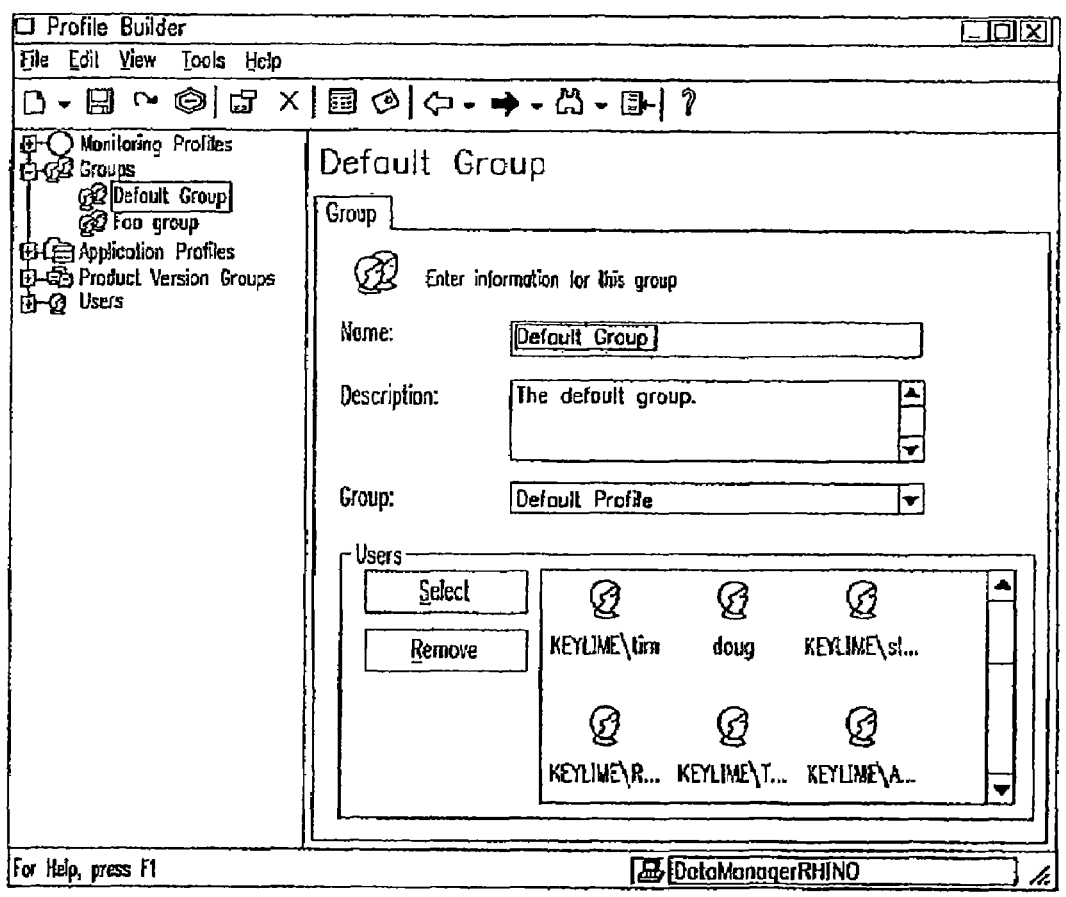
FIG. 22 illustratively represents the view afforded through selection of a "Group" tab of the user interface for the profile builder.

FIG. 22 illustratively represents the view afforded through selection of a "Group" tab of the user interface for the profile builder 72. The following operations are available upon such selection of the Group tab: (i) modification of a Group's name, (ii) add or remove users from a Group, and (iii) assign the monitoring profile for the Group.

Figure 23:
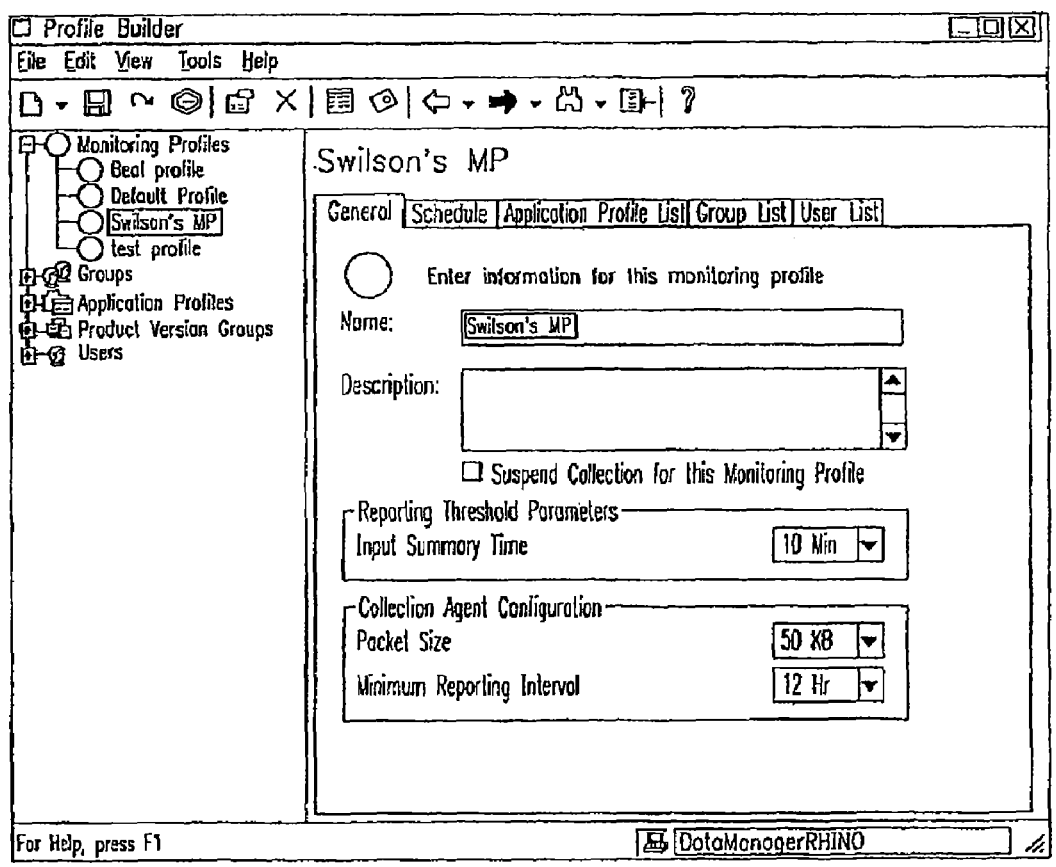
FIG. 23 depicts the view available through selection of a "Monitoring Profile" tab of the user interface for the profile builder.

FIG. 23 depicts the view available through selection of a "Monitoring Profile" tab of the user interface for the profile builder 72. Such selection of the Monitoring Profile tab enables performance of the following operations: (i) modification of a Monitoring Profile's name, (ii) modification of reporting information for the Monitoring Profile, (iii) addition or removal of Application Profiles from a Monitoring Profile, (iv) explicit assignment of users to a Monitoring Profile, and (v) assignment of groups to the Monitoring Profile. As is indicated by FIG. 23, the Monitoring Profile view utilizes five property pages to perform the functions listed above: General, Application Profile List, Group List, User List, and Subnet Mapping Profile List.

Figure 24:
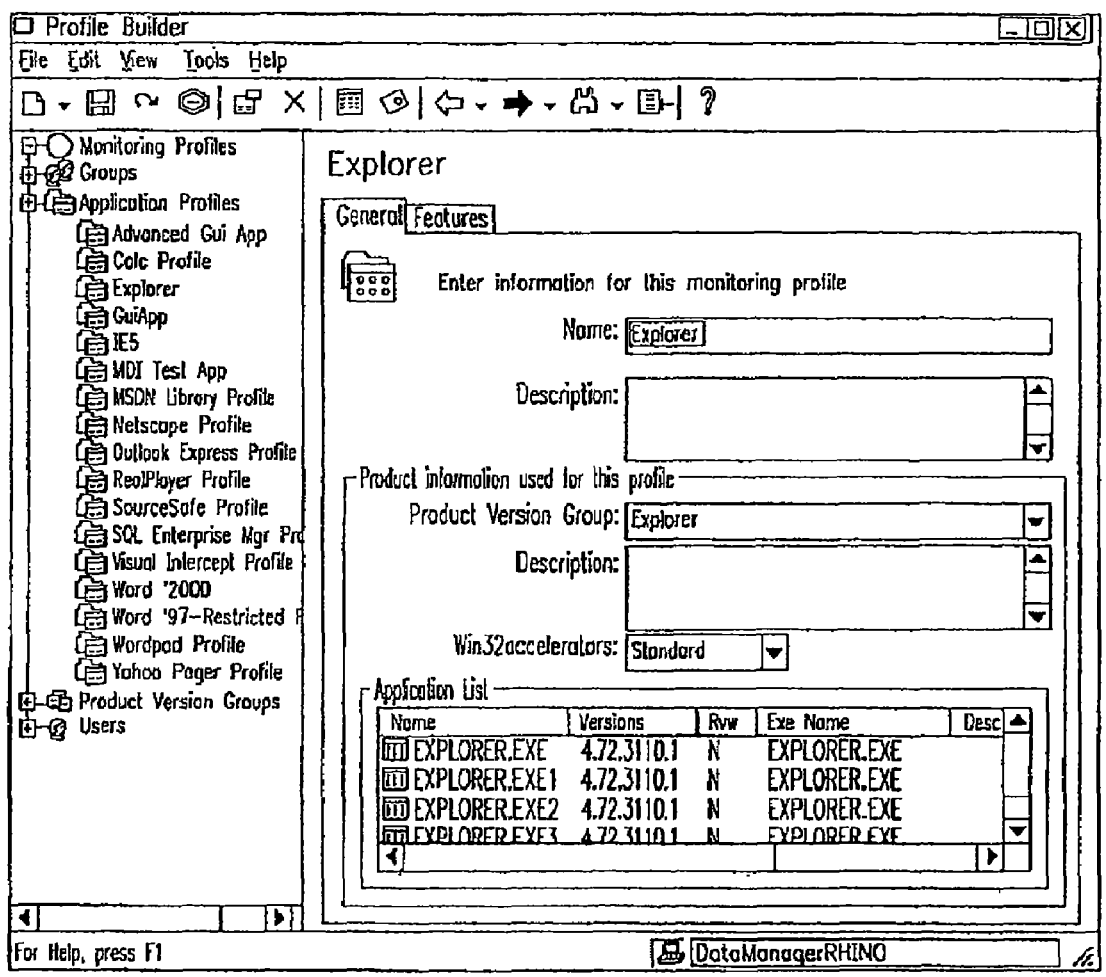
FIG. 24 illustratively represents the contents of an "Application Profiles" view obtained through selection of an Application Profile tab of the user interface for the profile builder.

FIG. 24 illustratively represents the contents of an "Application Profiles" view obtained through selection of an Application Profile tab of the user interface for the profile builder 72. Selection of this tab enables: (i) modification of the name of an Application Profile, (ii) assignment of the specific application upon which the profile is based, and (iii) addition/removal of features to an Application Profile.

Figure 25:
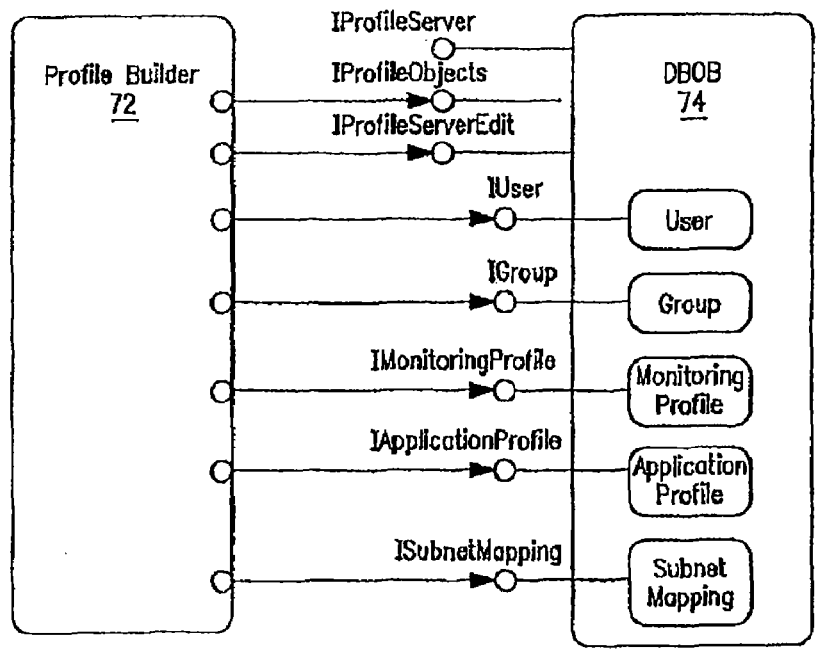
FIG. 25 depicts various interfaces of the database object broker used to access and manage profile data.

The profile builder 72 makes use of the database object broker 74 to manipulate profile database objects. FIG. 25 depicts various interfaces of the database object broker 74 used to access and manage profile data. Referring to FIG. 25, the profile builder 72 accesses the actual monitoring profile objects via the IProfileObjects interface. The accesses typically result in enumerated lists of interfaces to specific profile data objects. The database object broker 74 holds and maintains these objects, constructing the objects from data contained in the profile database system. The profile builder 72 uses the interface to pull information from the object This also supports changing the object's attributes, since the database object broker 74 maintains independent copies of the objects for each profile builder.

Referring again to FIG. 25, the IProfileserver moduleEdit interface is used to commit changes to the monitoring profile objects to the Profile Database. The commit is performed as a database transaction, which serializes the update of the appropriate tables in the database. The database management system is responsible for coordinating multiple accesses to the Profile Database.

The database object broker 74 manages the persistence of, and relationships between, several types of objects stored in the Profile database:
  Users
  Groups
  Monitoring Profiles
  Application Profiles
  Subnet Mappings
  Product Version Groups Clients of the database object broker 74 will generally interact with objects that are "owned" by the database object broker 74. Furthermore, these clients will normally be operating on remote machines. The interfaces of the database object broker 74 will preferably be crafted to allow remote clients to manipulate the objects as efficiently as possible. Nonetheless, the database object broker 74 operates to protect the internal integrity of the Profile Database at all times.

All profile data is preferably housed in the Profile Database. The Profile Database is typically implemented using a relational database. Part of the task of the database object broker 74 is to store the various profile objects (User, Groups, Monitoring Profiles and Application Profiles) to the Profile Database. This generally requires the database object broker 74 to be capable of translating between relational table rows and COM or C++ objects. The database object broker 74 preferably uses ODBC to access the Profile Database.

Figure 26:
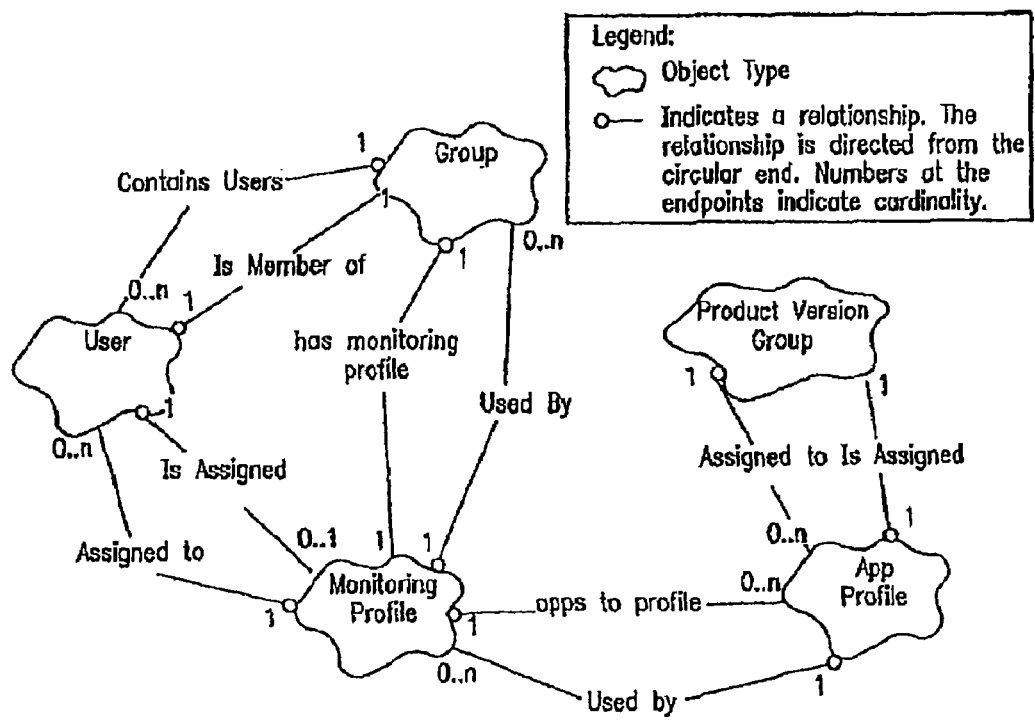
FIG. 26 represents the relationships between various objects included within an exemplary implementation of a profile database.

FIG. 26 represents the relationships between various objects included within an exemplary implementation of the Profile Database. Each object is directly or indirectly related to the others, and each inter-object relationship is bi-directional. Some relationships are optional as indicated by a cardinality of 0 at either end. The following relationships have non-zero cardinality at both ends greater and are required in the exemplary implementation:

(1) Each User must be a member of a Group;
(2) Each Group must have a Monitoring Profile; and
(3) Each Application Profile must be assigned a Product Version Group.

The relationships depicted in FIG. 26 are further described in Table I.

TABLE V

| Relationship | Description |
| --- | --- |
| User and Group | Each User must be a member of one and only one Group. This relationship is mandatory. A user cannot exist without being a member of a Group. Each Group contains from zero to n users. In this direction, the relationship is optional; A Group can exist independent of Users.<br>These rules dictate that when the user's Group is deleted, the user must be deleted (or moved to another Group) to ensure database integrity. |
| User and Monitoring Profile | Each user can optionally have a Monitoring Profile. This relationship is optional. If a user does have a specific Monitoring Profile, it overrides the profile the user has by-virtue of its Group association. |
| Group and Monitoring Profile | Each Group must have exactly one Monitoring Profile. The relationship is mandatory. A Group cannot exist without a Monitoring Profile. Note however, that not all Monitoring Profiles need have a Group. A Monitoring Profile exists independent of a Group. |
| Application Profile and Product Version Group | Each Application Profile must be associated with a Product Version Group Group. The PVG contains the master set of features available for tracking via this Application Profile. |

The Profile Database typically includes two "Default" objects: (i) Default Group, and (ii) Default Monitoring Profile. In a preferred implementation of the Profile Database these objects always exist and cannot be deleted or re-named. These objects allow database integrity rules to be followed without forcing cascaded deletes during certain object deletion operations. When a group object is deleted, integrity rules dictate that the users assigned to the group must be deleted also. However, with the introduction of the Default Group it is possible to (optionally) re-assign the users to the Default Group rather than delete them.

The Default Monitoring Profile works similarly. Database integrity rules dictate that when a monitoring profile is deleted, the delete must cascade to groups using the monitoring profile, since groups are required to have a monitoring profile. With the introduction of the Default Monitoring Profile object, it is possible to (optionally) re-assign these groups to the Default Monitoring Profile, rather than deleting them.

Figure 27:
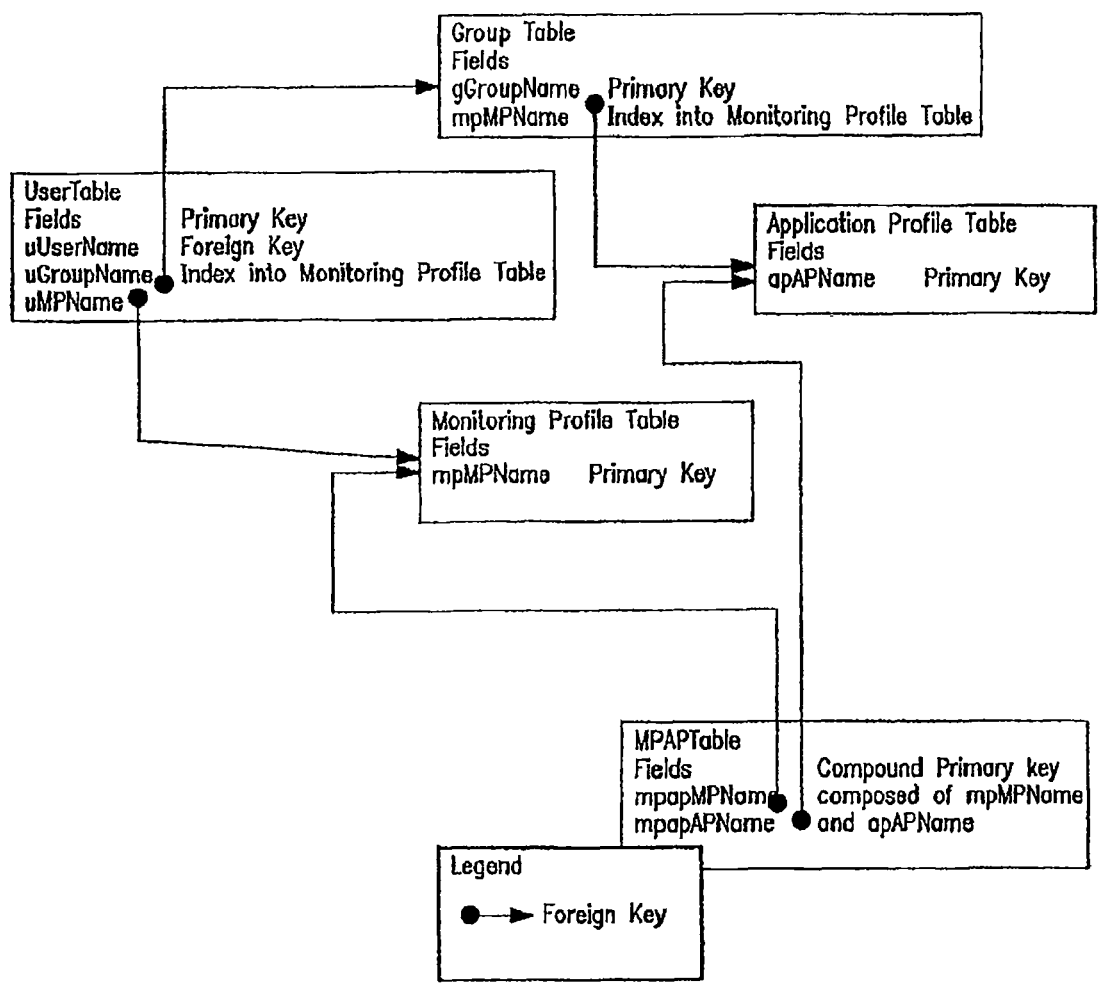
FIG. 27 illustratively represents an exemplary Monitoring Profile Database Schema.

FIG. 27 illustratively represents an exemplary Monitoring Profile Database Schema. Only the primary key fields, foreign key fields and other key fields are depicted in FIG. 27. The schema of FIG. 27 supports all the relationships involving the Monitoring Profile Database described above.

Table VI describes an exemplary set of default responses to error results from COM interface methods used by the profile builder 72. Certain exceptions to these responses are described on a per method basis in the tables that follow.

TABLE VI

| HRESULT Classes | Default Error Response |
|---|---|
| E_FAIL | |
| E_NOCOM | |
| E_FAULT | |

Table VII describes the responses of profile builders 72 to error results from the implementation of the IProfileObjects interface through the database object broker 74.

TABLE VII

| IProfileObjects Method | Error Response |
|---|---|
| EnumUsers( ) | E_FAIL - |
| | E_NOCOM - |
| | E_FAULT - |
| EnumGroups( ) | E_FAIL - |
| | E_NOCOM - |
| | E_FAULT - |
| EnumMonProfiles( ) | E_FAIL - |
| | E_NOCOM - |
| | E_FAULT - |
| EnumAppProfiles( ) | E_FAIL - |
| | E_NOCOM - |
| | E_FAULT - |
| EnumSubnetMappings( ) | E_FAIL - |
| | E_NOCOM - |
| | E_FAULT - |

Table VIII describes the responses of profile builders 72 to error results from the implementation of the IProfileserver moduleEdit interface through the database object broker 74.

TABLE VIII

| IProfileserver moduleEdit Method | Error Response |
|---|---|
| NewMonitoringProfile( ) | E_FAIL - |
| | E_NOCOM - |
| | E_FAULT - |
| DeleteMonitoringProfile( ) | E_FAIL - |
| | E_NOCOM - |
| | E_FAULT - |
| EditMonitoringProfile( ) | E_FAIL - |
| | E_NOCOM - |
| | E_FAULT - |
| NewApplicationProfile( ) | E_FAIL - |
| | E_NOCOM - |
| | E_FAULT - |
| DeleteApplicationProfile( ) | E_FAIL - |
| | E_NOCOM - |
| | E_FAULT - |
| EditApplicationProfile( ) | E_FAIL - |
| | E_NOCOM - |
| | E_FAULT - |
| NewGroup( ) | E_FAIL - |
| | E_NOCOM - |
| | E_FAULT - |
| DeleteGroup ( ) | E_FAIL - |
| | E_NOCOM - |
| | E_FAULT - |
| EditGroup ( ) | E_FAIL - |
| | E_NOCOM - |
| | E_FAULT - |
| NewUser( ) | E_FAIL - |
| | E_NOCOM - |
| | E_FAULT - |
| DeleteUser ( ) | E_FAIL - |
| | E_NOCOM - |
| | E_FAULT - |
| EditUser( ) | E_FAIL - |
| | E_NOCOM - |
| | E_FAULT - |

TABLE VIII-continued

| IProfileserver moduleEdit Method | Error Response |
|---|---|
| NewSubnetMapping( ) | E_FAIL - |
| | E_NOCOM - |
| | E_FAULT - |
| DeleteSubnetMapping( ) | E_FAIL - |
| | E_NOCOM - |
| | E_FAULT - |
| EditSubnetMapping( ) | E_FAIL - |
| | E_NOCOM - |
| | E_FAULT- |

Profile Management: Server Module Side Components

The server side components most directly associated with the Profile Management Subsystem are the database object broker 74 and the profile database 72. It is one of the primary tasks of the database object broker 74 to provide access to profile data for both Profile Management and Monitoring. In addition, the Profile Monitoring Objects created and edited by the profile builder 72 are stored in the Profile Database via interfaces of the database object broker 74.

User Monitoring: Client Side Components

Client Service

Figure 28:
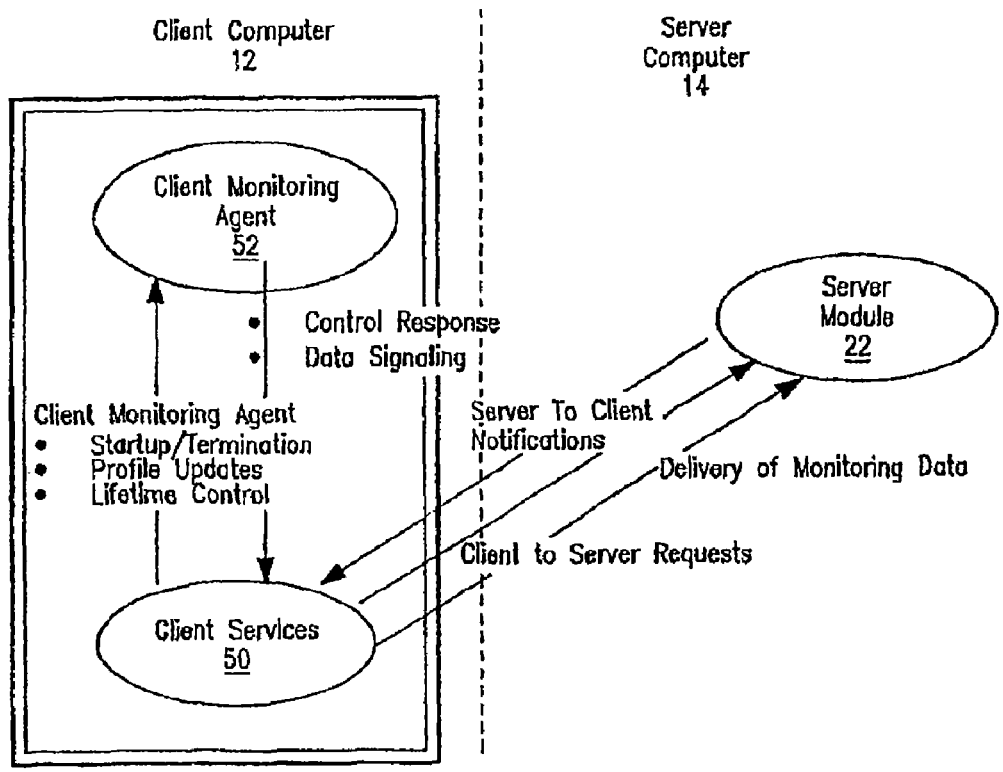
FIG. 28 illustratively represent the Monitoring Software components disposed to execute on client machines.

FIG. 28 illustratively represent the Monitoring Software components which execute on client machines 12. The client service 50 is a Window95 or NT service that is always running on the applicable client machine 12. It monitors the applicable client machine 12 for user logon and logoff events. At logon events, it will take action to retrieve a user's monitoring profile and start up a client monitoring agent for that user. When a logoff event occurs, it will shutdown the client monitoring agent for that user and notifies the server. The client service 50 is implemented as a service that is perpetually available on the client. It is not itself a COM component that is managed by the COM. However, the client service 50 is "COM-enabled", meaning that it communicates with the client monitoring agent and the server module 22 through COM interface pointers. The client service 50 creates a COM object to allow the server module 22 to communicate with it via COM interface pointers.

Figure 29:
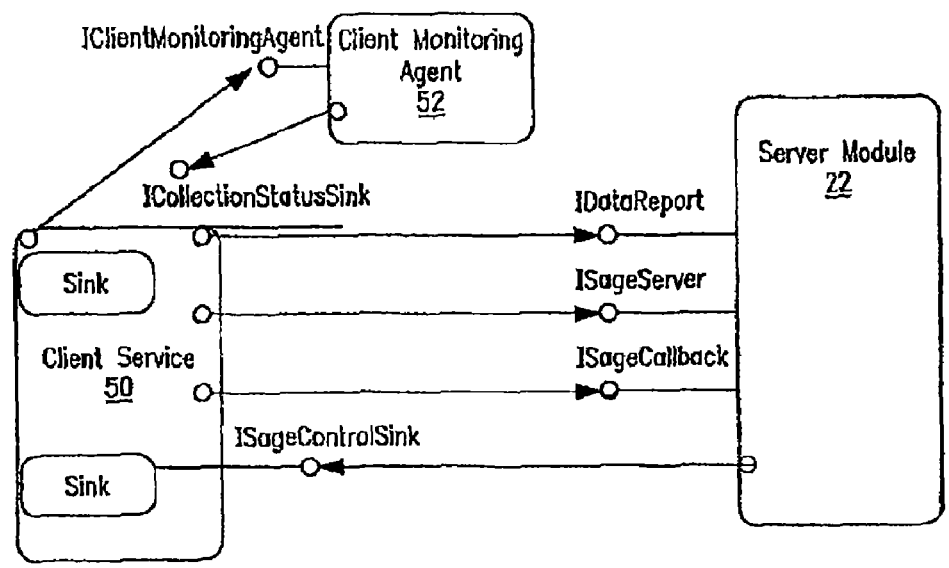
FIG. 29 illustrates the interaction between a client service 50, a server module and a client monitoring agent.

FIG. 29 illustrates the interaction between the client service 50 and the server module 22 and client monitoring agent. Since each of these objects are COM-enabled, their relationship may be completely characterized through description of their respective interfaces. The client service 50 uses ISageserver module on the server module 22 to logon and logoff the server module 22 and request profiles for the user that has logged on. The logon to the server module 22 corresponds to the user logon to the client so that the monitoring is specific to the user on the particular client desktop. The client service 50 implements the ISageControlSink as the control interface for outgoing notifications from the server module 22. Using the server module 22's ISageCallback interface, the client service 50 registers its IsageControlSink interface to a "Sink" COM object to receive these notifications from the server module 22. The control sink is created when the client service 50 first logs on to the server module 22.

The client service 50 uses the IClientMonitoringAgent interface of the client monitoring agent to initialize and control the monitoring agent. Commands received via the ISageControlSink are passed through to the client monitoring agent. These include Suspend/Resume Data Collection and Profile Update commands. Also the client service 50 will synchronize the client monitoring agent before logging off to ensure that all data has been sent to the server module. When the client monitoring agent is initialized it is handed a pointer to the ICollectionStatusSink interface of the client service 50. The client monitoring agent uses this interface to provide feedback to the client service 50 regarding its state as well as to signal the client service 50 when data is ready for transmission to the server module 22.

The foregoing discussion describes the monitoring system in a fully connected and steady state mode of operation. As is described below, other relationships between the components of the monitoring system are established during initialization and termination of such operation. In a preferred implementation the client Service executes on the Client continuously, even in the event that a user is not logged onto the client. The client service 50 watches for certain events in order to initiate a conversation with the server module 22. Table IX describes the operations performed by the client service 50 in response to certain events:

TABLE IX

| Event | Actions Taken by the client service 50 |
|---|---|
| User Login | 1. Connect to server module 22 telling it who logged in.<br>2. Retrieve from the server module 22 the appropriate monitoring profile.<br>3. Start up a client monitoring agent, passing the client the relevant profiling information and the ICollectionStatus sink of the client service 50.<br>4. Sign up as a listener on the appropriate server module 22's outgoing interfaces.<br>Notice that prior to the user login, the client service 50 had no connection to the server module 22. An assumption of this model is that if there is no user logged in on a client, there is no information to be collected, thus no communication between client service 50 and server module 22.<br>For a multiuser terminal server where more than one user can log on, the above sequence is modified. If another user has logged on to the client such that a connection has already been made to the server, then the last step (4) is not necessary. |
| User Logoff | 1. Resign as a listener on all server module 22's outgoing interfaces.<br>2. Shutdown the client monitoring agent (if one is running). The client will pass any buffered information to the server module 22 as part of its shutdown sequence.<br>3. Disconnect from the server module 22. As part of the disconnection the client service 50 will tell the server module 22 of the logoff event.<br>4. Watch for the next login event.<br>Again this sequence assumes that only one user has logged on and is now logging off. In multiuser client environments, steps 1 and 3 are performed only when the last user has logged off. |

In addition to watching for system events (in order to notify the server module 22), the client service 50 listens to the server module 22's outgoing commands via the callback registry. The notifications possible, along with the client service 50's response, are described in Table X. These notifications can only occur while the client service 50 is listening to the server module 22, which implies that at least one user has logged on.

TABLE X

| Server Module to Client Service Notification | Notification Meaning And Actions Taken by the Client Service |
|---|---|
| Reread Profile | This informs the client service 50 that the profile currently in use by the client monitoring agent has been updated, and must be re-read from the server module 22.<br>In response to this notification, the client service 50 must:<br>1. Request an updated profile from the server module 22.<br>2. Pass the updated profile to the client monitoring agent. |
| Suspend Data Reporting | This informs the client service 50 that the server module 22 has determined that it would like the client monitoring agent associated with this client service 50 to stop reporting data for the time being.<br>In response to this notification, the client service 50 must:<br>1. Tell the client monitoring agent to stop reporting, and furthermore to stop all data collection. The client monitoring agent will stop all monitoring and collection activities. |
| Resume Data Reporting | This informs the client service 50 that the server module 22 would like to resume data reporting. This notification only makes sense when paired with a Suspend Data Reporting notification.<br>In response to this notification, the client service 50 must:<br>1. Tell the client monitoring agent to resume reporting. |

TABLE X-continued

| Server Module to Client Service Notification | Notification Meaning And Actions Taken by the Client Service |
|---|---|
| Synchronize | This informs the client service 50 to flush cached monitoring data to the server.<br>In response to this notification, the client service 50 must:<br>1. Tell the client monitoring agent to immediately flush any cached data to the server module 22. |
| ServerShutdown | This informs the client service 50 that the server module 22 is planning to do a complete shutdown and all connections to the server should be dropped.<br>In response to this notification, the client service 50 must:<br>Shutdown the client monitoring agent (no reconnect delay is given)<br>Resign as a listener to the server module 22's outgoing interfaces.<br>Release all interface pointers on the server module.<br>As part of the notification, the client service 50 will also receive a DWORD argument known as a ReconnectionAttemptPolicy that determines when the client service 50 should attempt a re-connection. The possibilities for reconnection are:<br>At the next logon event, and all successive logon events until one succeeds.<br>At some periodic interval after a delay of n seconds. This instructs the client service 50 to periodically attempt to re-connect to the server module 22 until success. The client service 50 only attempts re-connections if a user is currently logged on. When a user logs off, the client service 50 suspends re-connection attempts until a user logs back on.<br>Once a server module shut down notification has been given, along with the re-connection policy, the client service 50 will continue to use the re-connection policy until the next successful connection. After success, the re-connection policy is discarded. |

These notifications can be targeted to all or to specific users managed by the client service 50. The server moduleShutdown notification results in disconnecting all client monitoring agents as well as the client service 50 itself. When reconnected, all current client monitoring agents are re-initialized and connected to the server module.

Control of Client Services

Control of client service 50 is performed via the ISageControlSink interface:

```
interface ISageControlSink: IUnknown
{
    HRESULT EnumActiveClientDigest(
        [out] IEnumActiveClientDigest** ppEnumClient);
    HRESULT RereadProfile(
        [in] ULONG elems, [in, size is (elems), unique] DWORD*
            loginIDs);
```

```
    HRESULT SuspendDataCollection(
        [in] ULONG elems, [in, size_is (elems), unique] DWORD*
            loginIDs);
    HRESULT ResumeDataCollection(
        [in] ULONG elems, [in, size_is (elems), unique] DWORD*
            loginIDs);
    HRESULT SyncData(
        [in] ULONG elems, [in, size_is (elems), unique] DWORD*
            loginIDs)
    HRESULT SyncEvents(void);
    HRESULT server moduleShutdown([in] DWORD delay);
    HRESULT GetNextDataPacket(
        [in] DWORD Cookie, [in] LPCOLESTR pktName,
        [out] IDataPacket** pPacket);}
```

TABLE XI

| ISageControlSink Method | Description |
|---|---|
| EnumActiveClientDigest( ) | Used to retrieve a structure describing each user currently logged onto the client machine for which a client monitoring agent has been created. |
| RereadProfile( ) | Informs the server that those clients indicated in the argument list, or all clients if none, should reread their profiles. |
| SuspendDataCollection( ) | Called to suspend data collection by the server module's clients. The client service 50 need not release the IDataReport interface that it holds on the server module 22, and is not required to stop reporting data ready for transport.<br>Note that if a user on any client machine logs off during the time that data collection has been suspended there is no need for the corresponding ResumeDataCollection( ) notification, and none will be is delivered. The client service 50 will handle all future user log ins in the normal fashion. |
| ResumeDataCollection( ) | Called to inform the client service 50 that its clients should resume data collection. That is, once again its clients should begin collection monitoring data. |

TABLE XI-continued

| ISageControlSink Method | Description |
|---|---|
| SyncData( ) | Called to request that the client monitoring agents immediately flush their current monitoring data cache to and notify the client service 50. The client service 50 then informs the server module 22 of the ready data. |
| SyncEvents( ) | Informs the client service 50 to send any events in its log up to the assigned server module 22 which in turn incorporates them into the NT Event Log. |
| server moduleShutdown( ) | Called to direct all client service 50s that the server module 22 is going down and each client service 50 and client monitoring agent should immediately release all interface pointers on it. The method contains a single parameter to inform the client service 50 of the reconnection policy. The reconnection policy describes when the client service 50 should attempt a re-connection. It could specify a periodic interval, or simply at the next login. |
| GetNextDataPacket( ) | Called by the server module 22 to get an IdataPacket interface on the indicated data packet. The server streams the packet from the client machine to the DBOB and then deletes the packet file. |

Client Monitoring Agent

The client monitoring agent is a COM object supporting only one interface. A primary purpose of the client monitoring agent is to monitor a user's actions on a client machine and report the monitoring results to the server module 22. In a preferred implementation, one client monitoring agent is associated with each user logon. For a Windows95 or Windows NT workstation, there will typically be at most one client monitoring agent active on the client. In the case of a Window's Terminal server module in which many users may be logged on, there will generally be one client monitoring agent per active (logged on) user. When the user logs off, the client service 50 removes the client monitoring agent. Each client monitoring agent will typically be unaware of the applicable server module 22, and will be aware only of its associated client service 50.

Referring the FIG. 29, The client service 50 uses ISageserver module on the server module 22 to logon and logoff the server module 22 and request profiles for the user that has logged on. The logon to the server module 22 corresponds to the user logon to the client so that the monitoring is specific to the user on the particular client desktop. The client service 50 implements the ISageControlSink as the control interface for outgoing notifications from the server module 22. Using the ISageCallback interface of server module 22, the client service 50 registers its IsageControlSink interface to a "Sink" COM object to receive these notifications from the server module 22. The control sink is created when the client service 50 first logs on to the server module 22.

The client service 50 uses the IClientMonitoringAgent interface of the client monitoring agent to initialize and control the monitoring agent. Commands received via the ISageControlSink are passed through to the client monitoring agent. These include Suspend/Resume Data Collection and Profile Update commands. Also the client service 50 will synchronize the client monitoring agent before logging off to ensure that all data has been sent to the server module. When the client monitoring agent is initialized it is handed a pointer to the ICollectionStatusSink interface of the client service 50. The client monitoring agent uses this interface to provide feedback to the client service 50 regarding its state as well as to signal the client service 50 when data is ready for transmission to the server module 22.

In a preferred implementation the client service 50 run continuously on the applicable client computer 12 even when a user is not logged on. The client service 50 watches for certain events in order to initiate a conversation with the server module 22. Table XII below shows the events and the actions taken by the client service 50 for each:

TABLE XII

| Event | Actions Taken by the Client Service |
|---|---|
| User Login | 5. Connect to server module 22 telling it who logged in.<br>6. Retrieve from the server module 22 the appropriate monitoring profile.<br>7. Start up a client monitoring agent, passing the client the relevant profiling information and the ICollectionStatus sink of the client service 50.<br>8. Sign up as a listener on the appropriate server module 22's outgoing interfaces.<br>Notice that prior to the user login, the client service 50 had no connection to the server module 22. An assumption of this model is that if there is no user logged in on a client, there is no information to be collected, thus no communication between client service 50 and server module 22.<br>For a multiuser terminal server where more than one user can log on, the above sequence is modified. If another user has logged on to the client such that a connection has already been made to the server, then the last step (4) is not necessary. |

TABLE XII-continued

| Event | Actions Taken by the Client Service |
|---|---|
| User Logoff | 5. Resign as a listener on all server module 22's outgoing interfaces.<br>6. Shutdown the client monitoring agent (if one is running). The client will pass any buffered information to the server module 22 as part of its shutdown sequence.<br>7. Disconnect from the server module 22. As part of the disconnection the client service 50 will tell the server module 22 of the logoff event.<br>8. Watch for the next login event.<br>Again this sequence assumes that only one user has logged on and is now logging off. In multiuser client environments, steps 1 and 3 are performed only when the last user has logged off. |

In addition to watching for system events (in order to notify the server module 22), the client service 50 is listening to the outgoing commands of server module 22 via the callback registry. The notifications possible, along with the response of the client service 50 are shown in Table XIII below. These notifications only occur while the client service 50 is listening to the server module 22, which implies that at least one user has logged on.

The notifications described in Table XIII can be targeted to all or to specific users managed by the client service 50. The server module Shutdown notification results in disconnecting all client monitoring agents as well as the client service 50 itself. When reconnected, all current client monitoring agents are re-initialized and connected to the server module. It should be understood that the client service 50 controls the client monitoring agent via the IClientMonitoringAgent

TABLE XIII

| Server Module to Client Service Notification | Notification Meaning And Actions Taken by the Client Service |
|---|---|
| Reread Profile | This informs the client service 50 that the profile currently in use by the client monitoring agent has been updated, and must be re-read from the server module 22.<br>In response to this notification, the client service 50 must:<br>3. Request an updated profile from the server module 22.<br>4. Pass the updated profile to the client monitoring agent. |
| Suspend Data Reporting | This informs the client service 50 that the server module 22 has determined that it would like the client monitoring agent associated with this client service 50 to stop reporting data for the time being.<br>In response to this notification, the client service 50 must:<br>2. Tell the client monitoring agent to stop reporting, and furthermore to stop all data collection. The client monitoring agent will stop all monitoring and collection activities. |
| Resume Data Reporting | This informs the client service 50 that the server module 22 would like to resume data reporting. This notification only makes sense when paired with a Suspend Data Reporting notification.<br>In response to this notification, the client service 50 must:<br>2. Tell the client monitoring agent to resume reporting. |
| Synchronize | This informs the client service 50 to flush cached monitoring data to the server.<br>In response to this notification, the client service 50 must:<br>2. Tell the client monitoring agent to immediately flush any cached data to the server module 22. |
| Server Module Shutdown | This informs the client service 50 that the server module 22 is planning to do a complete shutdown and all connections to the server should be dropped.<br>In response to this notification, the client service 50 must:<br>Shutdown the client monitoring agent (no reconnect delay is given)<br>Resign as a listener to the server module 22's outgoing interfaces.<br>Release all interface pointers on the server module.<br>As part of the notification, the client service 50 will also receive a DWORD argument known as a ReconnectionAttemptPolicy that determines when the client service 50 should attempt a re-connection. The possibilities for reconnection are:<br>At the next logon event, and all successive logon events until one succeeds.<br>At some periodic interval after a delay of n seconds. This instructs the client service 50 to periodically attempt to re-connect to the server module 22 until success. The client service 50 only attempts re-connections if a user is currently logged on. When a user logs off, the client service 50 suspends re-connection attempts until a user logs back on.<br>Once a server ModuleShutdown notification has been given, along with the re-connection policy, the client service 50 will continue to use the re-connection policy until the next successful connection. After success, the re-connection policy is discarded. | interface, but that the client monitoring agent does not interface with the client service 50.

Relationship of Client Monitoring Agent to Client Service

The IClientMonitoringAgent interface is used to control the client monitoring, and is described below and in Table XIV:

```
interface IClientMonitoringAgent : IUnknown
{
    HRESULT Initialize([in]) TActiveClientDigest* userInfo,
        [in] ICollectionStatusSink* pCollectionStatusSink,
        [in] IProfileInfo* pProfile,
        (out) DWORD* pid);
    HRESULT ProfileUpdate([in] IProfileInfo* pProfile);
    HRESULT SuspendDataCollection( );
    HRESULT ResumeDataCollection( );
    HRESULT Synchronize( );};
``` will report the presence of ready data to the server module 22 via IdataReport::SignalPacketReady( ). The data packet object (an implementor of IdataPacket) shown in the argument list of the server module's ISageControlSink::GetNextDataPacket( ) is defined as:

```
interface IDataPacket: IContentSource
{
    HRESULT EnumDataItems([out] IEnumDataItem**  ppEnumDataItems);
    HRESULT GetHeader([out] IDataHeader**   ppDataHeader);
    HRESULT AddDataItem([in] TPersistentDataItem* pItem,
        (out)DWORD* retId);
    HRESULT GetPacketFileName([in] LPOLESTR* lazyFile);
    HRESULT DeletePacketFile(void) ; }
```

TABLE XIV

| IClientMonitoringAgent Method | Description |
| --- | --- |
| Initialize( ) | Called by the client service 50 to pass the ClientMonitoringAgent the Monitoring Profile to use. The client digest is also passed so identifying information about the client can be included in the data packets. |
| ProfileUpdate( ) | Called by the client service 50 to instruct the client monitoring agent to use an updated profile. |
| SuspendDataCollection( ) | Called by the client service 50 to inform the client that it should suspend data collection. After receiving this message the client monitoring agent should flush its cached buffer of monitoring data, then stop all collection and reporting until a ResumeDataCollection( ) call. |
| ResumeDataCollection( ) | Called by the client service 50 to inform the client that it should resume data collection. This is called after a call to SuspendDataCollection. If the client monitoring agent is not already in the suspended state this call is ignored. |
| Synchronize( ) | Called by the client service 50 to request that the client monitoring agent immediately flush its current monitoring data cache. The client monitoring agent should respond by calling ICollectionStatusSink::Synchronize( ) to notify the client service 50 of the new data packet. |

Data Packet

Each data packet is fetched from the client service 50 by the server module 22, but is built by the client monitoring agent. When the size of the packet being currently assembled by the client monitoring agent exceeds the maximum size specified in the Monitoring Profile, or the reporting interval specified in the Monitoring Profile is exceeded, the current packet is streamed to a file and the client service 50 signaled with ICollectionStatusSink::Synchronize( ). The client service 50

TABLE XV

| IDataPacket Method | Description |
| --- | --- |
| EnumerateDataItems( ) | Enumerates the instances of TPersistentDataItem contained in the packet by reading the data items from the body of the packet. The enumeration retrieves the actual data items. |
| GetHeader ( ) | Returns an IDataHeader interface pointer that can be used to read the RFC 822 style name value pairs contained in the header. This is only a pointer to an interface and not the contents of the header. |
| AddDataItem( ) | Adds a single TPersistentDataItem to the body of the packet. This is one single piece of collected monitoring data. This method is used by the client monitoring agent to insert data items into the packet. |
| GetPacketFileName( ) | Fetches the name of the file (if any) from which the state of the data packet was loaded. |
| DeletePacketFile( ) | Called by the server module 22 to delete the data packet residing on the client after its contents have been streamed to the DBOB and successfully entered into the DBMS. |

An IDataPacket contains between zero and "k" TPersistentDataItems. The structure TPersistentDataItem provides a means to operate on an individual DataItem (a record of some desktop event), as an object.

The role of the IDataHeader is to tag the IDataPacket with an RFC822 style header containing name value pairs that serve to identify the data. Information such as sample time, sample sequence number, software version, userid, client IP address, etc. should be included here, along with the content-type label of application/x-sagedata. Ultimately, security related information such as a certificate could also be placed here.

Figure 30:
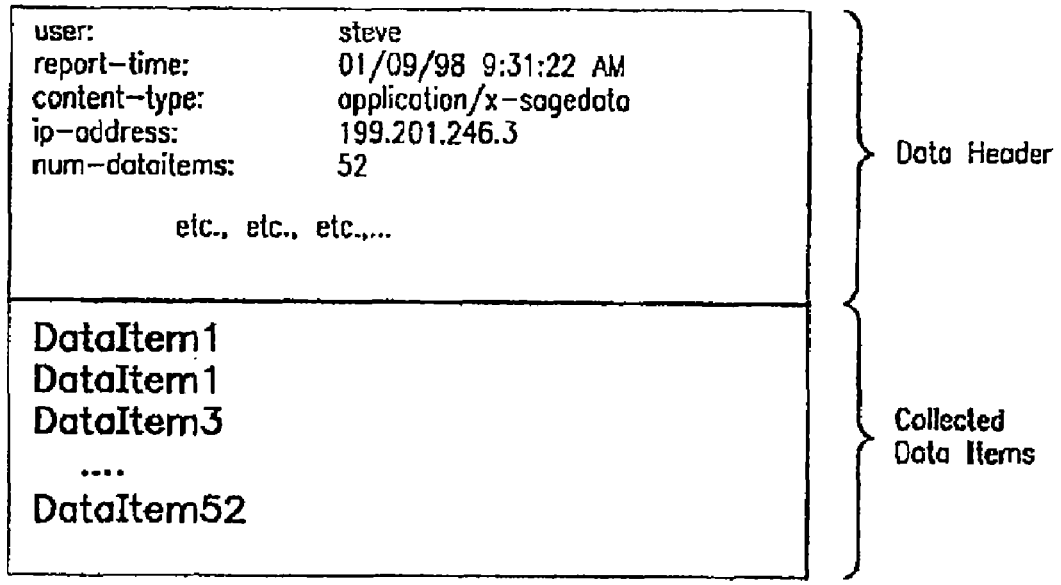
FIG. 30 depicts the organization of an IDataPacket.

FIG. 30 depicts the organization of an IDataPacket. In or to support streaming of the data items, the IDataPacket extends IContentSource instead of IUnknown. IContentSource has a single method:

HRESULT GetContentStream([out] IStream** ppStrm);

This method enables the caller to get a stream to which the serialized state of the packet has been written. Each DataItem contained in the DataPacket represents an occurrence on the desktop, specified for collection by the Monitoring Profile loaded by the client monitoring agent. The DataItem is reported as a Meta-Event instead of as the raw information generated by the Accessibility Callback or Win32 Hook Filter Procedure which trapped the message. Condensing raw events into meta events advantageously allows the volume of data to be reduced and facilitates a simplified data base schema.

Data Header

```
    interface IDataHeader : IContentSource
{
    HRESULT EnumProperties( [out] IEnumString**   ppEnumProps);
    HRESULT EnumValues( [out] IEnumString**   ppEnumValues);
    HRESULT SetValue( [in] LPCOLESTR element, [in] LPCOLESTR
    value);
    HRESULT GetValue( [in] LPCOLESTR element, [out] LPOLESTR*
    value);
    HRESULT Remove( [in] LPCOLESTR property);
};
```

TABLE XVI

| IDataHeader Method | Description |
| --- | --- |
| EnumProperties( ) | Enumerates the properties (value names) held in the header. This pulls all of the names to the server module from the client agent. |
| EnumValues( ) | Enumerates the values for all of the properties held in the header. This enumeration corresponds one-to-one to the enumerated properties from the above EnumProperties method. |
| SetValue( ) | This inserts a name (property) value pair into the data packet header. Both the name and value are strings. |
| GetValue( ) | Gets the value corresponding to the named property. |
| Remove( ) | Removes the named property value pair from the header. |

The server module 22 calls ISageControlSink::GetNextDataPacket( ) on the client service 50 to pick up the next ready data packet. From IDataPacket the server module 22 gets a content stream and streams the packet from the Client to the DBOB 74. The DBOB 74 enters the DataItems into the DBMS 80 and then returns. On a successful return the server module 22 will call IDataPacket::DeleteFile( ). TPersistentDataItem is defined in the IEnumDataItems interface as follows:

```
typedef struct tagTPersistentDataItem
{
    // Type of object stored
    DWORD                              type;
    //Data and data size
    DWORD                              dataSize;
    [size_is(dataSize),unique] byte*   data;
} TPersistentDataItem;
```

Note that the DataItem is a container for an opaque object. Each occurrence on the desktop that is recorded has a definition known only to the client monitoring agent and the DBOB 74. The modules which handle the data before it is actually entered in the DBMS (client service 50 & server module 22) are aware only of the TPersistentDataItem. The actual type of data item is indicated by the type member and used by the DBOB 74 to cast the data member to the appropriate final type. The dataSize member is used only for marshalling the structure. Use of an opaque data type keeps the Interface Definition Language simple and the source code extensible without violating COM conventions for interface versioning.

User Monitoring: Server Module Side Components

Server Module

The primary functions of the server module 22 are:

Support the bootstrapping of the monitoring process by providing monitoring profiles to its clients.

Provide a point of access to other services such as the DBOB 74.

Receive the data collected by instances of client monitoring agent via the client service 50.

The server module 22 typically runs on a central NT server as part of the Monitoring Subsystem. Although the server module 22 appears to connecting clients as if it were always running, server module 22 may be implemented as a COM object and therefore only needs to be executing if at least one client monitoring agent or client service 50 is currently connected. COM will arrange to re-start the server module 22 at upon each attempt to establish such a connection. The server module 22 maintains the following state information:

Users/workstations currently being monitored

Client system failures or the untimely death of a client monitoring agent/client service 50

Superior server module

Subordinate server modules

By "maintain" it is meant that applicable information persists regardless of whether or not the server module 22 is active or not. In addition to serving the needs of its clients, the server module 22 also functions as a node in an ordered network of cooperating server modules. In order to keep network bandwidth use to acceptable levels and manage database transactions, cooperation among the server modules on the network with a minimum of negotiation and communications is desirable. The need to provide centralized and effective management of the network also dictates that the servers have limited awareness of one another.

Figure 31:
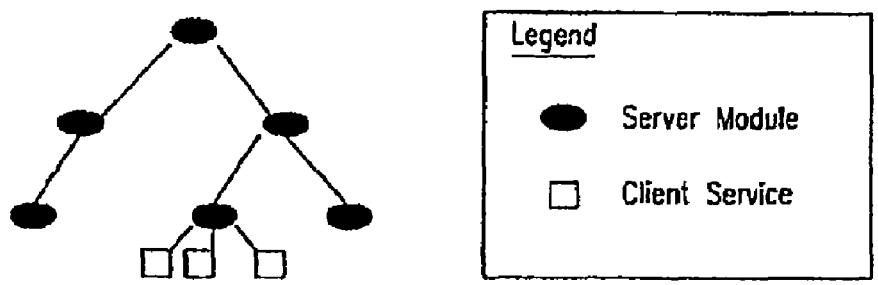
FIG. 31 represents a hierarchical network of server modules in accordance with one aspect of the invention.

These considerations have lead to development of the hierarchical network of FIG. 31. In FIG. 1 it is assumed that each server module has between zero and "n" clients, a single superior, and between zero and "m" subordinates. Though network topology is fixed during system operations, changing superior and subordinate connections can be used to easily realign node connections.

Figure 32:
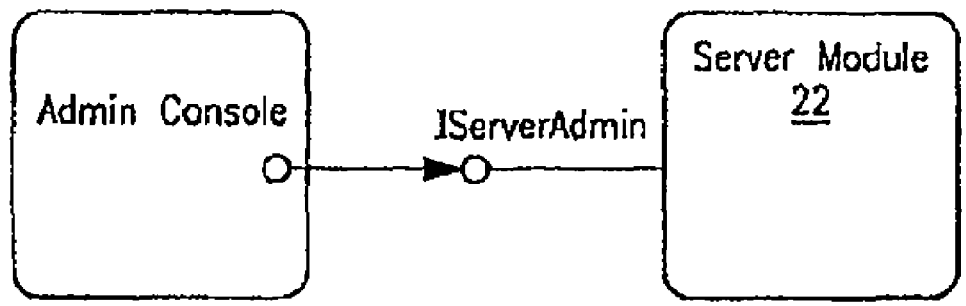
FIG. 32 illustrates the manner in which an Admin Console may serve as a user interface for a given server module.

Referring to FIG. 32, an Admin Console serves as the user interface ("UI") for any given server module 22. There need not be, and typically is not, a one-to-one relationship between instances of Admin Consoles and server modules. With appropriate permission any Admin Console installation may connect to an arbitrary instance of server module 22. Through the use of the Iserver moduleAdmin interface implemented by server module 22, a user of the Admin Console configures and maintains the server module 22 installation. The Admin Console UI also provides access to features of the server module 22 reserved exclusively for use by the administrator. Operations such as start/stop monitoring, client list, etc. are performed directly, or facilitated by, the server module 22 to which the Admin Console is currently connected.

Relationship of Server Module to DBOB

Figure 33:
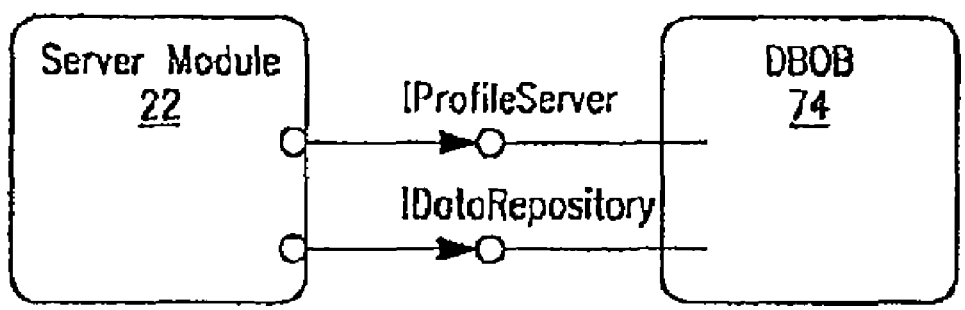
FIG. 33 illustratively represents the primary aspects of the relationship between a server module and a database object broker ("DBOB").

FIG. 33 illustratively represents the primary aspects of the relationship between the server module 22 and DBOB 74. One of the chief roles of the server module 22 is to act as a single point of contact for its clients. This enables a client to retain only the name or IP address of its server module. Access to all other public services (e.g., to the DBOB 74) is provided through the server module 22. Clients can interrogate the server module 22 to determine if it directly implements a desired interface. Where the server module acts as a broker for services that it does not directly provide (e.g., the Profile Service) a convenience method may be provided as part of the ISageserver module interface. In either case the client is free to use the QueryInterface method of IUnknown to ask for services (standard COM model). Each server module 22 can have its own DBOB 74, which in turn can be connected to a remote database server. There is nothing that distinguishes multiple DBOB objects other than the channel maintained to the database. If the database is centralized, i.e. the same for all DBOBs, then the DBOB objects are indistinguishable. In this way, the DBOB functions as a server modules's gateway to the various database systems. Typically only a few DBOB instances will be necessary as the server modules act as control points for the flow of data. Efficient throughput can be achieved in most cases with a single DBOB 74.

Access Method to Profile Service

Figure 34:
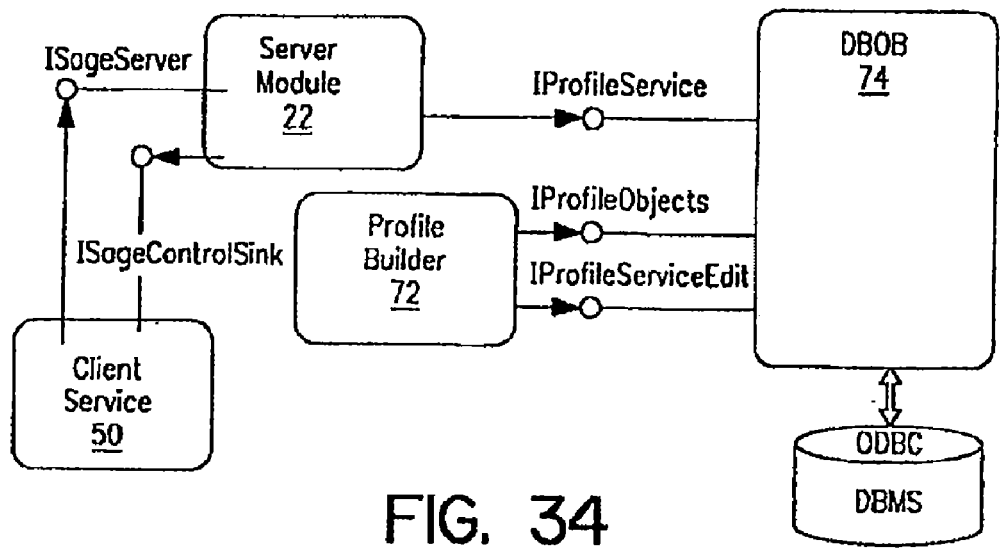
FIG. 34 illustrates the relationship between the profile service and various other system components.

FIG. 34 illustrates the relationship between the Profile Service and various other system components. In a preferred implementation the server module 22 is a client of the Profile Service. When monitoring begins at a client computer 12, the client service 50 calls the Logon ( ) method of the ISageserver module interface implemented by server module 22.

This is in essence an indirect profile request as the monitoring profile to be applied is one of the arguments returned by the Login method. The server module 22 consults the Profile Service, which replies with the defined profile most specific to the requester.

Access Method to Monitoring Data

Figure 35:
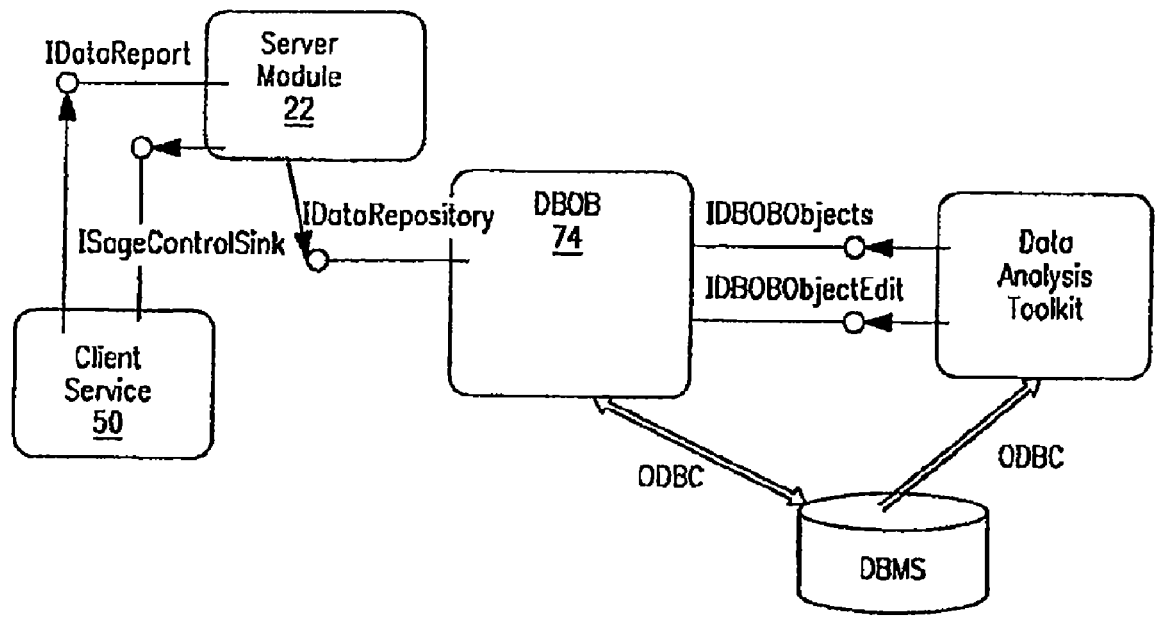
FIG. 35 provides an illustrative representation of the data report processing effected by the server module.

FIG. 35 provides an illustrative representation of the data report processing effected by the server module 22. In a preferred implementation the server module 22 processes data collected by instances of the client monitoring agent which it receives through the client service 50 via the IDataReport interface. The client service 50 places the information describing the ready data packet on a queue owned by the server module 22. A server thread services the FIFO queue of packet info and for each packet calls back to the client service 50 on ISageControlSink (GetNextDataPacket) to get an IDataPacket. The server module 22 streams the data packet to the DBOB 74 which enumerates the data items in the packet and enters them into the appropriate tables in the DBMS. Each data item in a packet represents a measure or metric extracted by the client monitoring agent. With respect to the addition of monitoring data to the DBMS, any DBOB using such DBMS may be considered the equivalent of any other DBOB using such DBMS.

Handling of Monitoring Data

Like profile information, monitoring data is modeled on the network as an instance of an object. The object implements IDataPacket and is NOT passed by value. The packet contains a set of data items, each of which describes an event that occurred on the desktop. Access to the data items as well as the header information carried by a data packet is provided through the IDataPacket interface.

Because data packets may be streamed (the packet object extends IContentSource) they can also be easily saved to a file (serialized). Serialized data packets existing outside the DBMS should be saved with a unique file type, *.pkt. Files of type .pkt shall be given the MIME Type application/x-sage-data and be associated with the Data Analysis Toolkit (DAT) in the registry.

When a client monitoring agent has a read packet of data it serializes the packet to a file and signals its client service 50 (ICollectionStatusSink::Synchronize( )). The client service 50 in turn signals the server module 22 (IDataReport::SignalPacketReady( )). The SignalPacketReady( ) method places the packet information on the packet queue and signals the thread which services the FIFO queue.

Upon being signaled the packet processing thread services the packet queue until it is empty at which time the thread returns to a dormant state. For each entry in the queue, the packet processing thread will call back to the appropriate instance of the client service 50 and get the next ready packets IDataPacket interface via ISageControlSink::GetNextDataPacket( ). The server module 22 treats the packet as an opaque object and streams it to the DBOB. The DBOB inflates the packet instance using the serialzed state from the stream. The DBOB then enumerates the Data Items and enters them into the appropriate DBMS tables. When control is returned the server module 22 the return code indicates whether or not all Data Items were successfully entered in the DBMS, if so the server module 22 commands the Data Packet to delete itself. If packet processing failed or was only paritally successful the packet will be requeued at a later time by the client service 50.

Note that the server module pulls data from each client rather than each client "pushing" data to the applicable server module. This architecture advantageously provides for improved data throughput by distributing the tasks of data processing across all cooperating objects.

Threading of Monitoring Data

The server module's need to efficiently handle the data reporting transactions initiated by its many clients, requires that the process of loading the monitoring data into the DBMS be as streamlined as possible. Getting the data into the DBMS represents the biggest factor controlling performance, heavily influencing the number of clients that a given server can handle.

Streamlining the data reporting process begins with the client service 50, which employs an asynchronous data signaling scheme. In accordance with this scheme, a data packet is not passed by value from the client service to the server module 22. The monitoring agent passes information identifying the ready packet to the server module 22 via IDataReport. This method simply places the packet informat on a queue managed by another thread, signals the thread, and then returns. The server module is then free to accept the next client connection. The main "packet manager" thread of the server module services each packet streaming the packet from the client service 50 to the DBOB. This asynchronous reporting scheme with data "pull" prevents the server from being overloaded by many clients attempting to report data concurrently.

Relationship to Client Service

Figure 36:
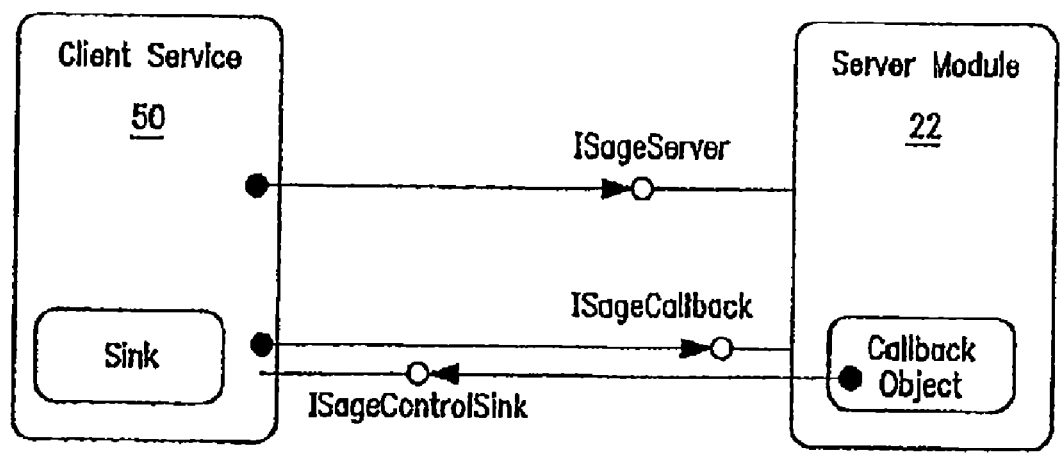
FIG. 36 illustrates the reflexive client-server relationship between the server module and the client service.
Figure 37:
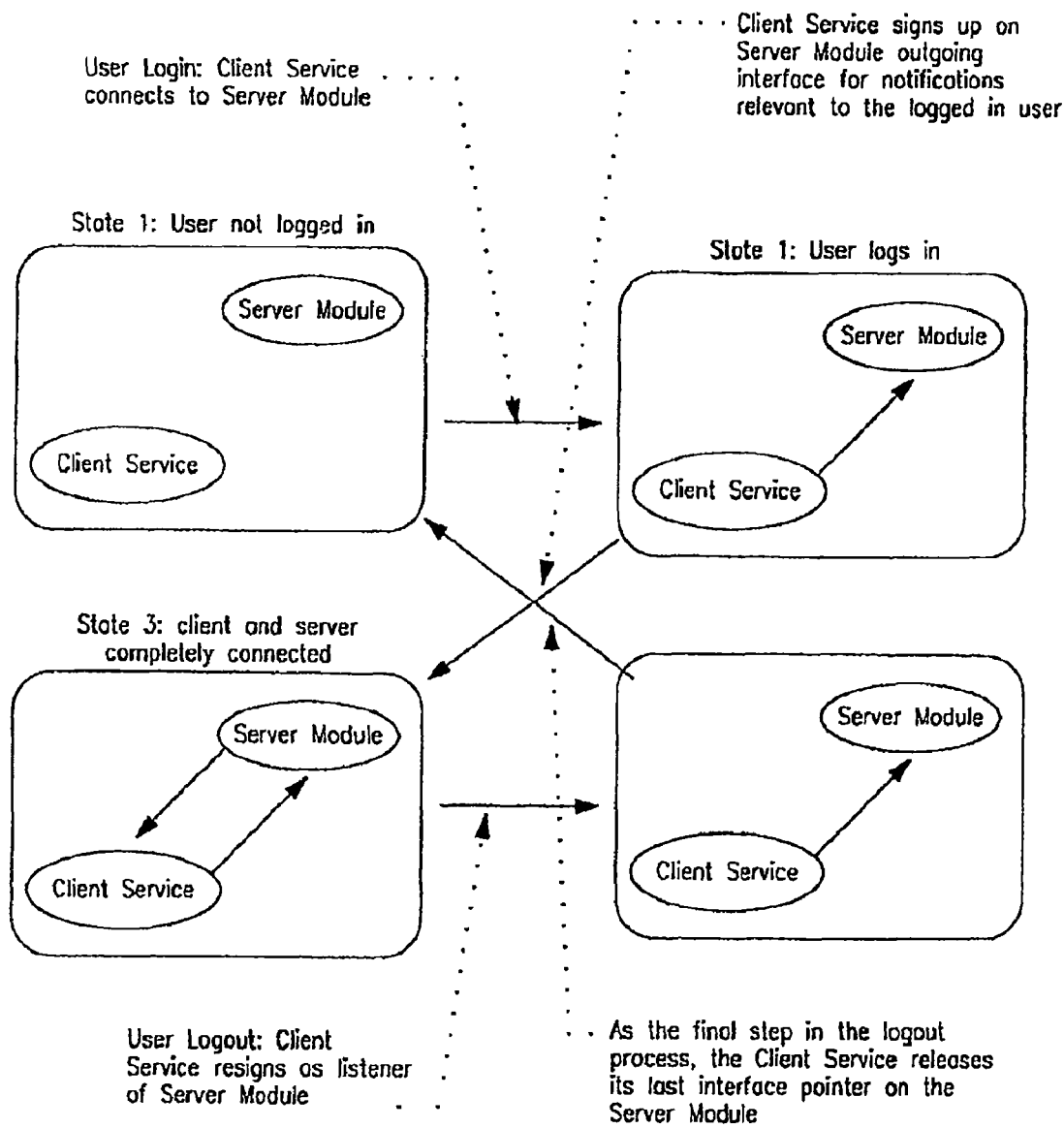
FIG. 37 is a state diagram representative of certain relationships between the client service and the server module.

FIG. 36 illustrates the reflexive client-server relationship between the server module 22 and the client service 50; that is, each entity is both a client and server of the other. This relationship is similar to that of the COM "Connection Point Container" relationship, and is illustrated by the state diagram of FIG. 37. In this relationship the client service 50 is the client and the server module 22 is the server, but the server module 22 also generates events for which the client service 50 is the listener (server). The custom interface ISageCallback serves in place of the standard IConnectionPointContainer/ConnectionPoint scheme for performance reasons. Using a custom interface allows the number of round trips over the network between the two objects to be greatly reduced. Table XVII outlines some sample exchanges between server module 22 and the client service 50.

TABLE XVII

| Event | Actions Taken by the Client Service |
| --- | --- |
| User Login | 1. Connect to server module 22 telling it who logged in.<br>2. Retrieve from the server module 22 the appropriate monitoring profile.<br>3. Based on the profile, start up a client monitoring agent, passing the client the relevant profiling information, and an interface pointer to the server module 22.<br>4. Sign up as a listener on the appropriate server module 22's outgoing interfaces.<br>Notice that prior to the user login, the client service 50 had no connection to the server module 22. An assumption of this model is that if there is no user logged in on a client, there is no information to be collected, thus no communication between client service 50 and server module 22. |
| User Logoff | 1. Resign as a listener on all server module 22's outgoing interfaces.<br>2. Shutdown the client monitoring agent (if one is running). The client will pass any buffered information to the server module 22 as part of its shutdown sequence.<br>3. Disconnect from the server module 22. As part of the disconnection the client service 50 will tell the server module 22 of the logoff event.<br>4. Watch for the next login event. |

In addition to watching for system events (in order to provide notification to the server module), the client service 50 is listening on the outgoing notification interface of the applicable server module 22. An outgoing interface may be realized similarly to a JAVA listener interface, except the source and sink (listener) objects can be on remote machines. The notifications, along with the action taken by the client service 50 are described in Table XVIII below. In a preferred implementation these notifications can only occur while the client service 50 is listening on the outgoing interface of the applicable server module 22. In addition, the client service 50 is configured to listen only during the time a user is actually logged in.

TABLE XVIII

| Server Module to Client Service Notification | Notification Meaning And Actions Taken by the Client Service |
| --- | --- |
| Reread Profile | This informs the client service 50 that the profile currently in use by the client monitoring agent has been updated, and must be re-read from the server module 22.<br>In response to this notification, the client service 50 must:<br>1. Request an updated profile from the server module 22.<br>2. Pass the updated profile to the client monitoring agent. |

TABLE XVIII-continued

| Server Module to Client Service Notification | Notification Meaning And Actions Taken by the Client Service |
|---|---|
| Suspend Data Reporting | This informs the client service 50 that the server module 22 has determined that it would like the client monitoring agent associated with this client service 50 to stop reporting data for the time being.<br>In response to this notification, the client service 50 must:<br>1. Tell the client monitoring agent to stop reporting, and furthermore to stop all data collection. The client monitoring agent will stop all monitoring and collection activities. |
| Resume Data Reporting | This informs the client service 50 that the server module 22 would like it to resume data reporting. This notification only makes sense when paired with a Suspend Data Reporting notification.<br>In response to this notification, the client service 50 must:<br>1. Tell the client monitoring agent to resume reporting. |
| Synchronize Data | This informs the client service 50 that the server module 22 would like to have any client side cached monitoring data flushed to the server module.<br>In response to this notification, the client service 50 must:<br>1. Tell the client monitoring agent to immediately flush any cached data to the server module 22. |
| Synchronize Events | This informs the client service 50 that the server module 22 would like to have any client side cached monitoring data flushed to the server module.<br>In response to this notification, the client service 50 must immediately send any events in the client side log to the server. |
| Server ModuleShutdown | This informs the client service 50 that the server module 22 is planning to do a complete shutdown and all connections to the server should be dropped.<br>In response to this notification, the client service 50 must:<br>Shutdown the client monitoring agent.<br>Resign as a listener to the server module 22's outgoing interfaces.<br>Release all interface pointers on the server module.<br>As part of the notification, the client service 50 will also receive a packet of data, known as a ReconnectionAttemptPolicy, which determines when the client service 50 should attempt a re-connection. The possibilities for reconnection are:<br>At the next logon event, and all successive logon events until one succeeds.<br>At some periodic interval. This instructs the client service 50 to periodically attempt to re-connect to the server module 22 until success. The client service 50 only attempts re-connections if a user is currently logged on. When a user logs off, the client service 50 suspends re-connection attempts until a user logs back on.<br>Once a server ModuleShutdown notification has been given, along with the re-connection policy, the client service 50 will continue to use the re-connection policy until the next successful connection. After success, the re-connection policy is discarded. |

Figure 38:
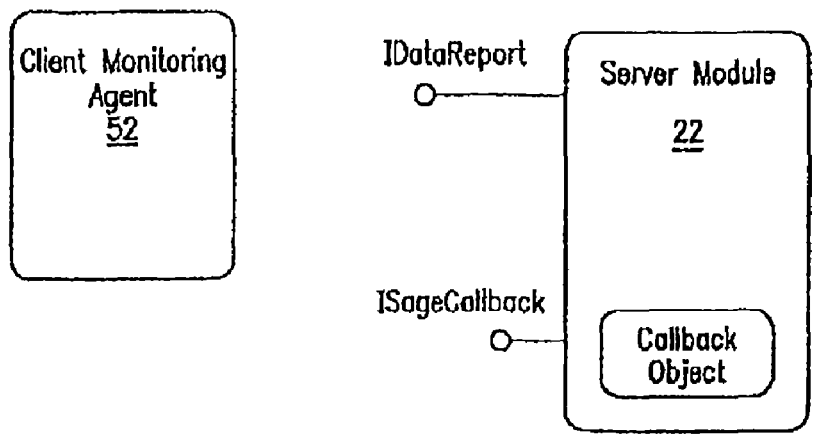
FIG. 38 illustratively represents the relationship between the server module and the client monitoring agent.

FIG. 38 illustratively represents the relationship between the server module 22 and the client monitoring agent 52. As is indicated by FIG. 38, the client monitoring agent has no awareness of the server module 22.

Figure 39:
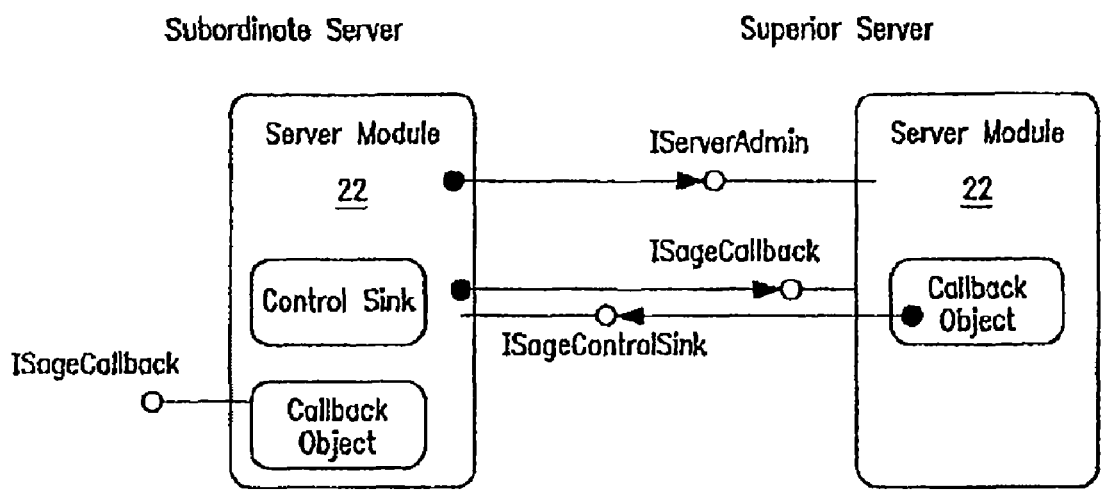
FIG. 39 depicts the relationship between superior and subordinate server modules hierarchically arranged in accordance with one aspect of the invention.

FIG. 39 depicts the relationship between superior and subordinate server modules hierarchically arranged in accordance with one aspect of the invention. A given server module may have one and only one superior server module. In a non-networked collection of server modules, the superior server need not be assigned (likewise for subordinate servers). In the case of a cooperating network of server modules (standard deployment), all server modules have a single superior with the exception of the master server. Each server is preferably made aware of its subordinate servers. It is important to note that a server is directly aware of all its subordinate servers at all times, but is only directly aware of those clients that are currently connected. Since clients are configured with their assigned server module (and not vice-versa), the task of adding new clients to the system is made simpler. Linking the servers together in the manner described above produces a network of cooperative servers that can be represented by the tree diagram of FIG. 31.

Networked server modules collaborate through use of the ISageControlSink interface described above (the same callback interface implemented by the client service 50). The UI of the Admin Console provides a means to configure the server modules to repeat commands to all subordinate server modules. From any arbitrary server connection, the Admin Console can propagate commands up to the root server module, which then propagates notifications down the hierarchy to the clients via the ISageControlSink interface. This feature provides a means to centrally and concurrently administer sets of server modules. In a large deployment, the ability to map the network of servers and delegate management of certain areas to sub-administrators eases administration.

Interfaces

Figure 40:
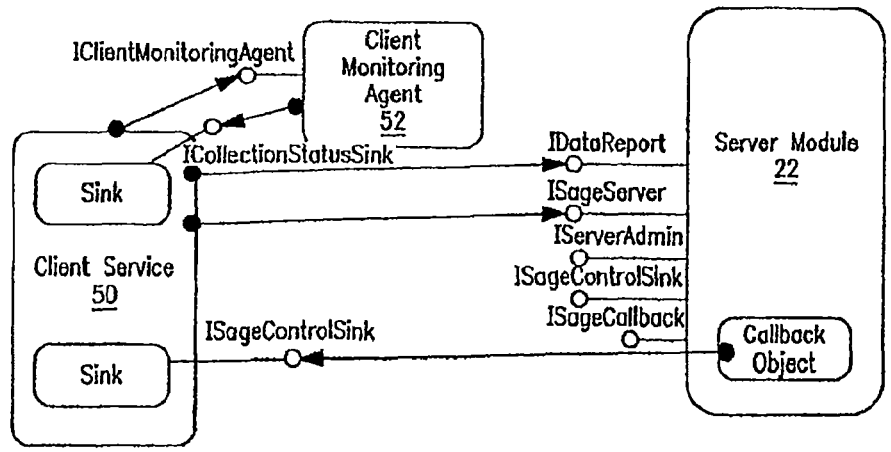
FIG. 40 provides an illustrative representation of the public interfaces exposed by the server module.

FIG. 40 provides an illustrative representation of the public interfaces exposed by the server module 22. These interfaces are described in the following subsections.

Data Reporting Interface (IDataReport)

The client service 50 has exclusive use of the IDataReport interface. Through this interface a client service 50 notifies the server module 22 of ready data collected by its Monitoring. The data items contained within a report packet are then inserted into the database via the DBOB 74.

```
interface IDataReport : IUnknown
{
    HRESULT SignalPacketReady( [in] DWORD CBCookie,
    [in] LPOLESTR pktName);
}
```

TABLE XIX

| IDataReport Method | Description |
|---|---|
| SignalPacketReady( ) | Called by the client service 50 to notify the server of data ready for archival in the database. |

Servicing the Clients (ISageserver Module)
Interface ISageserver module is used by instances of the client service 50 to contact their assigned server module 22.

```
interface ISageserver module : IUnknown
{
    HRESULT Logon([in] OLECHAR
    wszUserName[MAX_SAGE_NAME],
        [in] OLECHAR
        wszClntHostName[MAX_SAGE_NAME],
        [in] OLECHAR wszIPMatch[MAX_SAGE_NAME],
        [in] DWORD    CallbackID,
        [in]    REFIID riid,
        [in] DWORD logonTime,
        [out,iid_is(riid)] void** ppv, // profile
        [out] DWORD* logonID);
    HRESULT Logoff( [in] DWORD CallbackID, [in] DWORD
    LogonID, [in] DWORD logoffTime);
    HRESULT GetProfile( [in] DWORD CallbackID,
        [in] DWORD LogonID, [in] REFIID riid,
        [out,iid_is(riid)] void** ppv) ;
}
```

TABLE XX

| ISageserver module Method | Description |
|---|---|
| Logon( ) | Called by the client service 50 when a user logs in at the client host. The parameters returned are used to initialize the client monitoring agent. |
| Logoff( ) | The Logoff method is called by the client service 50 when the user logs off the client host. The client shuts down the client monitoring agent, resigns as a listener of the server module 22's outgoing interface and is removed from the list of active clients maintained by the server module 22. |
| GetProfile( ) | A convenience method provided to directly fetch a Monitoring Profile. |

Administration/Configuration (Iserver moduleAdmin)

Used primarily by the implementation of the Admin Console and other servers modules, the Iserver moduleAdmin interface is used to configure and control a server module 22 and certain behaviors of its clients. The interface also provides generalized features such as:

Examine the list of clients currently reporting data

Determine those clients assigned to the server

Examine server status information such as errors, amount of data moved, etc.

Fetch and interface pointer on the superior server

Enumerate the subordinate servers, etc.

```
interface Iserver moduleAdmin: IUnknown
{
    typedef struct tagserver moduleStatus
    {
        DWORD upSince; // a time_t
        DWORD numActiveClients;
        BOOL  repeatsCommands;
        DWORD packetsQueued;
        DWORD packetsProcessed;
        DWORD dataItemsProcessed;
        DWORD dataTransmitErrors;
        DWORD packetQueueHighWater;
        DWORD packetQueueHighWaterTime; // a time_t
    } Tserver moduleStatus;
    HRESULT EnumClients( [out] IEnumString**
    ppEnumClient);
    HRESULT EnumActiveClients( [out] IEnumString**
    ppEnumClient);
    HRESULT EnumSubordinateserver modules
    ( [out] IEnumString**  ppEnumserver module);
    HRESULT EnumActiveClientDigest (
        [out] IEnumActiveClientDigest** ppEnumClient);
    HRESULT RegisterAsSubordinate( [in] LPOLESTR subordinate);
    HRESULT DeRegisterAsSubordinate( [in] LPOLESTR subordinate);
    HRESULT GetSuperiorserver module( [out] LPOLESTR*  superior);
    HRESULT SetSuperiorserver module( [in] LPOLESTR superior);
    HRESULT Getserver moduleStatus( [out] Tserver moduleStatus*
    status);
    HRESULT RepeatCommands( in] boolean bRepeat );
    HRESULT SetDBObjectBroker( [in] LPOLESTR
    dbObjectBrokerHost);
    HRESULT GetDBObjectBroker( [out] LPOLESTR*
    dbObjectBrokerHost);
    HRESULT GetDBOBAdmin( [out] IDBOBAdmin**  ppAdmin);
    HRESULT Syncserver moduleState(void);
    HRESULT GetEventLogEnumerator( [in] LPOLESTR hostname,
        [in] TEventSource source,
        [out]   IEnumNTEventLog**  enumEvents) ;
};
```

TABLE XXI

| ISage moduleAdmin Method | Description |
|---|---|
| EnumClients( ) | Enumerates the clients that have historically reported their monitoring data to this server. |
| EnumActiveClients( ) | Enumerates the clients currently reporting monitoring data to this server. |
| EnumSubordinatserver modules( ) | Enumerates the servers which are subordinate to this server. |
| EnumActiveClientDigest( ) | Enumerates the active clients in more detail than EnumClients( ). |
| RegisterAsSubordinate( ) | Called by another server module 22 to register itself as a subordinate of the implementing server module. |

TABLE XXI-continued

| ISage moduleAdmin Method | Description |
| --- | --- |
| DeRegisterAsSubordinate( ) | Called by another server module 22 to DE-register itself as a subordinate of the implementing server module. |
| GetSuperiorserver module( ) | Returns the an Iserver moduleAdmin interface pointer for the article confusion superior server of this server. |
| SetSuperiorserver module( ) | Deregisters this server as a subordinate of its current superior (if any) and registers it as a subordinate of the specified server. |
| Getserver moduleStatus( ) | Returns information outlining the state and general health of the server module 22. |
| RepeatCommands( ) | True of False, specifying whether or not to repeat commands or relayed by a superior server. |
| SetDBObjectBroker( ) | Configures the server module to use the indicated Data Base Object broker when reporting data. |
| GetDBObjectBroker( ) | Returns the hostname where the Data Base Object broker currently in use resides. |
| GetDBOBAdmin( ) | Fetches the interface used to administer the DBOB associated with this server. |
| Syncserver moduleState( ) | Forces the server to enumerate the active clients and update its internal state. Unresponsive clients are removed from the active client list |
| GetNTEventLogEnumerator( ) | Fetches an enumerator which allows the client to fetch all events relative to the SAGE System. This is used to fill the log page of the Admin Console. |

Subordinate Server Control (ISageControlISink)

The server module 22 also implements the ISageControl-Sink implemented by the client service 50. This interface introduces a level of polymorphic behavior shared by all objects that populate the distribution tree. Iserver moduleAdmin provides navigational capability while ISageControlSink allows actions to be applied to any object (client or server) in a homogeneous fashion. Though the interface is the same, the behavior for the server module is subtly different from that of the client service 50 implementation. Typically the events received via this interface are propagated to the subordinate servers and the appropriate client services designated in the callback. Whether or not the commands are propagated to subordinate servers is controlled by the ISageAdmin interface from an instance of the Admin Console.

Register Server Control (ISageCall/back)

ISageCallback is implemented by the server module 22 to allow clients to sign up as listeners on the outgoing interface of the server module 22. ISageCallback provides essentially the same semantics as the standard OLE interface IConnectionPointContainer, but can be more efficiently implemented. This same interface is used to register subordinate servers to receive the same callbacks.

```
interface ISageCallback: IUnknown
{
    HRESULT SetupCallback( [in] REFIID riid,
                [in,iid_is(riid)] IUnknown* pUnk,
                    [in] LPOLESTR pszMachineName,
                [in]   boolean bAdvise,
                [out]  DWORD* pCookie);
    HRESULT Advise( [in] DWORD cookie);
    HRESULT UnAdvise( [in] DWORD cookie);
    HRESULT ShutdownCallBack( [in] DWORD cookie) ;
}
```

TABLE XXII

| ISageCallback Method | Description |
| --- | --- |
| SetupCallback( ) | Sign up the client REFIID as the listener for callbacks and direct all callbacks to pUnk. The machine name of the client is given for the callback connection. The advise flag indicates that the client should be notified when an event occurs (true) or temporarily suspend reports (false). The method responds with a cookie that identifies the client in subsequent calls to the server. |
| Advise( ) | Sets the advise flag. |
| UnAdvise( ) | Unsets the advise flag. |
| ShutdownCallback( ) | Unregister the client as a listener for server callbacks. The server permanently removes the client from its listener list. |

Data Analysis: Client Side Components

Data Analysis Toolkit

The Data Analysis Toolkit (DAT) provides the means to view and compare the data collected by the client monitoring agents. The DAT is independent of the rest of the system components (except for the DBOB) and may be installed separately. The DAT packages a set of database queries and resulting reports and graphs into a unified user interface that is easy to use. As is indicated by FIG. 13, a reporting engine (e.g., a Crystal Reports Engine) is embedded in the DAT. This is to enable easy construction of robust reporting capabilities. The DAT is primarily a wrapper for the reports engine functioning to enable the selection, customization and use of a set of reports templates. The DAT may use one of two paths to the monitoring data database; namely, via the DBOB or using ODBC.

Graphical Presentations by User

The monitoring system of the invention enables analysts to view a history of activity by a single user. This includes the following presentations:

Usage Histogram: For a given duration of time the total usage of each application the user used is displayed. Also displayed is the idle time (the time a user was logged in but performed no system interactions).

Usage Comparison: Compare user's usage histograms over multiple periods of time (one day vs. another, or morning vs. afternoon).

Application Usage: For a specific application used by the user, the analyst can display the data that represents how the user used the application (which portions of the application the user used).

Graphical Presentations of User Comparisons

The analyst can view a comparison of multiple users to each other, and to the "average user". In an exemplary "histogram comparison", the histograms of two or more users are overlapped in order to compare the activities of the users. Information such as the type of applications used, and for what duration of time, may be compared. One of the histograms can represent an average of many users.

Graphical Presentations by Application

The user can view a history of activity by a specific application. This includes the following presentations:

Usage Histogram: For a given duration of time the total usage of the application is displayed. Displayed by time increment (1 hour). The number of active users during the increment and the percentage of actual usage are displayed.

Usage Comparison: Compare an application's usage histogram over multiple periods of time (one day vs. another, or morning vs. afternoon).

Application Usage: For a specific application the user can display the data which represents how the users used the application (which portions of the application were used).

Computed Fields

The DAT can be used to review significant information items calculated from the raw data contained in the monitoring data database, such as:

Time Used: The DAT will add up the time an application and/or a specific part of an application is actually used. This calculation is based upon receiving user input and/or updated events associated with the application/field.

Number of Uses: The DAT will count how many times a specific part of an application is used.

Sequence of Use: The DAT will time stamp utilization events in order to show the sequence of how applications and parts of applications were used.

How Used: The DAT will store all user input events associated with an application or field in an application in order to record an exact history of how the application or field was used. This capability extends to include the state of a field or control after use by the user. The state information is specific to a control. A text field has associated text, a check box is either checked or unchecked, etc.

In addition to the metrics described above, the DAT should provide a means to allow the user to construct a query against the DBMS. This feature allows the person responsible for evaluating the reported data to generate custom reports and graphics.

Integration with the Reports Engine

As explained in previous sections, the DAT is primarily a wrapper for the Reports Engine (Engine). The Engine is responsible for querying the database 80 and displaying the formatted results. The DAT functions only to provide a means to select and customize reports and manage the Engine. In a preferred implementation a Crystal Reports Designer, not the Engine, constructs report templates.

Each report template can be used by the DAT to create a report instance. Various template "parameters" can be used to customize each report instance. Perhaps the most important customization is the range or volume of data to be included in the report. This is done by manipulation of the "where" clause of the query that is part of the report. In addition, the Engine allows setting of various attributes of a report. Text items such as titles, chart types, header and footer items can be customized. However, the template and the associated query determine the basic layout and data schema of a report and cannot be changed within the DAT.

Handling of Data Analysis Reports

A significant aspect of the DAT architecture is that all report templates, report template parameters, and report property page specifications are held within the database 80 and read by the DAT. This makes it possible to extend the reports supported by the DAT simply by adding report specifications to the database 80. Table XXIII lists the components included within a report specification:

TABLE XXIII

| Component | Description |
|---|---|
| Report Template | A Crystal reports ".rpt" file (represented as a BLOB) in the database. The .rpt files are created using the Crystal Reports Report Designer Tool. |
| Report Params | Information stored in the database that defines the settable aspects of the associated report template. Settable aspects include report title, report query conditions, chart types, etc. The Report Param information also defines a mapping between parameters and property pages. |
| Report Property Pages | The Report Property pages are represented in the database as CLSID's. Each CLSID indicates a registered instance of an OLE property page. |

Figure 41:
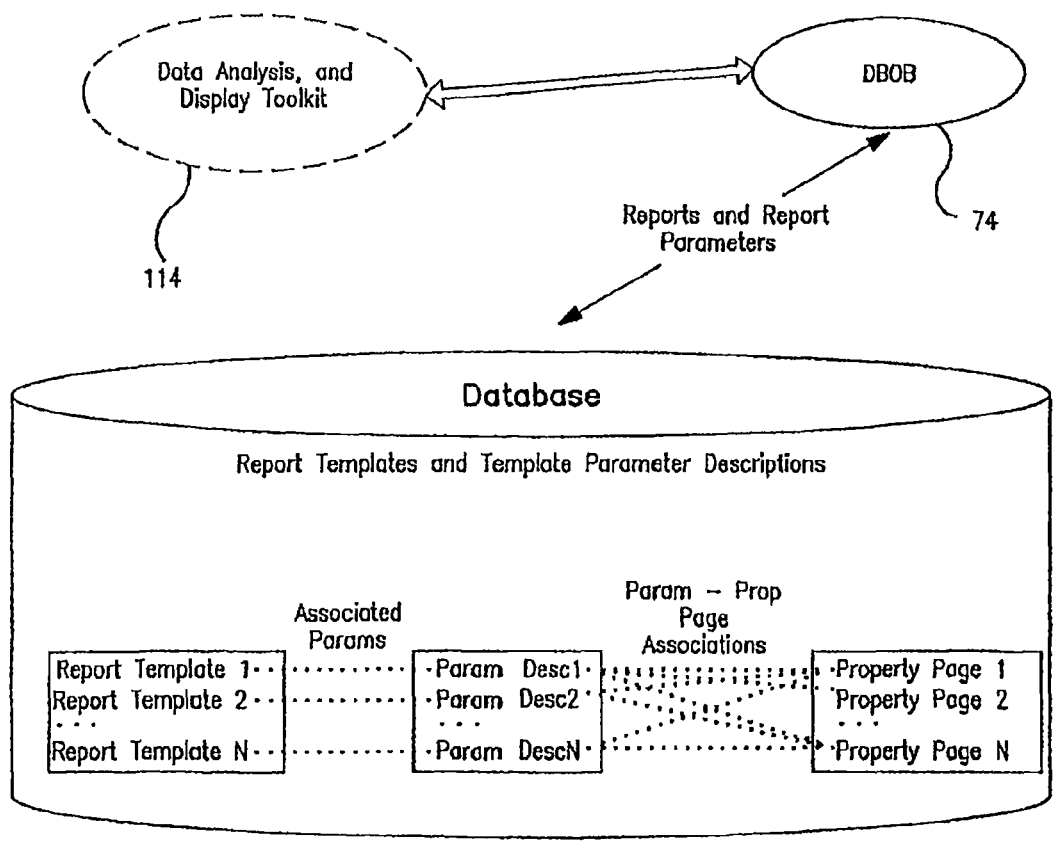
FIG. 41 depicts the manner in which various report specifications are held within a system database.

FIG. 41 depicts the manner in which these report specifications are held within the database 80. An exemplary set of steps for adding a new report to the system of the invention are set forth below:

1. Create a new report template the access the database 80 using the Crystal Reports Designer and add the report template to the database as a BLOB.
2. Determine the Property Pages that are necessary to set the Report Parameters. In many cases, the necessary property pages can be re-used from the pool of property pages already available. However, in some cases it will be necessary to create a new property page or set of pages for the report. Each property page is an OLE property page utilizing predefined interfaces to communicate with the DAT.
3. Add the Property Page CLSID's to the database and distribute the COM objects for the property pages to the client machines utilizing the DAT.
4. Set up the Parameter Description for the new report. This creates a mapping between the report template's settable aspect and the property page from which each parameter can be set.

Exceptions and Error Handling

Table XXIV below describes the default responses to error results from COM interface methods used by the Data Analysis Toolkit. Any exceptions to these responses are described on a per method basis in the Tables that follow.

TABLE XXIV

| HRESULT Classes | Default Error Response |
|---|---|
| E_FAIL | |
| E_NOCOM | |
| E_FAULT | |

On the server side, the DBOB provides access to the Data Analysis Report objects that help to define the reports to be generated from the monitored data. Access to the actual monitor data is by direct access to the Monitoring Database via the Reports Engine.

Data Management: Client Side Components

Figure 42:
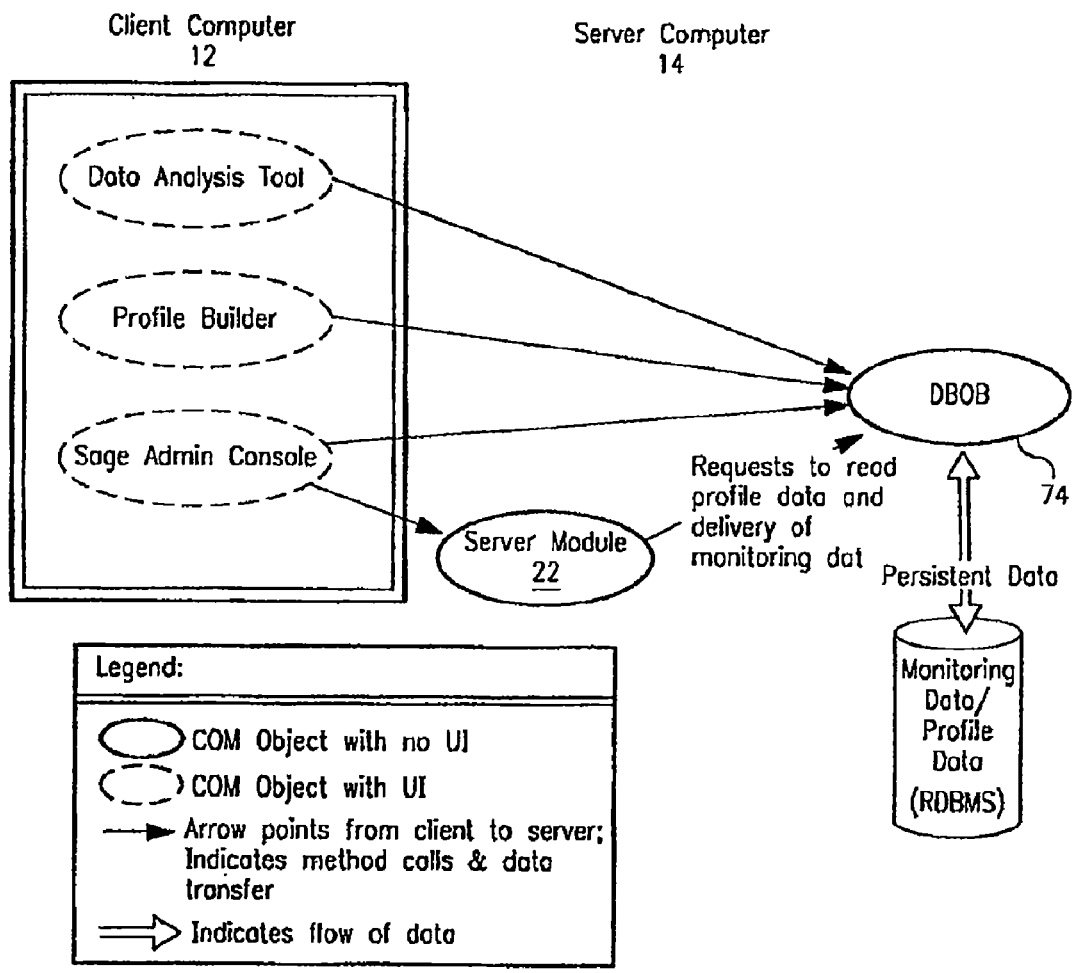
FIG. 42 highlights the client side components of a data management subsystem in accordance with the present invention.

FIG. 42 highlights the client side components of a data management subsystem in accordance with the present invention. Each of the client side components depicted in FIG. 42 connect to a DBOB via COM interfaces, which are defined as part of the DBOB component.

Data Management: Server Side Components

Figure 43:
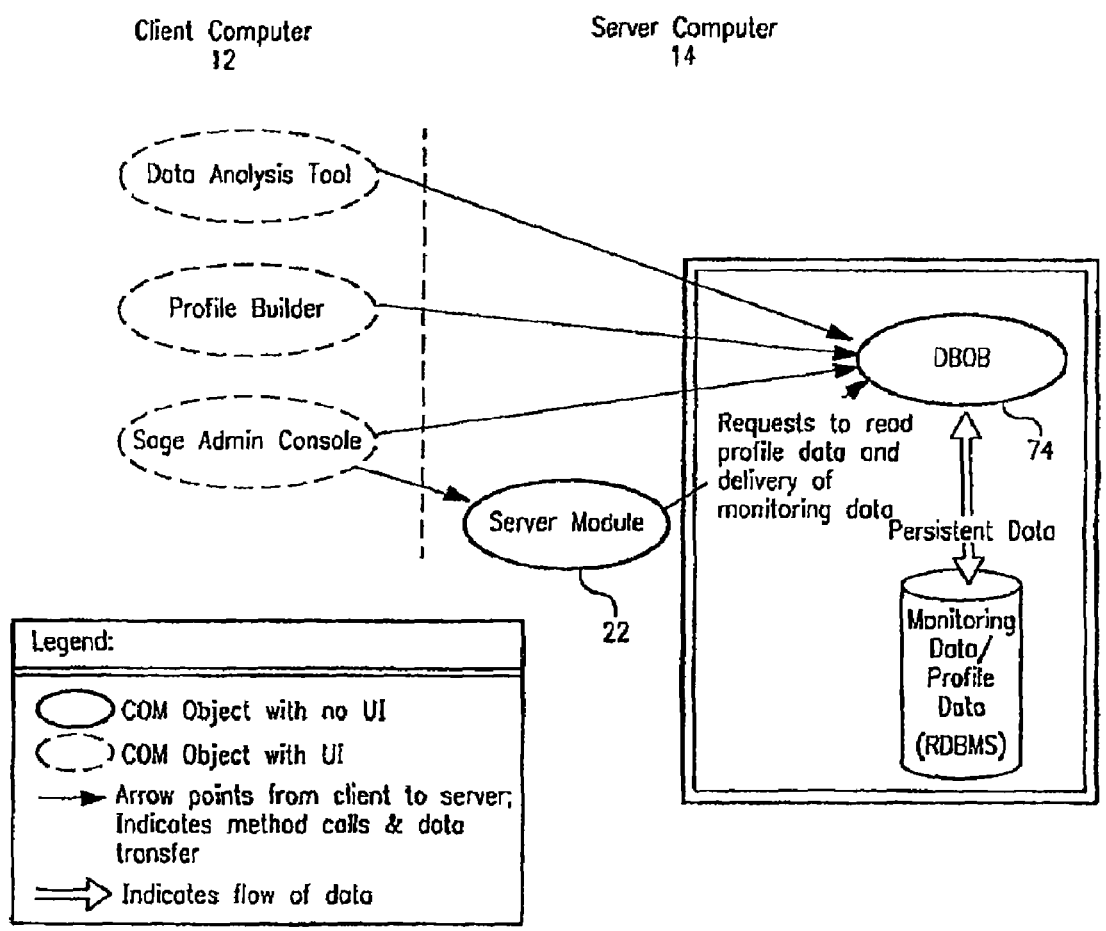
FIG. 43 highlights the server side components of the data management subsystem in accordance with the present invention.

FIG. 43 highlights the server side components of the data management subsystem in accordance with the present invention. As discussed below, the server side components included within this subsystem include (i) the DBOB, and (ii) an ODBC Database Management System used by the DBOB to store persistent object data. The RDBMS is an external component to the subsystem supporting a standard ODBC API. Essentially all of the Data Management is incorporated into the definition of the DBOB as described below.

DBOB

The DBOB functions as a gateway to the Profile, Monitoring Data, and Report Template Databases. The DBOB represents data in each of these databases as independent objects. The DBOB provides a set of interfaces that support access and manipulation of these objects. The DBOB is ultimately responsible for the consistency of the objects relative to the data in these databases. The interfaces of the DBOB completely define how the data within the databases may be manipulated.

In providing access to, and managing databases, the DBOB isolates the low-level storage and methods used to access these from its clients. Clients of the DBOB see the data objects in a way that is natural to the client, rather than as database rows and columns.

Because the Profile builder requires read/write access to the Profile database, and multiple instance of the Profile builder may exist, the DBOB supports multiple simultaneous writers using a mechanism such as transactions or record locking.

Relationship to ODBC Data Base Management Systems

Figure 44:
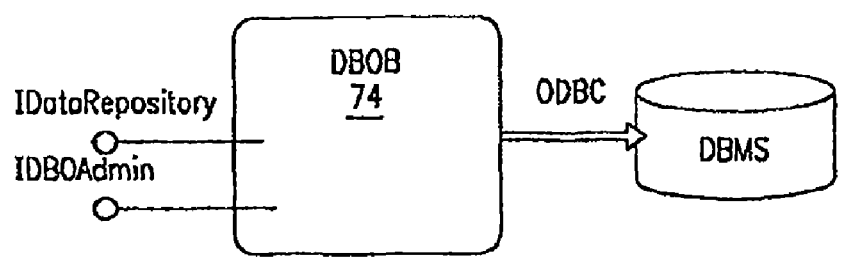
FIGS. 44 and 45 represent the process of accessing various database management systems from the DBOB via an ODBC interface.
Figure 45:
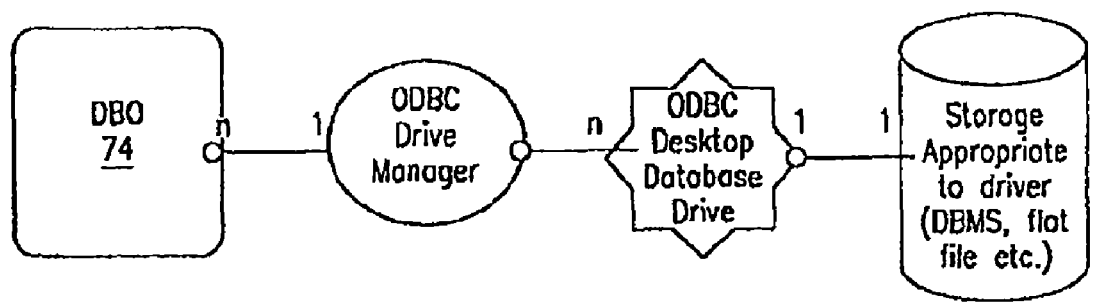

FIGS. 44 and 45 represent the process of accessing various database management systems from the DBOB via an ODBC interface. ODBC allows the DBOB to operate on as many different storage models as there are ODBC Desktop Database Drivers. The DBOB need not contain any special case code to support the requirement that it communicate with all major commercial database products.

The DBOB isolates the use of ODBC to a single module and exposes the profile management interfaces as well as the data reporting IDataRepository interface. The DBOB is a public service available through the server module 22. The primary users are the server module 22 itself and the Admin Console. The Profile builder and Data Analysis Tool each make direct connection to the DBOB for access to the Profile and Report Template Databases.

The DBOB is primarily useful in connection with profile management, organization of data entry, and management of archived data. Queries are carried out via ODBC, using standard SQL queries serviced by the SQL server of the DBMS of choice. The DBOB is not involved in query operations. This makes it possible to employ commercially available graphing and analysis tools in the design of the Data Analysis Toolkit (DAT).

Relationship to Admin Console

Figure 46:
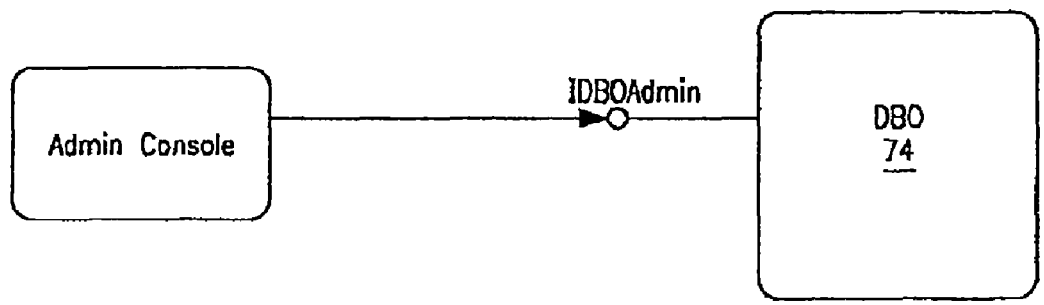
FIG. 46 represents certain aspects of the management of the DBOB via the Admin Console.

Referring to FIG. 46, the DBOB is managed via the Admin Console. The main tasks involved in managing the DBOB are shown below:

Push Detailed Data to Report DB—For performance reasons the raw monitoring data is inserted into fully normalized tables. The input schema is separate from the reporting schema from which queries are made by the Data Analysis tooL Through the Admin Console the administrator controls the frequency at which monitoring data is pushed from the input schema to the reporting schema.

Truncate Data From Report DB—Monitoring Data can be automatically truncated after a specific period of time (in days) or when a specified quantity of data is reached.

Relationship to Server Module

Figure 47:
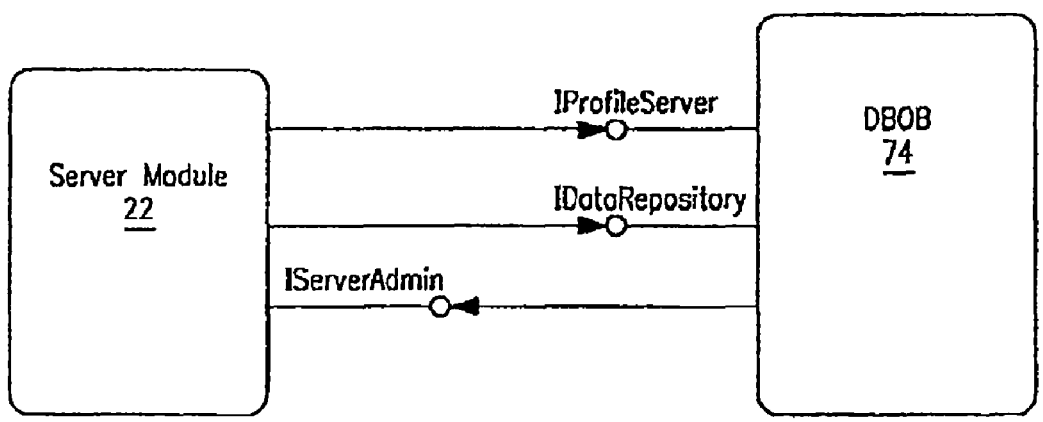
FIG. 47 illustratively represents the client-server relationship between the server module and the DBOB.

Referring to FIG. 47, the server module 22 is a client of the DBOB. A server module 22 makes two basic demands on the DBOB:

Request for Monitoring Profiles. When the server module 22 requests a Monitoring Profile, it will pass the username and IP address of the machine for which the profile is being requested. The DBOB must return the appropriate Monitoring Profile. The Monitoring Profile requested in this way, is a read-only copy. It will not be modified in any way.

The ability to archive the collected data in a timely fashion.

Relationship to Profile Builder

Figure 48:
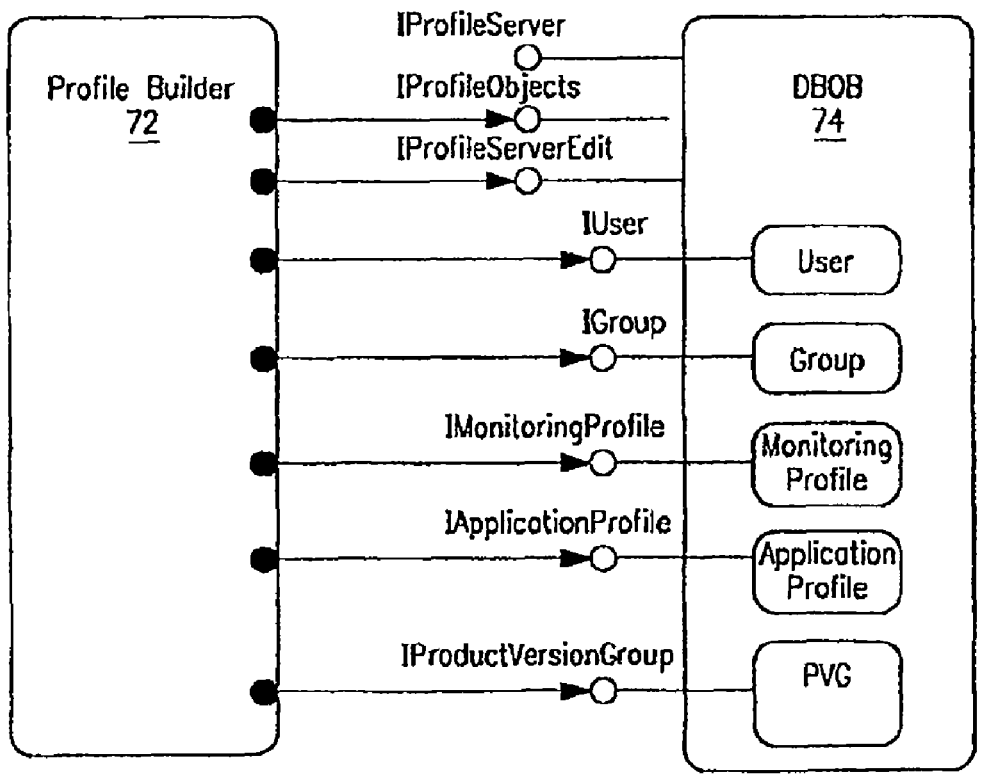
FIG. 48 shows one manner in which the profile builder is able to utilize the DBOB to manipulate profile database objects.

Referring to FIG. 48, the Profile builder makes use of the DBOB to manipulate profile database objects. Various interfaces of the DBOB are used as shown below. The profile builder requires close control over the manipulation of objects contained in the Profile Database. In fact, most of the interfaces of the DBOB are expressly designed to support the profile builder. The Profile builder requires support for all the following:

Creation, modification and management of all Profile Database objects (Users, Groups, Monitoring Profiles, Application Profiles, and Product Version Groups)

Management of all relationships between all Profile Database objects.

Figure 49:
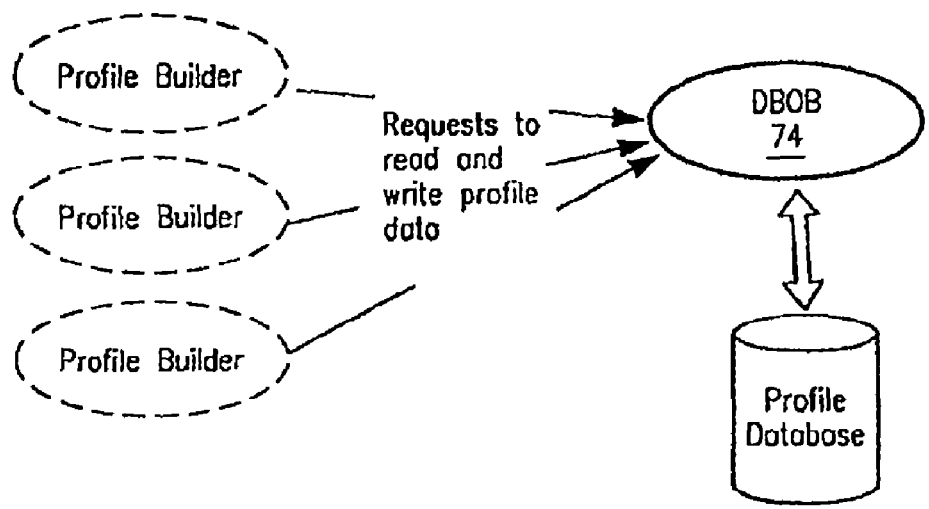
FIG. 49 represents the simultaneous handling by the DBOB of multiple profile builder clients.

To support these requirements, the profile builder requires read-write access to data served by the DBOB. Furthermore, the DBOB is preferably prepared to handle multiple simultaneous profile builder clients as shown in FIG. 49.

Relationship to Data Analysis Toolkit

Figure 50:
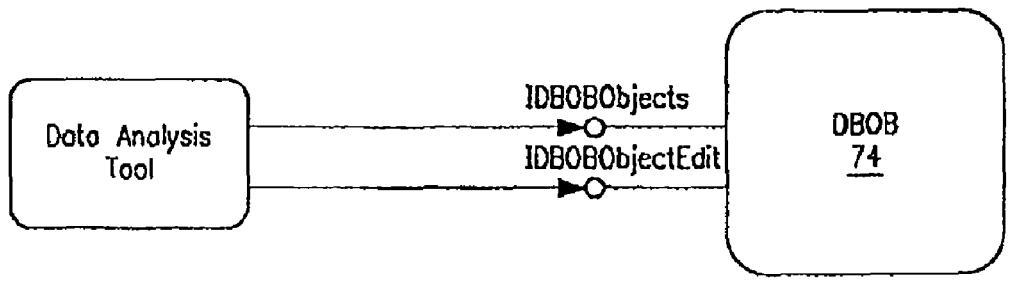
FIG. 50 represents the manner in which DBOB is to construct and hold COM objects for data represented in a reports analysis database.

Referring to FIG. 50, one function of the DBOB is to construct and hold COM objects for data represented in the reports analysis database. The DBOB supports the definition of report templates, parameter descriptions, and property page definitions. It does not perform the querying of data for display (reporting) purposes. Data Analysis Toolkit (DAT) queries are preferably carried out via standard SQL as supported by the DBMS of choice. Not involving the DBOB in DATA query operations makes it possible to employ commercially available graphing and analysis tools in the design of the DAT.

Interfaces

Figure 51:
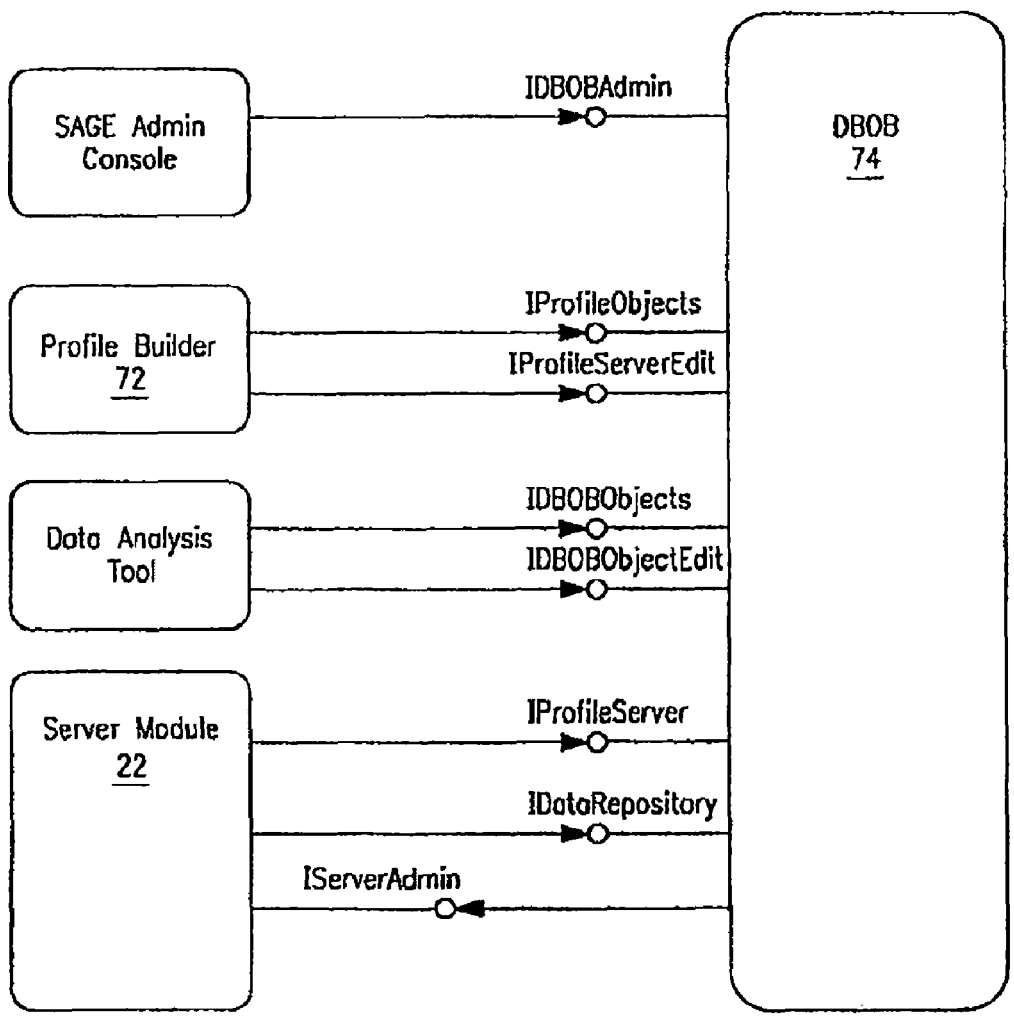
FIG. 51 depicts a complete set of interfaces used between the DBOB and other system objects.

FIG. 51 depicts a complete set of interfaces used between the DBOB and other objects in a preferred implementation. The DBOB preferably supports the following interfaces:

IDataRepository

IProfileObjects

IProfileserver moduleEdit

IProfileserver module
IDataManagement
IDBOBObjects
IDBOBObjectEdit

The DBOB also uses the Iserver moduleAdmin interface of the server module 22. The interfaces are explained in the following sections.

IDataRepository

The IDataRepository is used put data items collected from client monitoring agents. It is defined as follows:

```
interface IDataRepository: Iunknown
{
    // Give a data packet (streamed) to the data repository for processing
    HRESULT PutDataPacket([in] IStream* pDataStream);
}
```

TABLE XXV

| IDataRepository Method | Description |
| --- | --- |
| PutDataPacket ( ) | Called by the server module 22 to pass a stream of monitoring data to the DBOB for archival in the database. The data records in the packet are loaded into the DBMS. |

IProfileserver module

The IProfileserver module interface is used to retrieve a user's monitoring profile info. The definition is a follows:

```
interface IProfileserver module :   IUnknown
{
HRESULT GetUserProfileInfo(
                [in]    OLECHAR wszUserName[MAX_SAGE_NAME],
                [in]    OLE CHAR wszClntHostName[MAX_SAGE_NAME],
                [in]    OLECHAR wszIPMatch[MAX_SAGE_NAME],
                [in]    REFIID riid, [out,iid_ is(riid)] void** ppv,
                [out]   DWORD* UserID);
```

TABLE XXVI

| IProfileserver Method | module | Description |
| --- | --- | --- |
| GetUserProfileInfo ( ) | | Retrieve the complete Monitoring Profile for a user. The name and IP match uniquely identify the user. The reference interface ID indicates the desired interface to be returned by the method. |

The method, IProfileserver module::GetUserProfileInfo( ), is specifically designed to provide the server module 22 a means to retrieve the complete Monitoring Profile for a user. The DBOB resolves any profile assignment conflicts using the monitoring profile precedence hierarchy. It also merges any application profiles so that the features to be monitored are unambiguously defined. The resulting user profile info retrieved is current only for the time of retrieval. Subsequent changes to the user profile will require another fetch of the user's monitoring profile info. In other words, the retrieved COM object held by the DBOB is not synchronized with the Monitoring Profile database.

IProfileObjects

The IProfileObjects interface gives clients the ability to enumerate all the possible objects in the Profile Database. It is defined as follows:

```
interface IProfileObjects : Unknown
{
// Enumerators using the standard TProfileObjectDigest
HRESULT    EnumUsers ( [out] IEnumProfileObjects** ppEnumUsers);
HRESULT    EnumGroups ( [out] IEnumProfileObjects** ppEnumGroups);
HRESULT    EnumMonProfiles ( [out] IEnumProfileObjects** ppEnumMPs);
HRESULT    EnumAppprofiles ( [out] IEnumProfileObjects** ppEnumAPs);
HRESULT    EnumProductVersionGroups(
           [out] IEnumProfileObjects** ppEnumPVGs);
HRESULT    EnumApps ( [out] IEnumProfileObjects**  ppEnumApps);
HRESULT    EnumMonitoringSchedules(
           [out] IEnumProfileObjects**    ppEnumMonScheds);
HRESULT    EnumHolidaySchedules(
           [out] IEnumProfileObjects**    ppEnumHolScheds);
\\ Enumerators using enhanced digest per object type
HRESULT    EnumAppsEx ( [out] IEnumApps**    ppEnumApps);
HRESULT    EnumUsersEx ( [out] IEnumUsers**  ppEnumUsers);
```

TABLE XXVII

| IProfileObjects Method | Description |
| --- | --- |
| EnumUsers( ) | Enumerate the users in the monitoring profile database. |
| EnumGroups( ) | Enumerate the groups in the monitoring profile database. |
| EnumMonProfiles( ) | Enumerate the monitoring profiles in the monitoring profile database. |
| EnumAppProfiles( ) | Enumerate the application profiles in the monitoring profile database. |
| EnumProductVersionGroups( ) | Enumerate the PVGs in the monitoring profile database. |
| EnumApps( ) | Enumerate the Applications in the database. |
| EnumMonitoringSchedules( ) | Enumerate the monitoring schedules in the database. These control when monitoring occurs on the client. |
| EnumHolidaySchedules | Enumerate the holiday schedules in the database. These control when monitoring occurs on the client. |

TABLE XXVII-continued

| IProfileObjects Method | Description |
| --- | --- |
| EnumAppsEx( ) | Enumerate the Applications in the database returning additional info not provided by EnumApps( ). |
| EnumUsersEx( ) | Enumerate the Applications in the database returning additional info not provided by EnumUsers( ). |

The enumeration methods, IProfileObjects::EnumXXXs( ), each provide an enumerator the client can use to enumerate over each of the primary object types stored in the Profile Database. In each case, the type returned by the method is the same. It is an enumerator that delivers object IDs and Object Names for the object type being enumerated. The full declaration of IEnumProfileObjects is shown below.

```
interface IEnumProfileObjects : IUnknown
{
    typedef [v1_enum] enum  tagTProfileObjectType
    {
        PO_USER = 0, PO_GROUP, PO_MON_PROFILE,
        PO_APP_PROFILE, PO_APP, PO_PRODVERGROUP,
        PO_MON_SCHED, PO_HOLIDAY_SCHED,
        PO_INVALID
    } TProfileObjectType;
    typedef struct tagTProfileObjectDigest
    {
        TProfileObjectType    dwObjectType;
        DWORD                 dwObjectID;
        OLECHAR               szObjectName[MAX_SAGE_NAME]
        OLECHAR
    szObjectDesc[MAX_SAGE_DESCRIPTION];
    } TProfileObjectDigest;
    [local]
    HRESULT Next(       [in] ULONG celt,
                        [out] TProfileObjectDigest *rgelt,
                        [out] ULONG *pceltFetched);
    [call_as (Next)]
    HRESULT RemoteNext(     [in] ULONG celt,
                            [out, size_is (celt),
                            length_is(*pceltFetched)]
                            TProfileObjectDigest    *rgelt,
                            [out] ULONG    *pceltFetched);
    HRESULT Skip ( [in] ULONG celt);
    HRESULT Reset ( );
    HRESULT Clone ( [out]    IEnumProfileObjects **ppenum);
}
```

As indicated by IEnumProfileObjects::Next( ), this enumerator allows the client to enumerate a series of structures, TProfileObjectDigest, that contain an ObjectType, ObjectID, and ObjectName and ObjectDescription. The ObjectType is an enumeration designating the type of profile object. The ObjectID is a unique number that identifies the object. It cannot change for the lifetime of the object. The ObjectName is a unique display name shown to human users. Although unique, the ObjectName can be changed during the lifetime of the object. ObjectDescription is a brief description of the object displayed to human users.

Profile Database Object Interfaces

Figure 52:
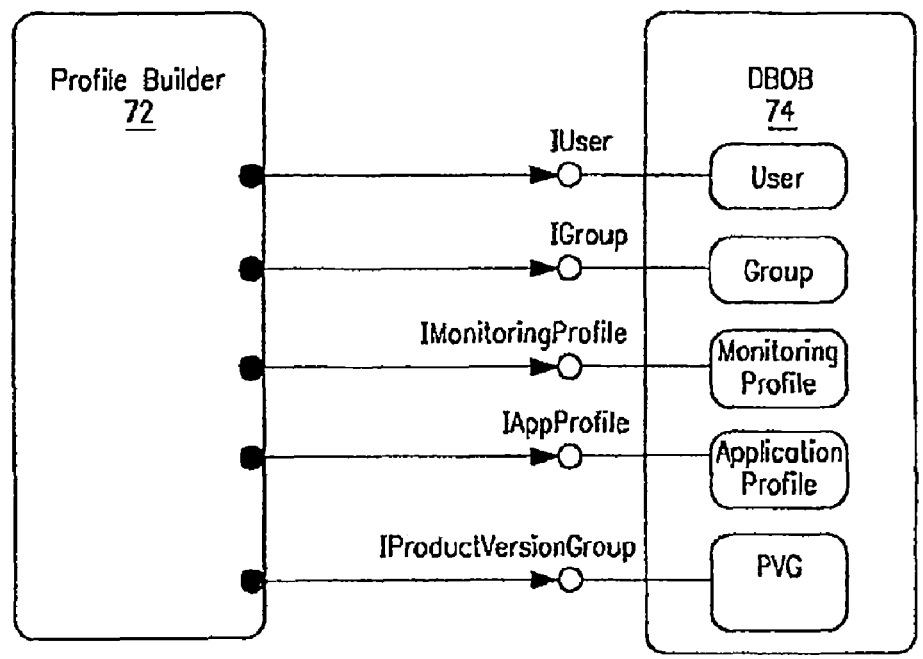
FIG. 52 depicts the profile database objects and their interfaces.

Objects within the Profile Database are exposed to clients of the DBOB as COM objects. The profile database objects, and their interfaces are depicted in FIG. 52. Each of the profile database objects is exposed as a COM object to DBOB Clients. Each supports a single, primary interface containing all possible operations.

IProfileDatabaseObject

All Profile Database objects have a name and ID. The name is intended to be displayed to users. Although the names are required to be unique within each object type, object names can change during the lifetime of the object. An Object's ID is a system-assigned, immutable, unique (within each type), identifier for the object. The interface below is the base interface for all profile database objects. It allows retrieval of the object ID and object name. It also allows the name to be changed.

```
interface IProfileDatabaseObject : IUnknown
{
    HRESULT GetDigest ( [out] TProfileObjectDigest* pdigest);
    HRESULT SetName ( [in] OLECHAR  wszName
    [MAX_SAGE_NAME] ) ;
    HRESULT SetDescription ( [in] OLECHAR
    wszDesc [MAX_SAGE_DESCRIPTION] ) ;
    HRESULT Persist ( [out] DWORD*  objectID);
}
```

TABLE XXVIII

| IProfileDatabaseObject Method | Description |
| --- | --- |
| GetDigest ( ) | Retrieve the name and id of the object. |
| SetName ( ) | Set the name of the object. This will fail if the new name is not unique among the object's type. |
| SetDescription( ) | Set the description of the object. |
| Persist ( ) | Saves the current state of the object to the DBMS. |

```
IUser
interface IUser : IProfileDatabaseObject
{
    HRESULT GetGroup ( [out] TProfileObjectDigest*       ppGroup);
    HRESULT SetGroup ( [in] DWORD dwGroupID);
    HRESULT GetMonitoringProfile ( [out] TProfileObjectDigest*
    pMProfile);
    HRESULT SetMonitoringProfile ( [in] DWORD dwMPID);
    HRESULT GetFullName ( [out] OLECHAR
    desc[MAX_SAGE_NAME] );
    HRESULT SetFullName ( [in] OLECHAR
    desc[MAX_SAGE_NAME] );
}
```

TABLE XXIX

| IUser Method | Description |
| --- | --- |
| GetGroup( ) | Get the user's group. A user object is required, at all times, to have a group. |

TABLE XXIX-continued

| IUser Method | Description |
|---|---|
| SetGroup( ) | Modify the user's group. This method will remove the user's current group association and add the user to a different group. |
| GetMonitoringprofile( ) | Retrieve the monitoring profile that has been specifically assigned to this user, if one exists. It is possible that no monitoring profile has been assigned. |
| SetMonitoringProfile( ) | Assign a specific monitoring profile for this user. When set, this overrides the monitoring profile the user has by virtue of the user's group association. |
| GetFullNarne( ) | Used to retrieve the full user name(Ken W. Smith). In contrast the GetName( ) method inherited via IprofileDatabaseObject would return the username(kenw). |
| SetFullName( ) | Sets the full username. See above. |

```
Igroup interface IGroup: IProjileDatabaseObject
{
    HRESULT EnurnUsers ( [out] IEnurnProfileObjects**
    ppEnumUsers);
    HRESULT GetMonitoringProfile ( [out] TProfileObjectDigest*
    pMProfile);
    HRESULT SetMonitoringprofile ( [in] DWORD dwMPID);
}
```

TABLE XXX

| IGroup Method | Description |
|---|---|
| EnumUsers( ) | Enumerate the users that are a member of this group. |
| GetMonitoringprofile( ) | Get the monitoring profile that this group is associated with. Groups are required to have an associated monitoring profile at all times. |
| SetMonitoringProfile( ) | Change the monitoring profile used by this group. |

```
interface IMonitoringProfile: IProfileDatabaseObject
{
    HRESULT EnumAssignedUsers ( [out]
    IEnumProfileObjects** ppEnumUsers);
    HRESULT EnumUsingGroups ( [out]
    IEnumProfileObjects** ppEnumGroups);
    HRESULT EnumAppProfiles ( [out] IEnumProfileObjects**
    ppAppProfiles);
    HRESULT AddAppProfile ( [in] DWORD APID);
    HRESULT RemoveAppprofile ( [in] DWORD APID);
    HRESULT GetSuspendCollectionFlag ( [out] BOOL*
    pbSuspended);
    HRESULT SetSuspendCollectionFlag ( [in] BOOL bSuspended);
    HRESULT GetMonitoringBufferLimit ( [out] DWORD*
    pdwNumBytes);
    HRESULT SetMonitoringBufferLimit ( [in] DWORD dwNumBytes);
    HRESULT GetMinReportingInterval ( [out] DWORD* pdwInterval);
    HRESULT SetMinReportingInterval ( [in] DWORD dwInterval);
    HRESULT GetInputSummaryTime ( [out] DWORD* dwInterval);
    HRESULT SetInputSummaryTime ( [in] DWORD dwInterval);
    HRESULT GetMonitoringScheduleID ( [out] DWORD*
    dwSchedID);
    HRESULT SetMonitoringScheduleID ( [in] DWORD dwSchedID);
}
```

TABLE XXXI

| IMonitoringProfile Method | Description |
|---|---|
| EnumAssignedUsers( ) | Enumerate the users assigned to this monitoring profile. |
| EnumUsingGroups( ) | Enumerate the groups using this monitoring profile. |
| EnumAppProfiles( ) | Enumerate the application profiles that this monitoring profile is using. |
| AddAppProfile( ) | Add an application profile to the current monitoring profile. |
| RemoveAppProfile( ) | Remove an application from the current monitoring profile. |
| GetSuspendedCollectionFlag( ) | Gets the flag which determines whether or not data collection is suspended for this Monitoring Profile. |
| SetSuspendedCollectionFlag( ) | Sets the collection suspended flag. See above. |
| GetMonitoringBufferLimit( ) | Get the monitoring buffer limit. The monitoring buffer limit is used by the client monitoring agent in limiting its event data cache size. |
| SetMonitoringBufferLimit( ) | Set the monitoring buffer limit. |
| GetMinReportingInterval( ) | Get the minimum reporting interval. |
| SetMinReportingInterval( ) | Set the minimum reporting interval. |
| GetInputSummaryTime( ) | Get the interval at which input events(mouse & kbd) are summarized. |
| SetInputSummaryTime( ) | Set the input summary interval. |
| GetMonitoringScheduleID( ) | Get the ID of the monitoring schedule in use by the profile. |
| SetMonitoringScheduleID( ) | Set the ID of the monitoring schedule in use by the profile |

IAppProfile

The IAppProfile interface provides access to application and feature information for a specific application profile.

```
interface IAppprofile: IProfileDatabaseObject
{
    // The product version group this profile is based upon
    HRESULT GetproductVersionGroupID ( [out] DWORD* pPVGID);
    HRESULT SetproductVersionGroupID ( [in] DWORD PVGID);
    // Enum all features associated with this profile
    HRESULT EnumFeatures ( [out] IEnumFeatures**
    ppEnumFeatures);
    // Add or Remove a specific feature from the profile
    HRESULT AddFeature ( [in] DWORD featureID,
    [in] BOOL bRestricted);
    HRESULT RemoveFeature ( [in] DWORD featureID);
    // Set the restricted flag (veto) a feature
    HRESULT SetFeatureRestrictedFlag ( [in] DWORD featureID,
                [in] BOOL bRestricted);
}
```

TABLE XXXII

| IAppProfile Method | Description |
| --- | --- |
| GetproductVersionGroupID( ) | Retrieve the ID of the PVG with which the App Profile is associated. |
| SetproductVersionGroupID( ) | Set the ID of the PVG with which the App Profile is associated. |
| EnumFeatures( ) | Enumerate the features tracked by this App Profile. This will be a subset of the features available through the associated PVG. |
| AddFeature( ) | Add a Feature to this App Profile from the set of features maintained by the associated PVG. |
| RemoveFeature( ) | Remove a Feature from the App Profile. |
| SetFeatureRestrictedFlag( ) | Flag the feature as being Restricted. This means that it will be made unavailable to the user. |

The enumeration method, Enum Features( ), provides an enumerator to access all features associated with the application profile. The full declaration of IEnumFeatures is shown below.

```
interface IEnumFeatures  :  IUnknown
{
    // Enum to describe the type of feature
    typedef [v1_enum] enum tagTFeatureType
    {
            FEATURE_ACCESSIBLE = 0,
            FEATURE_ACCELERATOR
    } FeatureType;
    typedef struct tagFeatureDigest
    {
            DWORD    featureID;
            FeatureType type;
            OLECHAR        name [MAX_SAGE_NAME];
            OLECHAR        description [MAX_SAGE_DESCRIPTION
            DWORD    roleID;
            OLECHAR        role[MAX_ROLE_TEXT];
            boolean        restrict;
            boolean        canRestrict;
    } TFeatureDigest;
    [local]
    HRESULT Next ( [in]    ULONG celt,
                    [out]    TFeatureDigest *rgelt,
                    [out]    [out] ULONG *pceltFetched);
    [call_as (Next)]
    HRESULT RemoteNext( [in] ULONG celt,
                    [out, size_is(celt), length_is (*pceltFetched) ]
                    TFeatureDigest *rgelt,
                    [out] ULONG *pceltFetched);
    HRESULT Skip ( [in] ULONG celt);
    HRESULT Reset( );
    HRESULT Clone ( [out] IEnumFeatures **ppenum);
};
```

As indicated by IEnumFeatures::Next( ), the enumerator fills a structure, TFeatureDigest, that contains general information relating to the specific feature. Detailed information for the feature is obtained through the IFeature interface, as described in the next section.

IFeature

The IFeature interface provides access to information obtained through Active Accessibility.

```
interface IFeature : IUnknown
{
    //Not a ProfileDatabaseObject..
    //Features are persisted by the parent ProdVerGroup
    //Methods common to all feature types
    HRESULT GetDigest ( [out] TFeatureDigest* pdigest);
    HRESULT SetName ( [in] OLECHAR wszName [MAX_SAGE_NAME] );
    HRESULT SetDescription ( [in] OLECHAR descr[MAX_SAGE_DESCRIPTION] );
    HRESULT GetDescription ( [out] OLECHAR descr[MAX_SAGE_DESCRIPTION] );
    //Feature restriction
    HRESULT SetRestrictionCapability ( [in] BOOL bCanRestrict);
    HRESULT GetRestrictionCapability ( [out] BOOL* pbCanRestrict);
    //Type of feature: FEATURE_ACCESSIBLE or FEATURE_ACCELERATOR
    HRESULT SetType ( [in] FeatureType type);
    HRESULT GetType ( [out] FeatureType* pType);
    //Accessible object methods
    HRESULT SetAccDescription(
            [in] OLECHAR accDescription[MAX_SAGE_DESCRIPTION] );
    HRESULT GetAccDescription(
            [out] OLECHAR accDescription[MAX_SAGE_DESCRIPTION] );
    HRESULT SetAccName ( [in] OLECHAR Name[MAX_SAGE_NAME] );
    HRESULT GetAccName ( [out] OLECHAR Name[MAX_SAGE_NAME] );
    HRESULT SetAccSearchName ( [in] TAccSearchCode searchCode,
            [in] OLECHAR srchName [MAX_SAGE_NAME] );
    HRESULT GetAccSearchName ( [out] TAccSearchCode* pSearchCode,
            [out] OLECHAR srchName [MAX_SAGE_NAME] );
    HRESULT SetUseAccName ( [in] BOOL bUse);
```

```
    HRESULT GetUseAccName ( [out] BOOL* bUse);
    HRESULT SetAccRole ( [in] DWORD roleID,
            [in] OLECHAR accRole[MAX_ROLE_TEXT] );
    HRESULT GetAccRole ( [out] DWORD* roleID,
            [out] OLECHAR accRole[MAX_ROLE_TEXT] );
    HRESULT SetUseAccRole ( [in] BOOL bUse);
    HRESULT GetUseAccRole ( [out] BOOL* bUse);
    HRESULT SetAccWindowClass ( [in] OLECHAR accWindowClass [MAX_SAGE NAME] );
    HRESULT GetAccWindowClass(
            [out] OLECHAR accwindowClass[MAX_SAGE_NAME] );
    HRESULT SetUseAccWindowClass ( [in] BOOL bUse);
    HRESULT GetUseAccWindowClass ( [out] BOOL* bUse);
    HRESULT SetPosition ( [in] long xpos, [in] long ypos);
    HRESULT GetPosition ( [out] long* pxpos, [out] long* pypos);
    HRESULT SetUsePosition ( [in] BOOL bUse);
    HRESULT GetUsePosition ( [out] BOOL* bUse);
    HRESULT SetSize ( [in] long width, [in] long height);
    HRESULT GetSize ( [out] long* pwidth, [out] long* pheight);
    HRESULT SetUseSize ( [in] BOOL bUse);
    HRESULT GetUseSize ( [out] BOOL* bUse);
    HRESULT SetControlID ( [in] long controlID);
    HRESULT GetControlID ( [out] long* pcontrolID);
    HRESULT SetUseControlID ( [in] BOOL bUse);
    HRESULT GetUseControlID ( [out] BOOL* bUse);
    HRESULT SetAccessibleID ( [in] long accID);
    HRESULT GetAccessibleID ( [out] long* paccID);
    HRESULT SetUseAccessibleID ( [in] BOOL bUse);
    HRESULT GetUseAccessibleID ( [out] BOOL* bUse);
    //Which accessible attrs are valid for this feature
    //uses the type "TAccUsageFlag"
    HRESULT SetValidAccAttrFlag ( [in] DWORD validFlag);
    HRESULT GetValidAccAttrFlag ( [out] DWORD* pvalidFlag);
    // accelerator methods
    HRESULT SetVirtualKeyCode ( [in] byte vkCode);
    HRESULT GetVirtualKeyCode ( [out] byte* pVkCode);
    HRESULT SetUseShiftKey ( [in] BOOL bUse);
    HRESULT GetUseShiftKey ( [out] BOOL* pbUse);
    HRESULT SetUseControlKey ( [in] BOOL bUse);
    HRESULT GetUseControlKey ( [out] BOOL* pbUse);
    HRESULT SetUseAltKey ( [in] BOOL bUse);
    HRESULT GetUseAltKey ( [out] BOOL* pbUse);
    //Feature Ancestor methods
    HRESULT EnumFeatureAncestors ( [out] IEnumFeatureAncestor** ppEnum);
    HRESULT AddAncestor ( [in] TFeatureAncestor* ancestor);
    HRESULT UpdateAncestor ( [in] TFeatureAncestor* ancestor);
}
```

TABLE XXXIII

| IFeature Method | Description |
|---|---|
| GetDigest( ) | Retrieve the associated TFeatureDigest structure. |
| SetName( ) | Set the name for the feature. |
| SetDescription( ) | Set the human readable description for the feature. |
| GetDescription( ) | Set the human readable description for the feature. |
| SetRestrictionCapability | Specify whether or not the feature can be restricted. |
| GetRestrictionCapability | Determine whether or not the feature can be restricted. |
| SetType( ) | |
| GetType( ) | |
| SetAccDescription( ) | |
| GetAccDescription( ) | |
| SetAccName( ) | |
| GetAccName( ) | |
| SetAccSearchName( ) | |
| GetAccSearchName( ) | |
| SetUseAccName( ) | |
| GetUseAccName( ) | |
| SetAccRole( ) | |
| GetAccRole( ) | |
| SetUseAccRole( ) | |
| GetUseAccRole( ) | |
| SetAccWindowClass( ) | |
| GetAccWindowClass( ) | |
| SetUseAccWindowClass( ) | |
| GetUseAccWindowClass( ) | |
| SetPosition( ) | |
| GetPosition( ) | |
| SetUsePosition( ) | |
| GetUsePosition( ) | |
| SetSize( ) | |
| GetSize( ) | |
| SetUseSize( ) | |

TABLE XXXIII-continued

| IFeature Method | Description |
| --- | --- |
| GetUseSize( ) | |
| SetControlID( ) | |
| GetControlID( ) | |
| SetUseControlID( ) | |
| GetUseControlID( ) | |
| SetAccessibleID( ) | |
| GetAccessibleID( ) | |
| SetUseAccessibleID( ) | |
| GetUseAccessibleID( ) | |
| SetValidAccAttrFlag( ) | |
| GetValidAccAttrFlag( ) | |
| SetVirtualKeyCode( ) | |
| GetVirtualKeyCode( ) | |
| SetUseShiftKey( ) | |
| GetUseShiftKey( ) | |
| SetUseControlKey( ) | |
| GetUseControlKey( ) | |
| SetUseAltKey( ) | |
| GetUseAltKey( ) | |
| EnumFeatureAncestors( ) | |
| AddAncestor( ) | |
| UpdateAncestor( ) | |

The enumeration method, EnumFeatureAncestors( ), provides an enumerator to access all ancestors associated with the feature. Ancestry information defines a hierarchy of user interface windows related to a specific feature. The full declaration of IEnumFeatureAncestor is shown below.

```
interface IEnumFeatureAncestor : IUnknown
{
    typedef [v1_enum] enum tagTAccUseFlags
    {
            ACC_USE_NONE            = 0x0,
            ACC_USE_NAME            = 0x1,
            ACC_USE_WINCLASS    = 0x2,
            ACC_USE_ROLE            = 0x4,
            ACC_USE_POSITION    =0x8,   // Use parent-relative position
            ACC_USE_SIZE            = 0x10,   // Use accessible object size
            ACC_USE_CONTROLID   = 0x20,       // Use HWND control ID value
            ACC_USE_ACCESSIBLEID = 0x40       // Use accessible ID value
    } TAccUsageFlag;
    // Enum to describe the search method used in feature names
    typedef [v1_enum] enum tagTAccSearch Code
    {
            ACC_SEARCH_EXACT = 0,
            ACC_SEARCH_SUBSTR,
            ACC_SEARCH_STARTSWITH,
            ACC_SEARCH_INVALID
    }   TAccSearchCode;
    typedef struct tagFeatureAncestor
    {
            DWORD dwUsageFlags;             // Which identity attrs to use
            DWORD dwValidAccFlags;          // Which identity attrs are valid
            DWORD dwLevel;
            OLECHAR wszAccRole[MAX_ROLE_TEXT];
            DWORD dwAccRoleID;
            OLECHAR      wszAccName[MAX_SAGE_NAME];
            OLECHAR      wszAccWinClass[MAX_SAGE_NAME];
            OLECHAR      wszAccSearchName[MAX_SAGE_NAME];
            TAccSearchCode     nameSearchCode;
            long xpos;
            long ypos;
            long width;
            long height;
            long controlID;
            long accessibleID;
    } TFeatureAncestor;
    [(local]
    HRESULT Next ( [in] ULONG celt,
                        [out] TFeatureAncestor *rgelt,
                        [out] ULONG *pceltFetched);
    [call_as (Next) ]
    HRESULT RemoteNext ( [in] ULONG celt,
                        [out, size_is(celt), length_is (*pceltFetched)]
                        TFeatureAncestor *rgelt,
                        [out] ULONG *pceltFetched);
    HRESULT Skip ([in] ULONG celt);
    HRESULT Reset( );
    HRESULT Clone([out] IEnumFeatureAncestor **ppenum);
}
```

As indicated by IEnumFeatureAncestor::Next( ), the enumerator fills a structure, TFeatureAncestor, that contains information relating to the specific feature ancestor.

IProfileserver moduleEdit

IProfileserver moduleEdit allows creation, deletion and editing of all profile database objects. The complete interface is shown below:

```
interface IProfileserver moduleEdit :   IUnknown
{
    // monitoring profile
    HRESULT NewMonitoringProfile(
                [in] OLECHAR
                wszMPName[MAX_SAGE_NAME],
                [in] REFIID                                         riid,
                [out, iid_is(riid)]         void**       ppv);
    HRESULT EditMonitoringProfile(
                [in] DWORD                  MPID,
                [in] REFIID                                         riid,
                [out, iid_is (riid) ]       void**       ppv);
    HRESULT DeleteMonitoringProfile(
                [in] DWORD                  MPID
                [in] BOOL                                bReassignGroups);
    // app profile
    HRESULT NewApplicationProfile(
                [in] OLECHAR
                wszAPPName [MAX_SAGE_NAME],
                [in] REFIID                                         riid,
                [out, iid_is(riid) ]        void**       ppv);
    HRESULT EditApplicationprofile(
                [in] DWORD                  APID,
                [in] REFIID                                         riid,
                [out,   iid_is(riid) ]  void**           ppv);
    HRESULT DeleteApplicationprofile ( [in] DWORD        APID);
    //group
    HRESULT NewGroup ( [in] OLECHAR
    wszGroupName[MAX_SAGE_NAME],
                [in]    DWORD
    MPID,
                [in]    REFIID                                      riid,
                [out, iid_is(riid) ]    void**           ppv);
    HRESULT EditGroup(
                [in] DWORD                  GroupID,
                [in] REFIID                                         riid,
                [out, iid_is(riid) ]        void**       ppv);
    HRESULT DeleteGroup(
                [in] DWORD                  GroupID,
                [in] BOOL
    bReassignUsers);
    //User
    HRESULT NewUser ( [in]    OLECHAR
    wszUserName[MAX_SAGE_NAME],
                [in] DWORD                  GroupID,
                [in] REFIID
    riid,
                [out,   iid_is(riid) ]  void**           ppv);
    HRESULT EditUser(
                [in] DWORD                  UserID,
                [in] REFIID
    riid,
                [out,   iid_is(riid) ]  void**           ppv);
    HRESULT DeleteUser ( [in] DWORD         GroupID);
    //Applications
    HRESULT NewApp(
                [in] OLECHAR
                fingerprint[MAX_SAGE_APP_FINGERPRINT],
                [in] REFIID                 riid,
                [out, iid_is(riid)]         void**       ppv);
    HRESULT EditApp(
                [in] DWORD                  appID,
                [in] REFIID                 riid,
                [out, iid_is(riid)]         void**       ppv);
    HRESULT DeleteApp ( [in] DWORD appID);
    HRESULT GetAppIDByFingerprint(
                [in] OLECHAR
                fingerprint[MAX_SAGE_APP_FINGERPRINT],
                [out] DWORD*                                        appID);
    // Product Version Groups
    HRESULT NewProductVersionGroup(
                [in] OLECHAR name [MAX_SAGE NAME],
                [in] REFIID                                         riid,
                [out, iid_is(riid) ]    void**           ppv);
    HRESULT EditProductVersionGroup(
                [in] DWORD                  PVGID,
                [in] REFIID                                         riid
                [out, iid_is(riid) ]    void**           ppv);
    HRESULT DeleteProductVersionGroup ( [in] DWORD PVGID);
    //Monitoring Schedules
    HRESULT NewMonitoringSchedule (
                [in]    OLECHAR name[MAX_SAGE_NAME],
                [in]    REFIID                                      riid,
                [out, iid_is(riid)]         void**       ppv);
    HRESULT EditMonitoringSchedule(
                [in]    DWORD               schedID,
                [in]    REFIID                                      riid,
                [out, iid_is(riid) ]    void**           ppv);
    HRESULT DeleteMonitoringSchedule ( [in] DWORDschedID);
    // Holiday Schedules
    HRESULT NewHolidaySchedule(
                [in]    OLECHAR name[MAX_SAGE_NAME],
                [in]    REFIID                                      riid,
                [out, iid_is(riid)]         void**       ppv);
    HRESULT EditHolidaySchedule(
                [in]    DWORD               schedID,
                [in]    REFIID                                      riid,
                [out, iid_is(riid)]         void**       ppv);
    HRESULT DeleteHolidaySchedule ( [in] DWORD schedID);
};
```

TABLE XXXIV

| IProfileserver moduleEdit Method | Description |
|---|---|
| NewMonitoringProfile( ) | Creates a new monitoring profile with the specified name and adds it to the database. The interface pointer for the monitoring profile is retrieved. |
| EditMonitoringProfile( ) | Retrieve an interface pointer on a specified monitoring profile, for direct manipulation of the monitoring profile. |
| DeleteMonitoringProfile( ) | Deletes an existing monitoring profile. When calling this method, the caller must specify what is to be done with groups that are currently using the profile. If bReassignGroups is set to TRUE, then groups currently using this profile will be reassigned to the "Default" profile. Otherwise the deletion of the monitoring profile will be cascaded to any Groups using this profile |
| NewApplicationProfile( ) | Create a new application profile. The Application profile initially has no relationships to other objects in the profile database, The interface pointer for the application profile is retrieved. |

TABLE XXXIV-continued

| IProfileserver moduleEdit Method | Description |
| --- | --- |
| EditApplicationProfile( ) | Retrieve an interface pointer on a specified application profile for direct manipulation of the application profile object. |
| DeleteApplicationProfile( ) | Delete an application profile. If any monitoring profiles are currently using this application profile, the relationship is deleted. |
| NewGroup( ) | Create a new group. Since groups are required to have an associated monitoring profile, an initial monitoring profile for the group must be specified. If the initial monitoring profile is specified as NULL, the group will use the "Default" monitoring profile. The interface pointer for the group is retrieved. |
| EditGroup( ) | Retrieve an interface pointer on a group for direct manipulation of the group object. |
| DeleteGroup( ) | Delete a Group. If bReassignUsers is TRUE, all users associated with the group will be re-assigned to the "Default" Group. If bReassignUsers is FALSE, all users associated with the group will be deleted. |
| NewUser( ) | Create a new user. Since users are required to have an associated group, and initial group for the user can be specified. If the initial group is specified as NULL, then the user will be added to the "Default" group. The interface pointer for the user is retrieved. |
| EditUser( ) | Retrieve an interface pointer on a user for direct manipulation of the user object. |
| DeleteUser( ) | Delete a user. The relationship with the User's group, and an assigned monitoring profile (if one is assigned) will be deleted. |
| NewApp( ) | Create a new Application. |
| EditApp( ) | Edit an existing Application. |
| DeleteApp( ) | Delete an Application. When an application is delete all recorded events and features for that app are also deleted. |
| GetAppIDByFingerPrint( ) | Get the ID of an Application using the unique Application Fingerprint String. |
| NewProductVersionGroup( ) | |
| EditProductVersionGroup( ) | |
| DeleteProductVersionGroup( ) | |
| NewMonitoringSchedule( ) | |
| EditMonitoringSchedule( ) | |
| DeleteMonitoringSchedule( ) | |
| NewHolidaySchedule( ) | |
| EditHolidaySchedule( ) | |
| DeleteHolidaySchedule( ) | |

Report Database Object Interfaces

Figure 53:
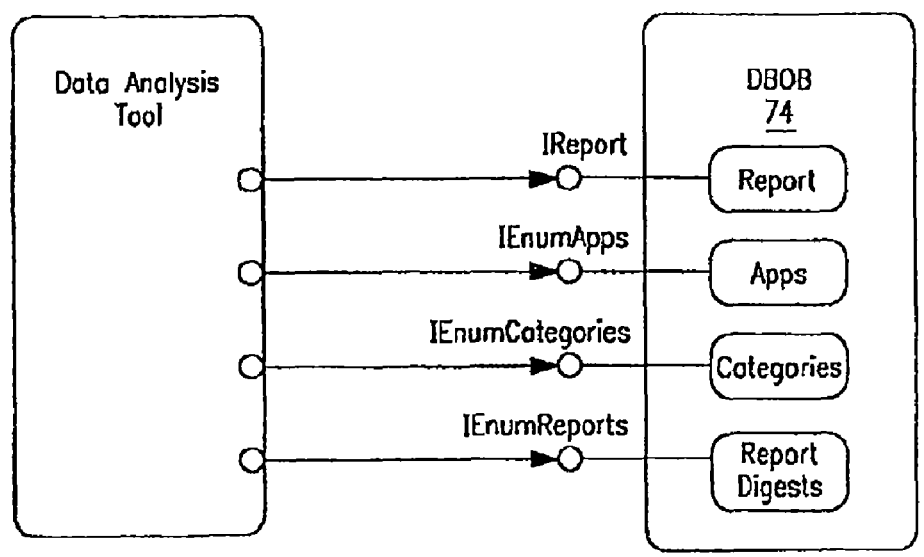
FIG. 53 depicts the report database objects and their interfaces.

Objects within the Report Database are exposed to clients of the DBOB as COM objects. The report database objects, and their interfaces are depicted in FIG. 53.

IReport

To access a specific report object for a report digest enumerated above, the following interface is used:

```
interface IReport: IUnknown
{
    HRESULT GetDigest ( [out] TReportDigest*      pDigest);
      HRESULT Persist ( [out] TReportDigest*      pDigest);
      HRESULT SetName ( [in] OLECHAR wszName[MAX_SAGE_NAME] );
        HRESULT GetName ( [out] OLECHAR wszName[MAX_SAGE_NAME] );
        HRESULT SetCategory ( [in] DWORD   dwCategoryID);
        HRESULT GetCategory ( [out] DWORD*   pdwCategoryID);
        HRESULT GetCategoryName ( [out] OLECHAR
wszCategoryName[MAX_SAGE_NAME] );
        HRESULT SetDescription(
                     [in] OLECHAR wszDescription[MAX_SAGE_DESCRIPTION] );
        HRESULT GetDescription(
                     [out] OLECHAR wszDescription[MAX_SAGE_DESCRIPTION] );
        HRESULT SetReportFile ([in]    IStream* pStream);
        HRESULT GetReportFile([out]    IStream** pStream);
    //Report Parameters
        HRESULT EnumParams([out]   IEnumParams**  ppEnumParams);        // r
        HRESULT ModifyParam(
                     [in] DWORD   dwParamNumber,
                     [in] OLECHAR   szDefaultValue[MAX_REPORT_PARAM_LEN],
                     [in] OLECHAR   szCaption[MAX_REPORT_PARAM_LEN],
                     [in] DWORD   dwPropertyID,
                     [in] DWORD   dwpropertyPageNumber);
    //Report property Page Instances
        HRESULT EnumReportPropPages(
                     [out] IEnumReportPages** ppEnum ReportPages);
```

-continued

```
HRESULT NewReportPropPage(
        [in] DWORD pageID,
            [in] OLECHAR   wszCaption[MAX_SAGE_NAME],
            [out] DWORD*   pdwPageNumber);
HRESULT ModifyReportpage(
        [in] DWORD dwPageNumber,
            [in] OLECHAR wszCaption[MAX_SAGE NAME]);
HRESULT DeleteReportPageInstance(
        [in] DWORD dwPageNumber);
};
```

TABLE XXXV

| IReport Method | Description |
|---|---|
| GetDigest( ) | |
| Persist( ) | |
| GetName( ) | |
| SetName( ) | |
| GetCategory( ) | |
| SetCategory( ) | |
| GetCategoryName( ) | |
| GetDescription( ) | |
| SetDescription( ) | |
| GetReportFile( ) | |
| SetReportFile( ) | |
| EnumParams( ) | |
| Modifyparam( ) | |
| EnumReportProppages | |
| NewReportPropPage | |
| ModifyReportpage | |
| DeleteReportPageInstance( ) | |

```
    IEnumAppsinteiface IEnumApps : IUnknown
interface IEnumAppS : IUnknown
{
    typedef struct    tagAppDigest
    {
        DWORD          appID;
        OLECHAR        appName[MAX_SAGE_NAME];
        OLECHAR        appExeName[MAX_SAGE_NAME];
        OLECHAR        appversion[MAX_SAGE_APP_VERSION];
        BOOL           appReviewed;
} TAppDigest;
[local]
HRESULT Next ( [in] ULONG celt,
            [out] TAppDigest *rgelt,
            [out] ULONG    *pceltFetched);
    [call_as (Next) ]
        HRESULT RemoteNext ( [in] ULONG celt,
                [out, size_is(celt),   length_is(*pceltFetched) ]
                TAppDigest *rgelt,
                [out] ULONG *pceltFetched);
    HRESULT Skip([in] ULONG celt);
    HRESULT Reset( );
    HRESULT Clone ( [out] IEnumApps **ppenum);
};
```

TABLE XXXVI

| IEnumApps Method | Description |
|---|---|
| Next( ) | Retrieve the next AppDigest record from the enumeration. Returns the record celt id to be used to mark the seek for the next record. |
| RemoteNext( ) | Retrieve the next AppDigest record from the remote server. This is mapped to Next( ) to support general retrieval of records from local and remote enumerations. |
| Skip( ) | Skip the next AppDigest record. |
| Reset( ) | Reset the enumeration to the beginning. |
| Clone( ) | Copy the enumeration |

IEnumReports

```
interface IEnumReports :   IUnknown
{
    typedef struct tagReportDigest
    {
        DWORD       reportID;
        OLECHAR     reportName[MAX_SAGE_NAME];
        DWORD       reportCategoryID;
        OLECHAR     reportDescription[MAX_SAGE_DESCRIPTION];
} TReportDigest;
[local]
HRESULT Next ( [in]    ULONG celt,
                [out]    TReportDigest *rgelt,
                [out]    ULONG *pceltFetched);
[call_as (Next)]
HRESULT RemoteNext ( [in] ULONG celt ,
                    [out, size_is (celt) , length_is(*pceltFetched) ]
                    TReportDigest *rgelt,
                    [out] ULONG *pceltFetched);
HRESULT Skip ( [in] ULONG celt);
HRESULT Reset( );
HRESULT Clone ( [out] IEnumReports **ppenum);
};
```

TABLE XXXVII

| IEnumReports Method | Description |
|---|---|
| Next( ) | Retrieve the next ReportDigest record from the enumeration. Returns the record celt id to be used to mark the seek for the next record. |
| RemoteNext( ) | Retrieve the next ReportDigest record from the remote server. This is mapped to Next( ) to support general retrieval of records from local and remote enumerations. |
| Skip( ) | Skip the next ReportDigest record. |
| Reset( ) | Reset the enumeration to the beginning. |
| Clone( ) | Copy the enumeration |

IEnumCategories

```
interface IEnumCategories : IUnknown
{
    typedef struct   tagCategory
    {
        DWORD          categoryID;
        OLECHAR        categoryName[MAX_SAGE_NAME];
}    TCategory:
    [local]
    HRESULT Next ( [in] ULONG celt,
                [out] TCategory *rgelt,
                [out] ULONG *pceltFetched);
    [call_as (Next) ]
    HRESULT RemoteNext( [in] ULONG celt,
                [out, size_is (celt), length_is (*pceltFetched) ]
                TCategory *rgelt,
                [out] ULONG *pceltFetched);
```

-continued

| IEnumCategories |
| --- |
| HRESULT Skip ( [in] ULONG celt);<br>HRESULT Reset( );<br>HRESULT Clone([out] IEnumCategories    **ppenum);<br>}; |

TABLE XXXVIII

| IEnumCategories Method | Description |
| --- | --- |
| Next( ) | |
| RemoteNext( ) | |
| Skip( ) | |
| Reset( ) | |
| Clone( ) | |

IDataManagement

The definition of the server module 22's IDataManagement interface is shown below:

```
interface IDataManagement: IUnknown
{
    //  Used to manage the active data management tasks
    //  performed by the DBOB
    HRESULT GetTruncateModel([in]   REFIID riid,
                    [out,  iid_is(riid)  void**  ppv);
    HRESULT GetCondenseModel([in]   REFIID riid,
                    [out,  iid_is(riid)  void**  ppv);
}
```

The GetModel methods of IDataManagement allow the model dictating how and when data is condensed (archived) or truncated to be fetched and configured. The DBOB associated with a given server module 22 implements these interfaces but applies active data management only to data collected by the server's clients. In this way concurrency problems that arise when multiple threads attempt to groom the data are avoided.

Use of Iserver moduleAdmin

When a Profile changes, the DBOB may be instructed to (optionally) notify the root server module 22 installation in order to inform it of the users who have been affected by the profile change. The root server module 22 can then instruct all other server module 22s in the system of the profile change. In order to notify the root server module 22 of a Profile change, the DBOB will use the Iserver moduleAdmin::GetSuperiorserver module( ) method of its corresponding server module 22 to navigate to the root server module 22. Once at the root server module 22, the DBOB will use the root server module 22's Iserver moduleAdmin::RereadProfile( ) method to inform the server module 22 of the profile changes. It is then left to the root server module 22 to inform all subordinate server module 22s of the change.

Exceptions and Error Handling

Table XXXIX describes the Database Object Broker responses to error results from the server implementation of the Iserver moduleAdmin interface.

TABLE XXXIX

| Iserver moduleAdmin Method | Error Response |
| --- | --- |
| RepeatCommands ( ) | E_FAIL-<br>E_NOCOM-<br>E_FAULT-] |

System Administration Subsystem

System Administration Client Side Components

Figure 54:
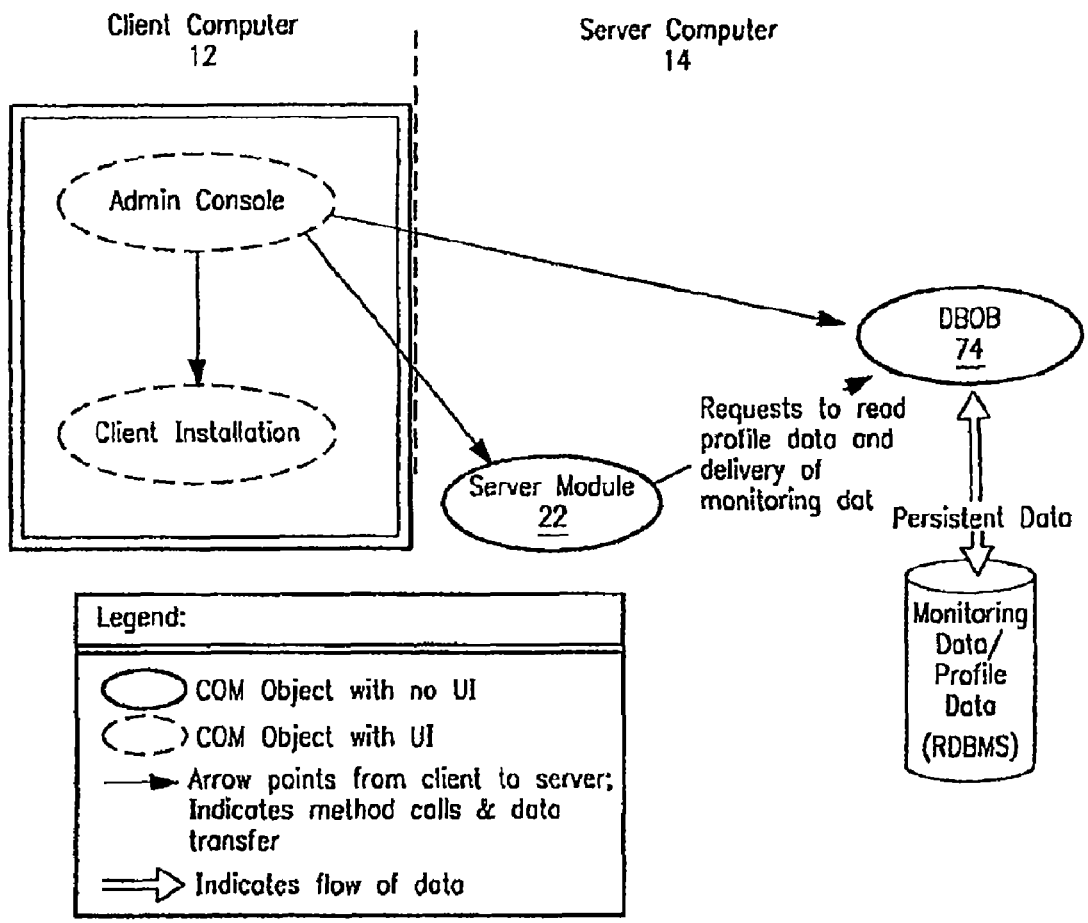
FIG. 54 highlights the client side components most directly associated with a system administration subsystem.

FIG. 54 highlights the client side components most directly associated with the System Administration Subsystem. Included among these components are the (i) Admin Console, used to administer the system of server modules and DBOBs, and (ii) Client Installation component, which installs the various client components on client host platforms. The later is implemented as an InstallShield program that installs the necessary software component packages on the client and configures the component for running on that client. Typically the InstallShield Setup.exe will be run once per machine to effect an installation. After the software has been installed management is performed using the Admin Console. The administration can however re-run Setup.exe at any time and reconfigure an existing installation.

Admin Console

The Admin Console is a tool typically used by system administrators. Through the Admin Console, the administrator sets up and configures the network of server modules that collectively make up the monitoring system. Through the Admin Console the administrator can determine whether a specific system is running, and if so, if it is running a client service/client monitoring agent. This feature allows the administrator to identify when the monitoring process has been circumvented, and also enables debugging of configuration problems. As was discussed above, a server module is aware of its subordinate servers and it's superior. With appropriate permission, the administrator may traverse the tree of server modules and perform administrative tasks at any node.

Relationship Between Server Module and Admin Console

Figure 55:
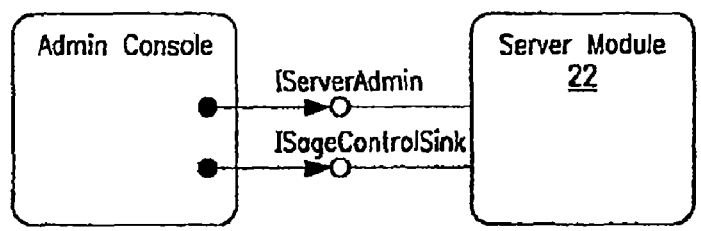
FIG. 55 depicts the relationship between the Admin Console and a server module.

FIG. 55 depicts the relationship between the Admin Console and a server module 22. The Admin Console serves as the UI for the server module 22. There is typically not a one-to-one relationship between any set of Admin Console/server module instances, and with appropriate permission any Admin Console may connect to an arbitrary instance of server module 22. Through the admin console's use of the IServerAdmin interface implemented by server module 22, the administrator configures and maintains the server module 22 installation. The Admin Console UI also provides access to features of the server module 22 reserved exclusively for use by the administrator. Operations such as start/stop monitoring, client list, client ping etc. are performed directly, or facilitated by, the server module 22 to which the Admin Console is currently connected.

Figure 56:
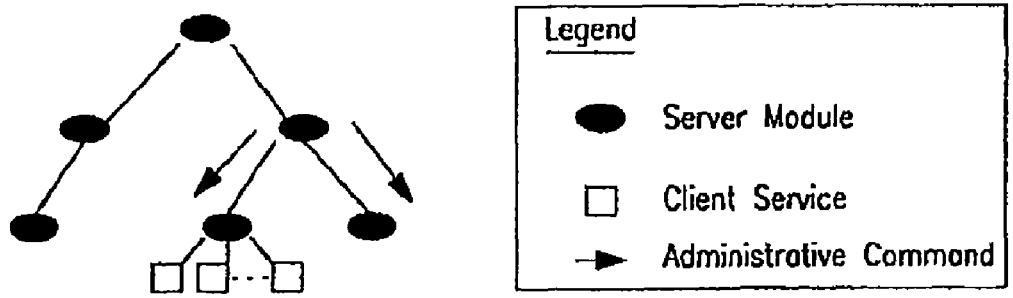
FIG. 56 illustratively represents the propagation of administrative commands through a server tree in accordance with one aspect of the invention.

To ease the problems associated with administering a large network of servers, certain operations performed on a server via the Admin Console may optionally be repeated to all subordinates of the server to which the command was issued. The means to traverse the server tree, repeating a given command, is provided by the navigation methods of Iserver moduleAdmin. Such propagation of administrative commands through a server tree is illustratively represented by FIG. 56.

```
interface IserverModuleAdmin: IUnknown
{
        typedef struct tagserver moduleStatus
                {
                        DWORD upSince;    // a time_t
                        DWORD numActiveClients;
                        BOOL repeatsCommands;
                        DWORD packetsQueued;
                        DWORD packetsProcessed;
                        DWORD dataItemsProcessed;
                        DWORD dataTransmitErrors;
                        DWORD packetQueueHighWater;
                        DWORD packetQueueHighWaterTime;    // a time_t
        } Tserver moduleStatus;
        HRESULT EnumClients ( [out] IEnumString** ppEnumClient);
        HRESULT EnumActiveClients ( [out] IEnumString** ppEnumClient);
        HRESULT EnumSubordinateserver modules ( [out] IEnumString**
     ppEnumserver module);
        HRESULT EnumActiveClientDigest(
                [out] IEnumActiveClientDigest**   ppEnumClient);
        HRESULT RegisterAsSubordinate ( [in] LPOLESTR subordinate);
        HRESULT DeRegisterAsSubordinate ( [in] LPOLESTR subordinate);
        HRESULT GetSuperiorserver module ( [out] LPOLESTR* superior);
        HRESULT SetSuperiorserver module ( [in] LPOLESTR superior);
        HRESULT Getserver moduleStatus ( [out] Tserver moduleStatus* status);
        HRESULT RepeatCommands ( [in] boolean bRepeat );
        HRESULT SetDBObjectBroker ( [in] LPOLESTR dbObjectBrokerHost);
        HRESULT GetDBObjectBroker ( [out] LPOLESTR* dbObjectBrokerHost);
        HRESULT GetDBOBAdmin ( [out] IDBOBAdmin** ppAdmin);
        HRESULT Syncserver moduleState (void);
        HRESULT GetEventLogEnumerator([in] LPOLESTR hostname,
              [in] TEventSource source,
              [out] IEnumNTEventLog** enumEvents);
}
```

Referring again to FIG. 55, the use of ISageControlSink by the Admin Consolea allows commands to be repeated not only to each subordinate server but also to each of the server's clients. This simple feature allows a large system to be effectively managed and also permits management of sub-sections of the installation tree to be delegated. A command may be applied to the entire installed client base by traversing the server tree until a node is reached which has no superior (the master node), and by then applying the command to this master node and specifying that the command is to be repeated. To prevent widely applied commands from becoming a source of confusion, especially in the case of multiple administrators, commands travel down the server tree only. A server may optionally be configured to repeat only those commands originating from an instance of the Admin Console (an original command), and not those repeated by a superior server.

Pinging Client Service to Determine Status

Periodically, an administrator may wish to dynamically inquire about the status of the client service 50 on a remote client machine 12. The client ping feature of the Admin Console does not use an ICMP ping packet, which would verify only the presence of the target machine on the network. Instead, the Admin Console implements a ping which verifies not only that the client machine 12 is up and running but also that the client side monitoring software is installed and running as well.

Figure 57:
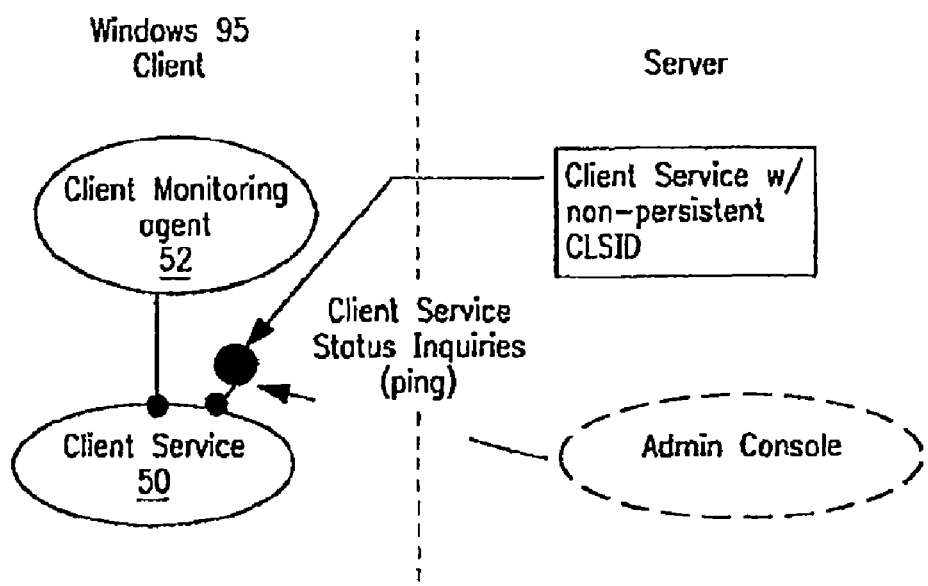
FIG. 57 depicts the manner in which the Admin Console may ping a client service by making a call to CoGetClassObject( ) in order to obtain a Class ID (CLSID) maintained in the registry of such client during execution of the monitoring software of the present invention.

Referring to FIG. 57, the Admin Console pings a client service 50 by making all call to CoGetClassObject( ) for a Class ID (CLSID) which is present in the target machines registry only when the monitoring software is running. Recall that the client service 50 is typically not implemented as a COM object that can be activated, but the service is nonetheless COM-enabled. This means that the client service 50 CLSID is not found in the Windows registry, which precludes activation of the client service 50 via COM. When the client service 50 initiates operation, it makes a call to CoRegisterClassObject( ) in order to register its CLSID (implements only IClientService). The presence of this object indicates the presence of the monitoring software on the applicable client machine 12. If a remote process can successfully contact the client service 50 with CoGetClassObject( ), then the result is a positive client ping.

Relationship to DBOB

Figure 58:
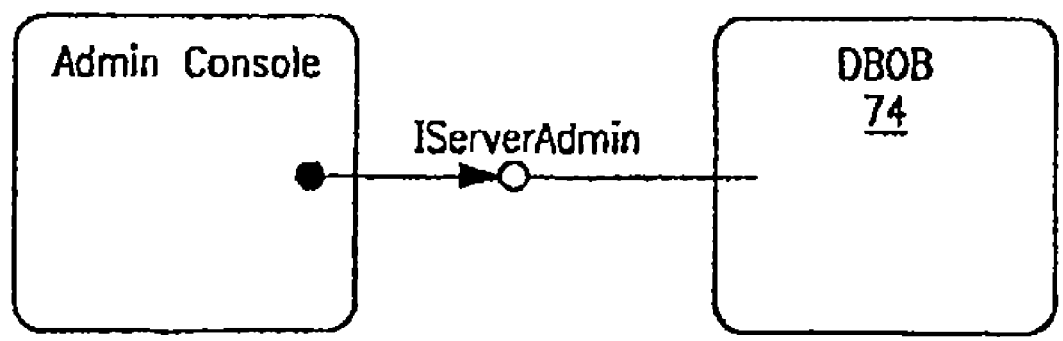
FIG. 58 depicts the relationship between the Admin Console and the DBOB.

FIG. 58 depicts the relationship between the Admin Console and the DBOB 74. The IDBOBAdmin interface is used by the Admin Console to control the active data management features of the DBOB (DBOB), and is fetched from the server module 22 through IserverAdmin::GetDBOBAdmin( ). Once the Admin Console obtains the IDBOBAdmin interface pointer, it communicates with the DBOB. In a preferred implementation each server module 22 is associated with a DBOB and applies data management policies only to the DBMS to which that DBOB is assigned. This restriction not only simplifies the design but also allows for individual data management policies.

UI Design

Through the Admin Console UI, the administrator manages the server modules and their associated DBOBs. The administrative tasks are divided among the following functional areas:

Server Module Setup and Management
Database Housekeeping
Client Status (ping)
Client Monitoring In a preferred implementation the Admin Console UI has a single top level window divided into two panes (side by side). A tree view is presented on the left, which is always visible. The right hand pane is occupied by a tab box, which allows the user to choose between the functional areas identified above. The data presented in each tab is a function of the server to which the Admin Console is currently connected.

Figure 59:
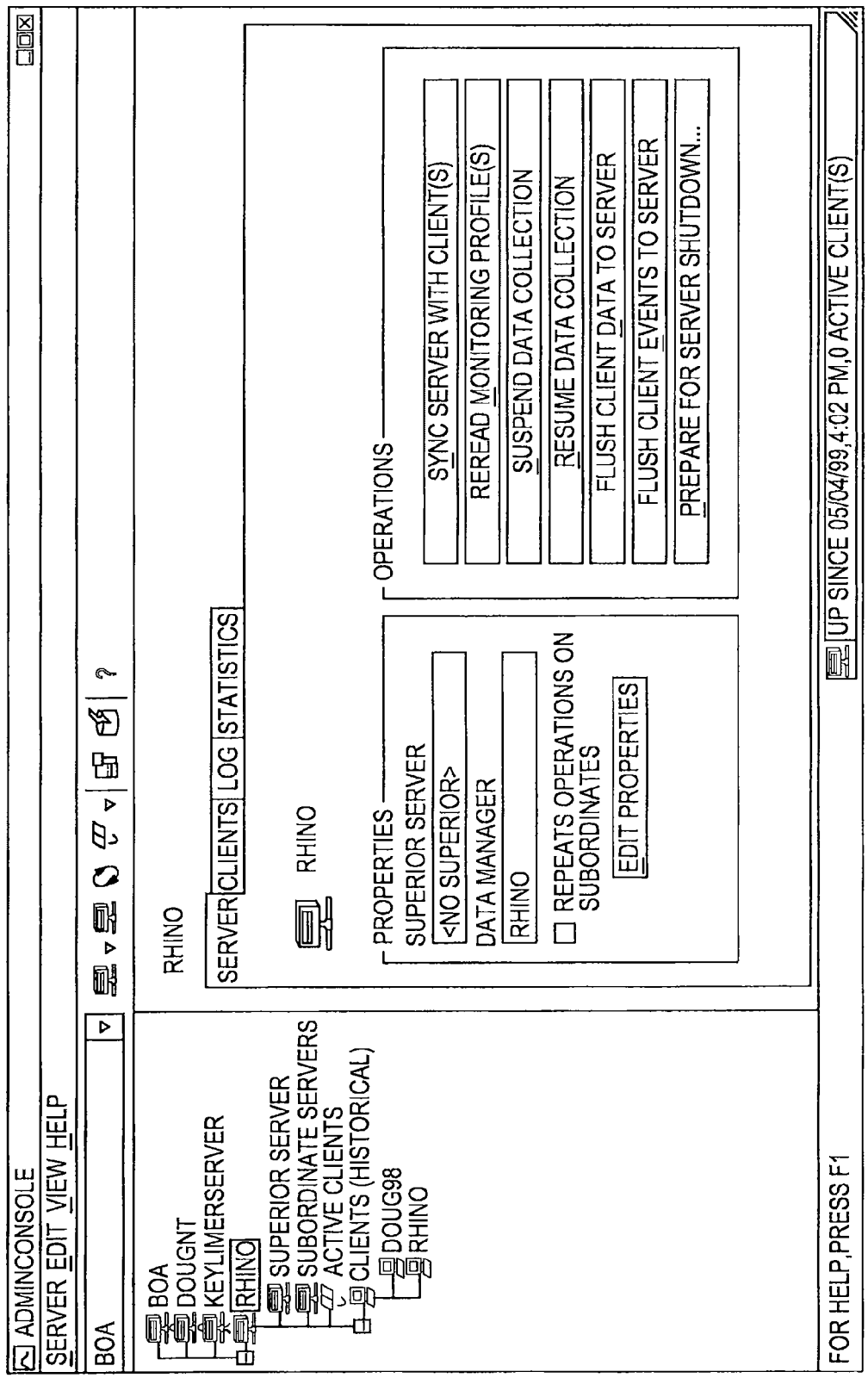
FIG. 59 shows a view of the Admin Console user interface with a server tab selected.

FIG. 59 shows a view of the Admin Console UI with the "server module" (default) tab selected. The user may navigate the server module 22 installation with the tree view. The relative view provided by the tree shows the SAGE system from the perspective of the current server (the server to which the Admin Console is currently connected). A relative view enables identification of the server module currently associated with the Admin Console, and reduces the amount of information presented in the UI to a manageable level. The elements of the tree view are interactive and may be expanded and contracted in the usual manner. The following mouse actions are available on elements of the tree view:

- Double click on a server—The selected server is now the current server and all UI views update themselves.
- Right mouse click—Posts a context menu containing the tab options appropriate for the object.
- Left mouse click—Selects the object and adds it to an operation target list if one is visible on the current tab.

Server Module Tab

Figure 60:
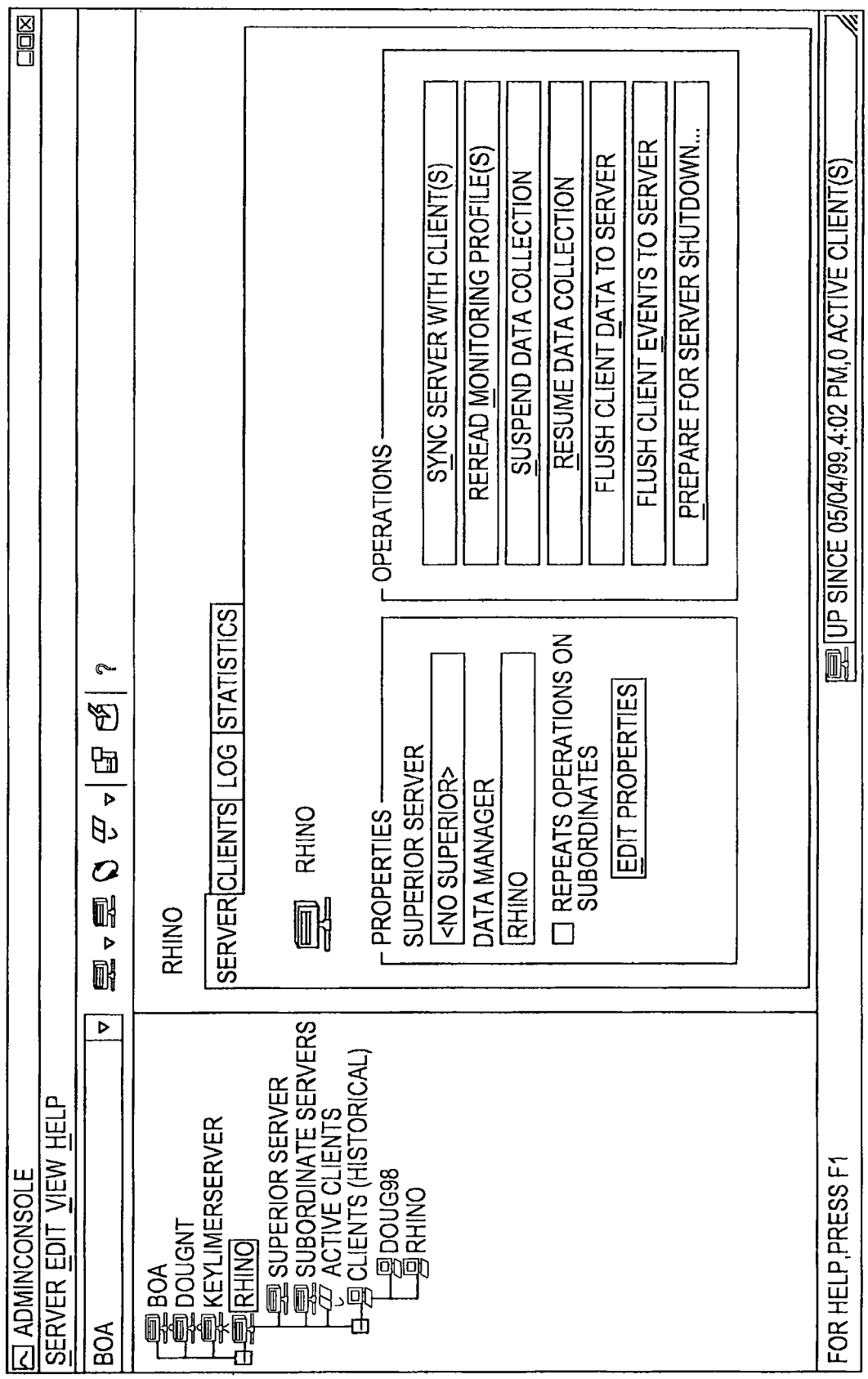
FIG. 60 illustrates certain information displayed by the Admin Console user interface upon selection of its server tab.

Referring to FIG. 60, selection of the server tab presents information descriptive of the server to which the Admin Console is currently connected. The view consists of:

- Text fields specifying the superior server and the DBOB associated with the current server.
- A list of operations which may be applied to the selected subordinate server(s)

From within this tab the administrator may perform the following administrative operations:

- Change the current server's superior.
- Change the DBOB associated with the current server
- Synchronize the server module with its clients
- Force all clients to re-read their monitoring profiles.
- Suspend data collection by the clients.
- Resume data collection by the clients.
- Flush client data to the server.
- Flush client events to the server
- Shutdown the selected server(s) and notify all clients.
- Specify whether or not this server repeats command received by its superior to its own subordinates.

Whether or not operations are applied recursively to the subordinate servers of the current server is a function of the "Repeats Operations on Subordinates" check box.

Data Management Dialog

FIG. 61 provides a screen shot of a Data Management dialog of the Admin Console user interface. This interface dialog is primarily used to control the data management features of the DBOB associated with the current server. As an example, this dialog can be used to control the automated "push" of monitoring data from the collection schema to the reporting schema.

Client Tab

Figure 62:
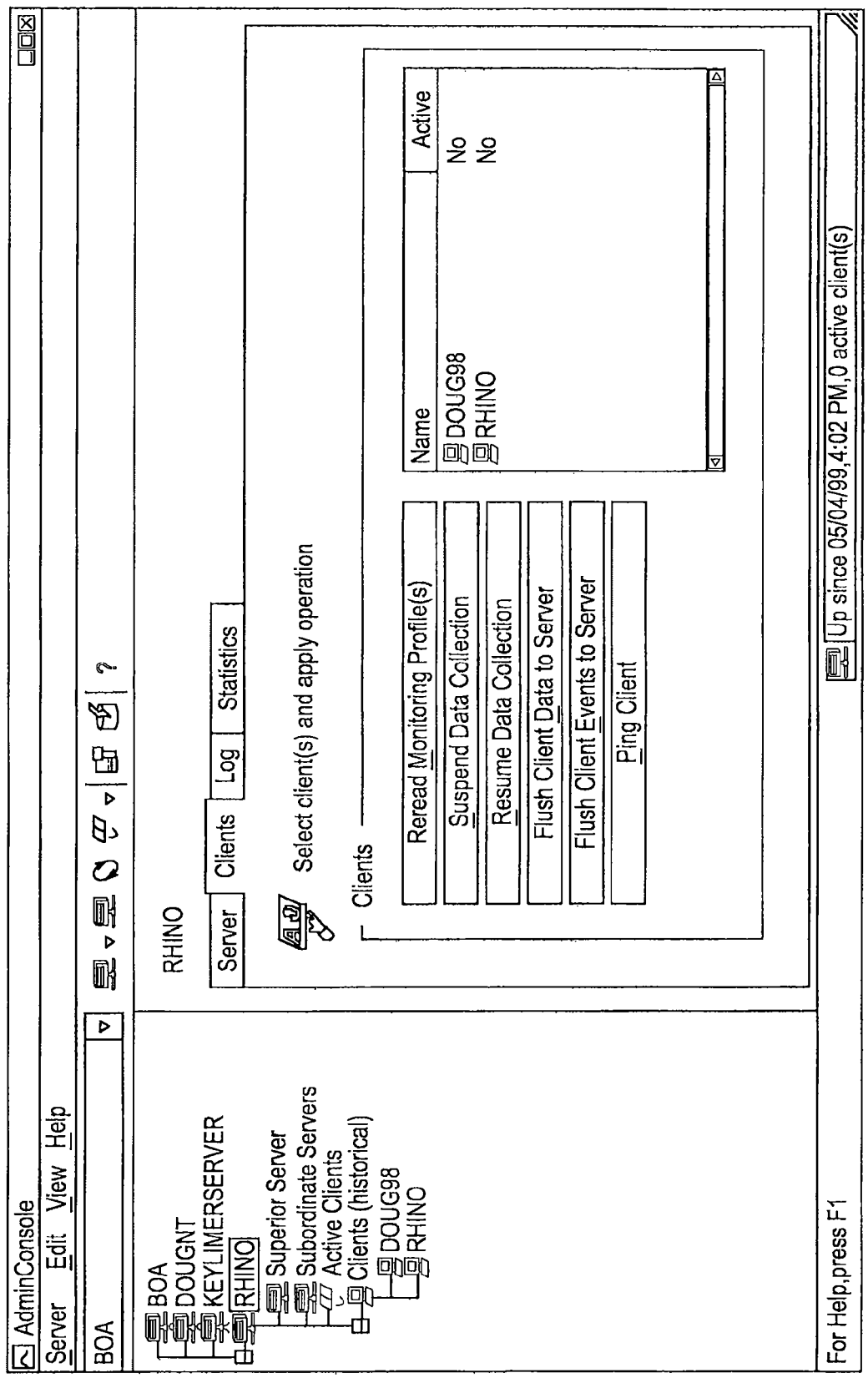
FIG. 62 provides a screen shot of a "Client" tab of the Admin Console user interface.

FIG. 62 provides a screen shot of a "Client" tab of the Admin Console user interface. The user interface presented upon selection of this tab is similar to that presented upon selection of the "Current server" tab. Selection of this Client tab enables performance of the following operations:

- Force all clients to re-read their monitoring profiles.
- Suspend data collection by the clients.
- Resume data collection by the clients.
- Flush client data to the server.
- Flush client events to the server
- Ping a historic or currently active client.

Event Log Tab

Figure 63:
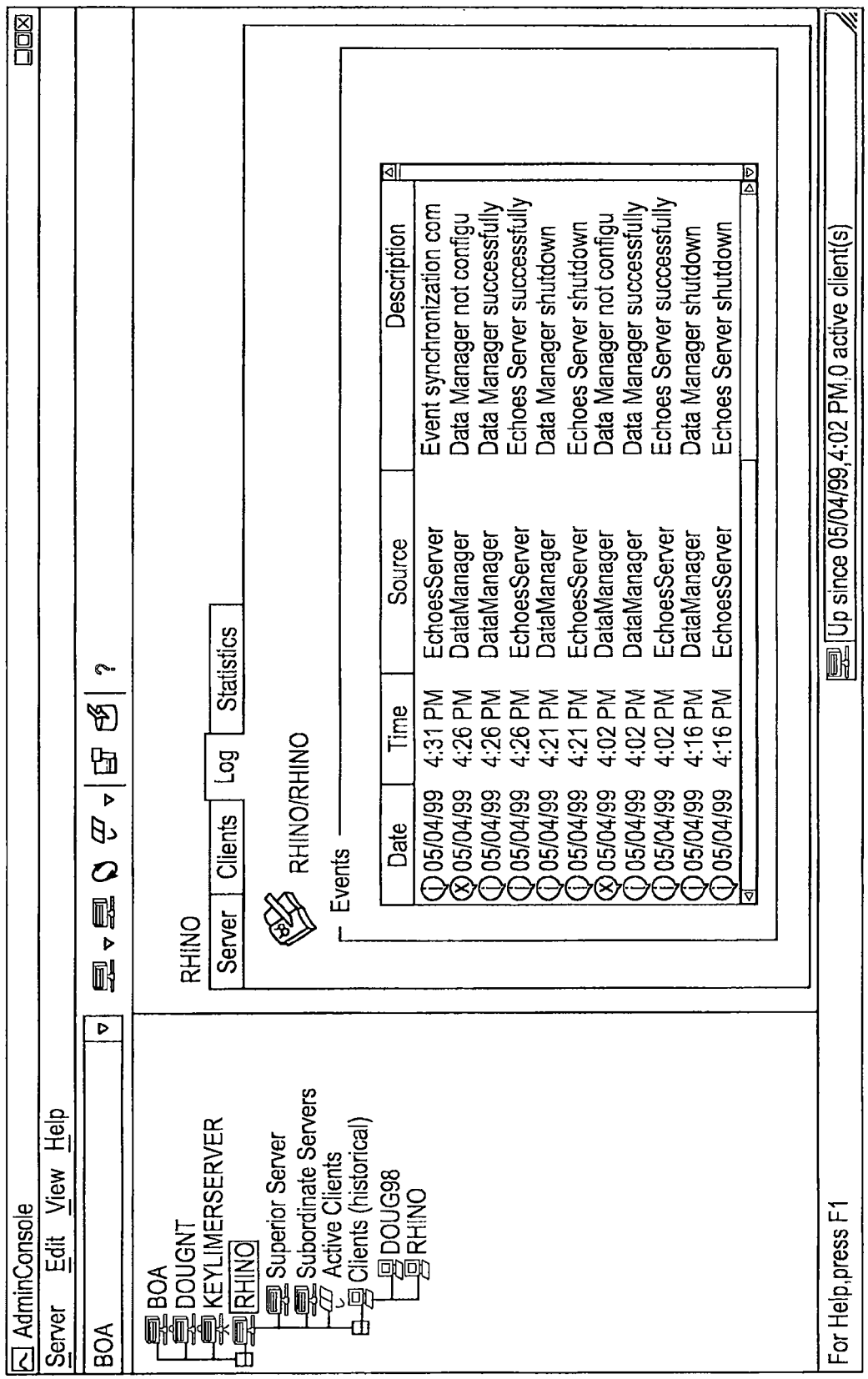
FIG. 63 provides a screen shot of a "Log" tab of the Admin Console user interface.

FIG. 63 provides a screen shot of a "Log" tab for the Admin Console user interface. As is indicated by FIG. 63, important transactions and errors reported to the NT event log by the current server (or its clients) are presented and ordered by timestamp. Significant errors catalogued include:

- Client connection failure.
- Corrupt data sent from client.
- Unable to access database.
- Error in database transaction.
- Out of memory error.

Status information such as commands repeated by the applicable server module, as well as restart information and the like, may also be shown. The log depicted in FIG. 63 may serve as both as an audit trail and a debugging tool.

Monitoring User Interaction with the World Wide Web

Overview

A primary goal of the web-based monitoring system of the present invention, hereinafter "NetEchoes™", is to produce a system capable of monitoring user interaction with the world wide web. While the implementation of NetEchoes™ may be different from the implementation described above, a similar level of monitoring detail may be effected in each case. In comparison with the server log file analysis tools widely used today, both NetEchoes™ and other implementations of the present invention facilitate collection of data in greater detail and production of entirely new categories of data metrics.

By implementing web-based monitoring in a language used to construct web-delivered applications, the monitoring system itself can be embedded in any web page. This negates the need for a separate installation step on the client and allows the sample of users monitored to grow almost without bound. Whenever a user loads a page containing the embedded monitoring, the browser responds by initializing the monitoring system (subject to the security settings of the browser).

The producer's web pages are modified at the server to include a JavaScript that gathers the events and desired measures while the web page is active within the browser. During the time the page is active and when it is unloaded, the JavaScript sends information about the users behavior and experience with the web page being viewed back to a data collection web server farm. JavaScript is preferably used as the web-centric language in which to implement the monitoring for the following reasons:

- It can be embedded in the page itself in text form causing little to no impact on the download time of the page.
- It has built in features to access all of the components of a web page and interact with them. This concept is discussed in the section "Document Object Model (DOM)".
- Unlike an ActiveX control or Netscape plug in, JavaScript has no ability to interact with the user's desktop or file system assuring users that no malicious actions will be performed.

The monitoring of web pages via an embedded JavaScript module is extremely valuable for e-commerce and e-business web sites. It allows for instant (realtime) feedback on how visitors are interacting with the site.

Questions such as:

- How long did the page take to download (from the client's perspective)?
- What was the previous page that led the user to this page?
- How was the user fed to the site? Was it fed by a search engine, link from within an email, advertisement on another site, link from another site, or bookmark or type in?

How did each visitor behave on the site? Did they make purchases, sign up for newsletters, or behave in other desirable ways?

How did visitors fed from different sources behave differently? Which referral source fed the most visitors who purchased, subscribed or behaved in other desirable ways.

What is the visitor breakdown for the site. How many visitors are returning or new? Of those returning, how many have behaved in desirable ways in the past (i.e. have they purchased, subscribed, or taken another action)?

What advertisements did the user actually view (ad impressions)?

Which elements (images and ads) on the page were the slowest to load?

What were the most commonly clicked on links of page?

How many pages on the site were viewed previously to this one?

How long was the user active on the page?

What advertisements were clicked-through on the page?

Did the user hesitate during any part of a process or task?

Was any operation, task or form abandoned?

When a form was abandoned, what was the last field filled in by the user?

How the user left the site (advertisement selection, other URL, typed text in the GOTO box, etc.)?

Where did the user go when they left the site?

How long did each page take to load from the user's perspective?

How many of the pages the user viewed came from cache vs. a load from the site?

What path did the user actually take through the site (modified to include cached pages)?

Did the user interrupt the loading of the page by pressing the stop button, clicking on a link, etc.?

Did the user leave the site immediately after interrupting the download of a page (interrupt abandons)?

What browser and platform (operating system) was the user using?

Did any errors occur while the user was interacting with the page?

Did the user make any purchases while on the site?

could easily be answered. There is no way to get this level of detailed information from the logs generated by the web server.

This monitoring technology could also be applied to a sample of users who have intentionally elected to permit the monitoring system to monitor all web activity. The data collected could be used to produce ratings of web sites similar to the Nielsen system currently applied to select television viewers. This data would not be anonymous. The demographics of the users would be well known. This type of information is very valuable to advertisers. An internet service where advertisers could enter a description of their target audience and receive a list of the top ten recommended sites to place their add would likely be an enormous success.

User Monitoring vs. Server Module Monitoring

There are two general sources of web usage data; user data and server log file data. User data contains very detailed information regarding every site the user has visited and the type of actions performed by the user at those sites. Server module logs contain very granular information regarding activity of all users of a single site.

Many products exist to perform analysis of server log file data. The data is generated automatically by the server making it essentially free and the tools themselves are relatively inexpensive. The information in the logs is relatively easy to interpret and provides valuable information to the operator of a web site. For example, a web site operator can use server log data to:

Assess the popularity of a site in comparison to other like sites

Determine the most viewed information offered by the site

Find the most popular paths through the site (generalized)

Identify the areas on the site from which users most often leave for other sites.

An example of the contents of an HTTP server log is shown below. Each entry shows various information such as the requester, the time, the protocol operation (GET, HEAD, POST, etc.) the page requested and information regarding the browser which issued the request.

206.132.57.231—[04/Jun./1999:09:24: 17-0700] "GET/images/nav/elevator( ).jpg HTTP/1.1" 200 4873"http://www.limesoft.com/left.html" "Mozilla/4.0 (compatible; MSIE 5.0; Windows 98)"

206.132.57.231—[04/Jun./1999:09:24: 17-0700] "GET/images/nav/elevator2.jpg HTTP/1.1" 200 5408"http://www.limesoft.com/left.html" "Mozilla/4.0 (compatible; MSIE 5.0; Windows 98)"

206.132.57.231—[04/Jun./1999:09:24: 17-0700] "GET/images/nav/elevator1.jpg HTTP/1.1" 200 5526"http://www.limesoft.com/left.html" "Mozilla/4.0 (compatible; MSIE 5.0; Windows 98)"

The server log contains a great deal of data about what requests (hits) were made of the web server, but does not contain any data about the users' experiences with the pages viewed. Analysis of the data can yield the answers to many important questions about the performance and page volume handled by a server but it can never provide much information about the users interaction with each page.

Data collection performed at the client within the browser yields all of the server-collected information, but can also yield a much richer stream of data that includes details of the user's interaction with a page. These details serve to fill in the gaps in the information offered by a server log and can be more accurate. One reason client side monitoring is more accurate is the ability of web browsers to "cache" pages so that a second, or subsequent visit to a page does not generate a "hit" to the remote server, but rather the browser simply pulls the page from its local disk cache. There are actually two kinds of page caching, caching by the browser and caching by a proxy server. The goal of both schemes is to improve performance from the perspective of the user. Caching has the effect of hiding page load activity from the server. Recent figures suggest that server log file analysis fails to show as much as 20 to 40 percent of a sites real traffic. Many ISPs such as America Online (AOL) operate massive caching schemes in order to deliver higher performance to their subscribers.

For many web site, tracking page view data is essential. Many sites generate revenue on advertising banner "impressions." More accurate page view data tracking both cached and non-cached pages may result in additional revenue.

If an ad is placed at the bottom of a page there is a high likelihood that it will not be initially visible when the page is loaded and many users will not bother to scroll down to expose it. Data which could prove that an ad was actually viewed would be help the seller of ad space price their page "real estate" appropriately and assure a buyer that their money is not being wasted.

Web Documents

The producer of Web content develops a site using combinations of HTML, JavaScript, and embedded objects such as applets, Active-X controls, and plug-ins. The development of sites has continued to progress and advance with introduction of new technologies and techniques. These technologies on the client side have been packaged into what is now called Dynamic HTML or DHTML.

The following briefly defines the technologies used to build web content and their utilization in connection with NetEchoes™.

Hyper Text Markup Language

Hyper Text Markup Language or HTML provides hypertext links that allow the user to move to different pages. Originally, HTML allowed combinations of rich text and images to be viewed with a Web Browser with the content being retrieved from locations anywhere on the Internet, forming a World Wide Web. HTML has since progressed to provide a number of different ways that content can be presented. A plethora of new mark up tags have been introduced that control not only the content but also every aspect of content; presentation, location, indentation, font type, font size, font style, etc.

Besides anchors, two aspects of HTML presentation may be particularly useful in the context of NetEchoes™—frames and forms. Frames allow content from different locations to be presented at the same time. Various issues surrounding the implementation of frames are described below.

Forms allow users to provide information via input elements such as buttons and text fields capable of being tracked by the web-based monitoring system. These are the items that must be observed and measured, and depending upon the browser, are presented as different window objects.

JavaScript

JavaScript can be included in an HTML document using the <SCRIPT> tag. It can perform functions on the client side without having to connect with the server. For example, forms can be verified to contain the correct entries before they are submitted to the server. Also with JavaScript, the page can respond to the user actions, such as changing the button image when the mouse pointer moves over the button, or the button is pressed.

JavaScript acts on objects that make up a Document Object Model. The DOM identifies what objects within a document can be observed by a script and what actions can be performed on these objects. Therefore, the actions that can be performed using JavaScript depend greatly on the DOM.

Applets

Applets are written in a platform independent language—Java. In particular, they can be included within the content on an HTML document without user interaction and in most cases without user notification. Applets operate with security restrictions that limit their scope to an HTML page and limits their communications to the originating server of the page. With JavaScript, using Netscape's LiveWire or Microsoft's Active-X technologies, scripts can interact with applets and vice versa. Therefore the scope of the applet has been extended to cover the document in which it is embedded and even allows applets within the same page to communicate.

Like other embedded objects, the challenge to NetEchoes™ is observing and tracking the activity the takes place within the applet. The implementation of Java's Graphical User Interface objects can be different depending upon the operating system and browser.

If the applets have been developed using Netscape's LiveWire or Microsoft's Active-X enabled JDKs, then the applet is open to full interaction with JavaScript. In fact, Java packages can be used to extend JavaScript functionality. Therefore Java and Applets become an enabling technologies for embedding NetEchoes™ functions within HTML documents.

Plug-ins and Active-X Controls

Like applets, Netscape Plug-ins and Microsoft Active-X Controls, are embedded objects within an HTML document that allow the user to extend the functionality of the document. Unlike applets, these components must be installed on the client prior to their activation within a Web page. They require user consent and action. Active-X controls can more or less be installed automatically after the user has given consent, and under certain circumstances, the user's consent is not necessary. Netscape plug-ins usually require restart of the browser before they can be used, and require considerably more interaction by the user.

Once installed, the plug-in or Active-X control is activated by an <EMBED> or <OBJECT> tag within the document, typically to handle a MIME type not handled by the browser itself. The embedded object is deactivated when the user moves to another page. Once activated, they have full run of the computer system, i.e. there is no security context around the object like that of a Java applet.

Like applets, Plug-ins and Active-X controls are open to full interaction with JavaScript and are enabling technologies for NetEchoes™.

Dynamic HTML

Dynamic HTML (DHTML) is an attempt to extend the document object model and separate once again style from content markup through Cascading Style Sheets (CSS). The DOM standardizes and extends the number of objects that can be observed and manipulated by a script, such as Java Script, JScript, even Perl.

CSS greatly extends the control of style aspects of presenting the content, while removing a number of tag attributes in current HTML. The cascading refers to the context of a style sheet—embedded specific to an instance, global effecting the entire document, user preference defined by a user, etc.

DHTML extends the effect of JavaScript even further, hence extending what NetEchoes™ can observe. On the other hand, it still developing like the original HTML with different DOMs and capabilities for both Netscape and Microsoft browsers. There is however a possibility to implement DHTML documents the operate across both models or allow the same functionality with different implementations.

Document Object Model (DOM)

All scripts embedded within an HTML document operate upon a Document Object Model (DOM). The W3C is attempting to develop a standard model with both Netscape and Microsoft. This standard DOM would allow scripting languages to be embedded in HTML documents and have access to the same document objects. Currently each browser exposes both window and document objects that can vary from one browser to the next. These objects are referred to as the Web Browser Object Model (WBOM).

Because both Netscape and Microsoft support JavaScript there is a common set of objects accessible in both browsers. As the Browser Wars have moved into Dynamic HTML, there has been a divergence in the events and objects observable within each browser. For the purpose of this document we will concentrate on the common Web BOM for JavaScript.

The JavaScript objects are listed in Table XXXX. Associated with each object are properties or attributes that can be accessed and events that can be observed for each object. The properties of browser object can be accessed by simply including a script within the HTML or via a Java Applet or Active-X Control. To capture the events requires adding specific attributes to HTML tags to tell the browser what JavaScript function should be called. Event handling within the DOM is discussed in detail in the following section.

TABLE XXXX

JavaScript Web Object Model

| Web Object | Description |
|---|---|
| window | The actual content area of the browser displaying the current document. |
| location | The properties associated with the current document URL. |
| history | A list of previous pages visited during this browser session. |
| document | The root of the tree of objects that make up the content of the window. |
| link, area | The <A> or <AREA> tag object within a document containing a HREF attribute. |
| Anchor | The <A> tag object within a document containing a NAME attribute. |
| form | The <FORM> object within a document includes access to form elements. |
| image | The <IMG> object within a document. |
| frame | A window object contained within a document. |
| applets, plugins, objects | The <APPELET>, <EMBED>, and <OBJECT> objects within a document. |
| mime Types | The list of helper applications and plug-ins to handle each mime type. |
| options | The <OPTION> tab objects within a document. |

The insertion of attributes to capture events for NetEchoes™ is referred to as instrumenting the HTML. Before addressing instnnnentation the objects that populate the DOM are presented. The following summarizes each object and the attributes and events associated with each object.

Window Object

The Window object represents the object itself and in particular, the content area of the document. From the highest or Top window, the browser state can be determined, and some aspects of the browser controlled. For example, new windows can be opened and the scrollbars controlled. For frames, the window object provides links to the parent window and to sibling windows.

TABLE XXXXI

Window Object Properties

| Properties | Type | Description |
|---|---|---|
| closed | boolean | Specifies whether a window has been closed (Boolean). |
| defaultStatus | string | The default message that appears in the status line of the Web Browser window. |
| length | integer | The number of frames in the current window. |
| name | string | The name of a window. |
| opener | string | The window that opened this window or frame. |
| parent | object | The window that contains the frame. |
| self or top | object | Refers to the current window. |
| status | string | The contents of the Web browser's status line. |

TABLE XXXXII

Window Object Events associated with the <BODY> or <FRAMESET> tags of the document.

| Name | Triggered when |
|---|---|
| onBlur | The focus is removed from the window. |
| onError | An error occurs in the window. |
| onFocus | The focus is applied to the window. |
| onLoad | The Web browser finishes loading a document into the window. |
| onUnload | The user exists from the document within the window. |

Though windows can be created and their content scrolled, the ability to know what content is being display is curiously missing. DHTML does provide extensions in the window object allowing measurement of mouse position within an HTML page and the size of the viewing area.

The event model has been expanded in both Netscape 4.0 and Internet Explorer 4.0 to measure mouse events and keystroke events relative to targets objects within the page. Thus window events in general can be monitored from <BODY> or <FRAMESET> tags without having to instrument all tags within an HTML page. This greatly simplifies the instrumentation having only to append attributes to the <BODY> or <FRAMESET> tags. An example of this instrumentation technique is presented in the section entitled "Instrumentation of Web Documents".

Location Object

TABLE XXXXIII

Location Object Properties

| Properties | Type | Description |
|---|---|---|
| href | string | The entire URL, including all the subparts. |
| protocol | string | The protocol field of the URL including the first colon. |
| host | string | The hostname and port number. |
| hostname | string | The hostname of the URL. |
| port | integer | The port number of the URL. |
| path | string | The path to the actual document. |
| hash | string | Any CGI arguments after the first # in the URL. |
| search | string | Any CGI arguments after the first ? in the URL. |
| name | string | The name attribute of the anchor. |
| assign(string) | Method | Set the href to the value you specify. |

The properties of a location object can be changed as well as observed. This provides a mechanism for navigating via JavaScript as well as passing content back to the server.

History Object

TABLE XXXXIV

History Object Properties and Methods

| Properties | Type | Description |
|---|---|---|
| current | string | Contains the URL of the current history entry. |
| length | integer | Contains the number of entries in the history list. |
| previous | string | Contains the URL of the previous history stock entry. |
| next | string | Contains the URL of the next history stack entry. |
| back( ) | method | Goes back one entry in the history list. |
| forward( ) | method | Goes forward one entry in the history list. |
| go(num) | method | Goes forward num entries in the history stack if num > 0 otherwise it goes backward-num entries. |
| go(string) | Method | Goes to the newest history entry whose title or URL contains the string as a substring. |

The history is a protected or trusted object in Netscape requiring signed scripts and HTML to allow permissions to be granted by the client. With Universal Browser Read privilege, the script can access the entire list of sites visited during this session. With Universal Browser Mail privilege, used to generate a form letter to filled and sent from the client, the script can access the email address.

Document Object

The document object is the central or root object for accessing all the objects within an HTML page. Associated with the document are a number of methods that allow content to dynamically written to the browser.

TABLE XXXXV

Document Object Properties

| Properties | Type | Description |
|---|---|---|
| AlinkColor | string | The color of the document's active link. |
| BgColor | string | The background color of the document. |
| Cookie | string | The document's cookie. |
| domain | string | Domain name of the server that served the document. |
| FgColor | string | The foreground color of the document. |
| LastModified | date | The date the document was last modified. |
| LinkColor | string | The color of the document's links. |
| Referrer | string | The URL of the document from which this document was called. |
| Title | string | The contents of the <TITLE> tag. |
| URL | string | The complete URL of the document. |
| VlinkColor | string | The color of the document's visited links. |
| close( ) | method | Closes the specified document. |
| eval( ) | method | Evaluates string as JavaScript code and returns the result. |
| open( ) | method | Opens a stream for a new document. This document is meant to be filed with the output of calls to the document write( ) method. |
| write(expression) | method | Writes one or more HTML expressions to the document. |
| WriteIn(expression) | method | Identical to write( ) except appends a newline. |

Typically attributes are read only. The document's location is read only. However the window's location, which has essentially the same information, can be set causing the browser to load the new URL.

TABLE XXXXVI

Document Object Arrays

| Objects | Description |
|---|---|
| anchors | One for each of the <A> tags containing the NAME attribute. |
| applets | One for each <APPLE I> tag. |
| arguments | One for each argument of a JavaScript function. |
| elements | One to reach element in an HTML form. |
| embeds | One for each <EMBED> tag. |
| frames | One for each <FRAME> tag in a window containing a <FRAMESET>. |
| forms | Refers to the current window. |
| history | One for each entry in the history list for a window. |
| images | One for each of the <IMG> tag. |
| links | One for each of the <A> or <AREA tags containing the HREF attribute. |
| mimeTypes | One for each MIME type supported by the client Web browser, its helper applications, plug-ins, and (for Internet Explorer) ActiveX Controls. |
| options | One for each of the <OPTION> tags. |
| plugins | One for each plug-in installed on the client Web browser. |

Note that in the list above, one gets a fairly complete view of the document including all tags or elements if necessary. Accordingly, the NetEchoes™ implementation does not require objects to be probed for using Microsoft Active Accessibility (MSAA). Link, Area, Anchor Objects

TABLE XXXXVII

Link, Area, Anchor Object Properties

| Properties | Type | Description |
|---|---|---|
| href | string | The entire URL, including all the subparts. |
| protocol | string | The protocol field of the URL including the first colon. |

TABLE XXXXVII-continued

Link, Area, Anchor Object Properties

| Properties | Type | Description |
|---|---|---|
| host | string | The hostname and port number. |
| hostname | string | The hostname of the URL. |
| port | integer | The port number of the URL. |
| path | string | The path to the actual document. |
| hash | string | Any CGI arguments after the first # in the URL. |
| search | string | Any CGI arguments after the first ? in the URL. |
| name | string | The name attribute of the anchor. |
| assign(string) | Method | Set the href to the value you specify. |

TABLE XXXXVIII

Link, Area, Anchor Object Events associated with <A> or <AREA> tags

| Name | Triggered when |
|---|---|
| onClick | A link object is clicked. |
| onMouseOver | The mouse passes over a link or area object. |
| onMouseOut | The mouse passes out of a link or area object. |

Note that the Link and Area objects are implemented as Location Objects allowing links to be manipulated.

Form Object

The form object is important since it represents, aside from the link, the most user action intensive aspect of an HTML page. From the Form object the user entries for each element and the submit and reset buttons are observed.

TABLE XXXXIX

Form Object Properties

| Properties | Type | Description |
|---|---|---|
| name | string | The value of the form's NAME attribute. |
| method | string | The value of the form's METHOD attribute. |
| action | string | The value of the form's ACTION attribute. |
| elements | array | The elements array of the form. |
| length | integer | The number of elements in the form. |
| encoding | string | The value of the form's ENCODING attribute. |
| target | string | Window targeted after submit for the form response. |
| reset( ) | method | Reset all the elements within the form. |
| submit( ) | method | Submit the form. |

TABLE XXXXX

Form Object Events associated with <FORM> tag

| Name | Triggered when |
|---|---|
| onreset | The <RESET> button is clicked or the reset( ) method is called. |
| onsubmit | The <SUBMIT> button is clicked or the submit( ) method is called. |

The form elements are listed with the form object and the following gives the properties and events that can be observed for each element.

TABLE XXXXXI

Form Element Properties

| Properties | Type | Description |
|---|---|---|
| name | string | The entire URL, including all the subparts. |
| value | string | The protocol field of the URL including the first colon. |
| defaultValue | string | The hostname and port number. |
| focus( ) | method | Moves the input focus to the specified object. |
| blurr( ) | method | Moves the input focus away from the specified object. |
| select( ) | method | Selects the specified object. |
| sumbit( ) | method | Submits the form according to its ACTION and METHOD attributes. |

TABLE XXXXXII

Form Element Events

| Name | Triggered when |
|---|---|
| onFocus | The user moves the input focus to the field, either via the Tab or a mouse click. |
| onBlur | The user moves the input focus out of this field. |
| onSelect | The user selects text in the field. |
| onSubmit | The form is submitted. |
| onChange | The form loses focus and the user has modified its text typically used to validate data in a field. |

Image Object

TABLE XXXXXIII

Image Object Properties

| Properties | Type | Description |
|---|---|---|
| border | string | The value of the image's BORDER attribute. |
| complete | boolean | Indicates whether the image has been completely loaded. |
| height | integer | The value of the image's HEIGHT attribute. |
| hspace | integer | The value of the image's HSPACE attribute. |
| lowsrc | integer | The value of the image's LOWSRC attribute. |
| name | string | The value of the image's NAME attribute. |
| src | string | The value of the image's SRC attribute. |
| vspace | integer | The value of the image's VSPACE attribute. |
| width | integer | The value of the image's WIDTH attribute. |

TABLE XXXXXIV

Image Object Events associated with <IMG> tag

| Name | Triggered when |
|---|---|
| onAbort | The user aborts the loading of an image, such as by clicking the Stop button. |
| onError | An error occurs when an image is being loaded. |
| onLoad | An image is completely loaded. |

HTML Elements

With DHTML, every HTML element and its attributes can be accessed. What can be done with these objects varies between Netscape4 and IE4. In both cases, the Style using <STYLE> tags can be applied to these objects to effect any aspect of the element style—including fonts-type, font-size, borders, padding spaces, etc. JavaScript supporting the generating of the <STYLE> tags on the run and also changing the presentation of the element during runtime.

Embedded Objects

Applets, plug-ins and ActiveX Controls as embedded objects are accessible via the Browser Object Model. As can be seen in Table XXXXVI, these objects can be accessed via the document object. With JavaScript the methods of the embedded object can be accessed directly. In fact, the JavaScript functionality can be extended by direct calls to singleton methods within a package, such as the system object, or the methods of the instance of an applet.

Likewise, Java applets and plug-ins that have Java APIs can have full access to the DOM and JavaScript functions. This is done by importing the Netscape package that defines the JSObject and JSExcepton classes. ActiveX Controls operate as extensions of the browser window and are directly integrated into the browser such that JavaScript calls are direct via the name for the embedded object and likewise the control has direct access to the WBOM and JavaScript.

In a cooperative environment, where the producer desires specific measures to be performed, the embedded objects that must be monitored can be instrumented to provide the measures such that the monitoring and measurement can be integrated via JavaScript and other embedded controls.

For example, suppose a producer wants to measure whether or not specific places within his web site are viewed by a customer. By inserting a "cooperative" applet that reports number of paints, one can determine whether an area is exposed and for how long, and by measuring mouseovers, one can determine if the user even anticipated following a link. For Java applets, additional instrumentation can be added to measure activity within the applet either through instrumented packages for observables, an "accessibility" API, or even "wrapping" existing Java objects.

If the producer wishes to encourage and extend monitoring of its content, a more direct means of measurement can be incorporated. If the presentation of the content depends upon popular plug-ins or ActiveX Controls that have already been installed by the customer, then via JavaScript and Java wrappers, the functions of these embedded controls can be monitored as well.

NetEchoes™ Overview

Figure 64:
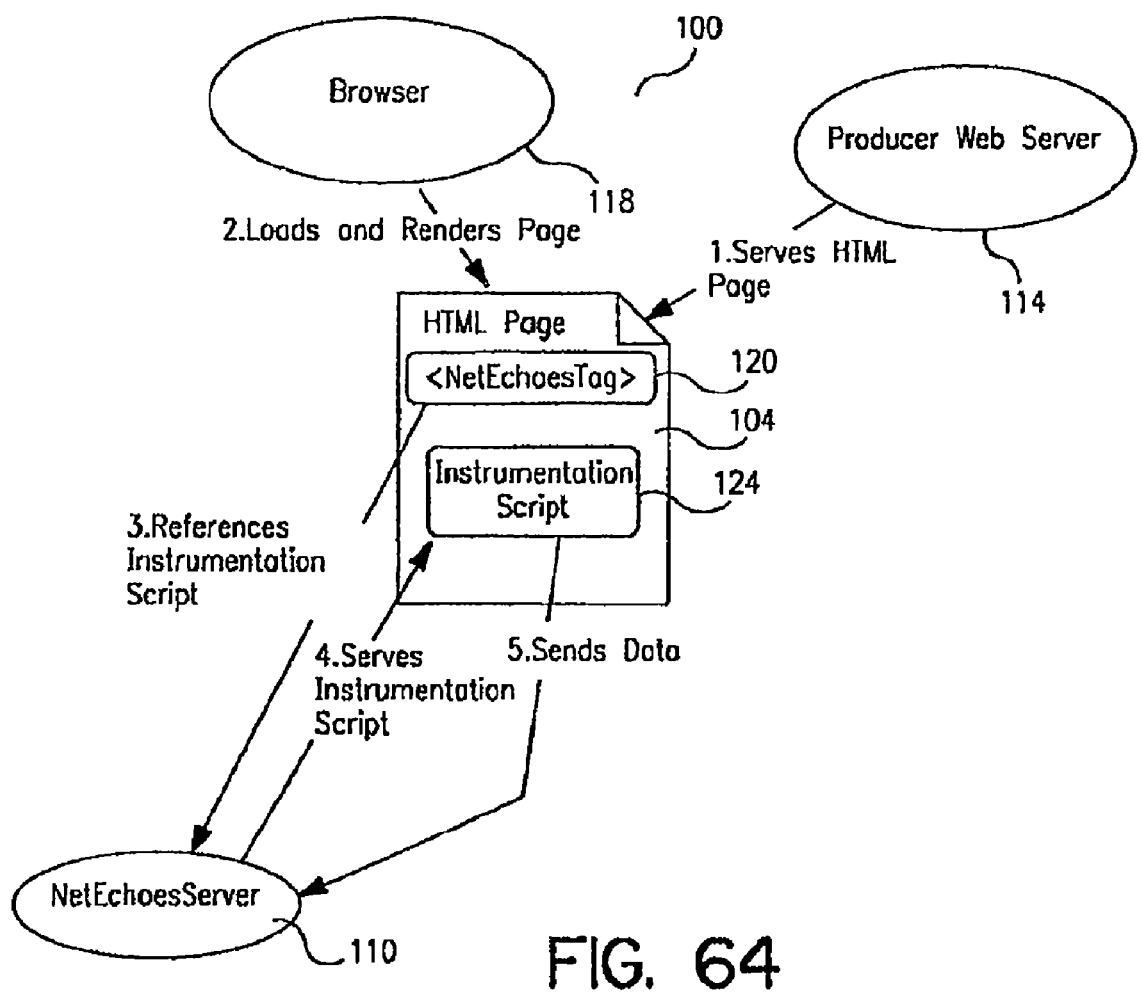
FIG. 64 depicts the major system components of a web-based monitoring system of the present invention.

FIG. 64 depicts the major system components of NetEchoes™ 100 along with the context in which they appear. The components within the HTML Page 104 are known as the NetEchoes™ Client components and interface with the NetEchoes™ server module 110. This diagram also depicts steps that occur in the communication between Producer Web server module 114, Browser 118 and NetEchoes™ server module 110.

Steps involved in Producer/Browser/NetEchoes™ server module relationship.

1. Producer Web server module Serves HTML Page: The producer web server 114 serves up HTML Page 104 (i.e., an HTML document) in response to a request from Browser 118. The HTML Page 104 incorporates an embedded NetEchoes™ Tag 120.
2. Browser loads and renders the HTML Page: When the browser 118 loads and renders the HTML Page 104, the effect of the NetEchoes™ Tag 120 is to request the Instrumentation Script 124 from the NetEchoes™ server module 110.
3. NetEchoes™ Tag References the Instrumentation Script: The NetEchoes™ Tag 120 instructs the browser 118 to load the Instrumentation Script 124 from the NetEchoes™ server module 110 and begin execution.
4. The NetEchoes™ server module 110 serves up the Instrumentation Script 124 in response to the request from browser 118.
5. The Instrumentation Script 124 executes on the HTML Page 104 and sends collected data back to the NetEchoes™ server module 110.

NetEchoes™ Client

This section describes the technology employed on a NetEchoes™ client within and HTML page loaded by a browser.

Event Handling within the DOM

JavaScript programs use the event handling feature of the DOM to activate web pages and build web apps that respond to user input. Like the DOM itself, the event handling model of the DOM varies significantly between JavaScript implementations, however there is a set of least common denominator events that are similar across all JavaScript implementations.

In the previous sections tables were presented identifying event handlers like onmouseover as properties of an object of the DOM. These properties may be assigned by a script or they may be expressed as the values of HTML attributes belonging to an object in the DOM. For example, the onload event handler can be specified with the onload attribute of the <BODY> tag and the on Reset event handler can be specified with the on Reset attribute of the <FORM> tag. This synergy between the HTML markup language and JavaScript reflect the integration of scripting with the DOM. The value of an event handler may be set to an arbitrary string of JavaScript code but typically a function is defined and the handler assigned to the function definition.

Table XXXXXV presents the least common denominator events that exist between the Netscape and IE implementations of JavaScript. The third column indicates the object or objects which support the event type.

TABLE XXXXXV

| Handler | Triggered when | Supported by |
| --- | --- | --- |
| onAbort | Loading Interrupted | Image |
| onBlur | Element loses input focus | Text Elements, Window, all other elements |
| onChange | User selects or deselects an item or enters text and moves input focus to another element | Select, text input elements1 |
| onClick | User clicks once. Return false to cancel default action (i.e., follow link, reset, submit) | Link, Button elements |
| onDblClick | User clicks twice. | Document, Link, Image, button elements |
| onError | Error occurs while loading an image. | Image |
| onFocus | Element given input focus. | Text elements, Windox, all other form elements |
| onKeyDown | Key pressed by user. Return false to cancel. | Document, Image, Link, text elements |
| onKeyPress | Key pressed by user; a combination of onKeyDown and onKeyUp. Return false to cancel. | Document, Image, Link, text elements |
| onKeyUp | Key released by user. | Document, Image, Link, text elements |
| onLoad | Document or image finishes loading. | Window, Image |
| onMouseDown | User presses mouse button. Return false to cancel. | Document, Image, Link, button elements |
| onMouseOut | Mouse moves off element. | Link, Image, Layer |
| onMouseOver | Mouse moves over element. For links return true to prevent URL from appearing in the status bar. | Link, Image, Layer |
| onMouseUp | User releases mouse button. Return false to cancel. | Document, Image, Link, button elements |
| onReset | Form reset requested. Return false to prevent reset. | Form |
| onResize | Window is resized. | Window |
| onSubmit | Form submission requested. Return false to prevent submission | Form |
| onUnload | Document is unloaded. | Window |

In addition to the event handlers discussed above a more generalized event processing exists in both the IE and Netscape versions of JavaScript. Both Netscape and IE have the concept of an extension to the core client-side event model commonly referred to as the "fourth generation" event model. This name refers to the appearance of an Event object in IE 4 and Navigator 4.

Netscape and IE implement the concept of the event object with distinct differences and as yet no clear standard has emerged, however the two models can be reconciled easily with the addition of JavaScript code that determines the browser platform and reacts accordingly.

Table XXXXXVI outlines the properties of the Event object and the differences in the object's properties between IE and Netscape.

TABLE XXXXXVI

| Feature | Navigator 4+ | Internet Explorer 4+ |
| --- | --- | --- |
| Event type | type property, a string that contains the event type name | type property, a string that contains the event type name |
| Event source | target property | srcElement property |
| Mouse button | which proeprety: 1, 2 or 3 | button property: 1, 2 or 3. |
| Key | which property holds Unicode character code (not a string) | keyCode property holds Unicode character code (not a string). |
| Modifier keys | modifiers property is a bitmask containing the Event.ALT_MASK, Event.CONTROL_MASK, Event.META_MASK and Event.SHIFT_MASK flags | altKey, ctrlKey, and shiftKey properties contain individual Boolean values |
| Mouse position | pageX and pageY properties specify the coordinates relative to the web page; screenX, screenY specify coordinates relative to the screen | clientX and clientY properties specify coordinates relative to the web page; screenX screenY specify coordinates relative to the screen |

Access to the Event object in Netscape is via an argument passed to the event handler. In IE the Event object is available via the global variable event.

As mentioned previously, reconciling these two different event models is not difficult; it requires some code to detect the browser and take different action depending on it. An example of an event handler which functions equally well in both the Netscape and IE environments is show below:

```
function myHandler(e)
{
   if (navigator. appName. indexOf ("Microsoft") != -1)
       e = window.event;
   // common processing using the local variable e to reference
   //the Event object
}
```

The last major difference between the Netscape and IE event handling models is how events propagate through the hierarchy of objects occupying the DOM. Netscape uses an event "capture" model while IE uses an event "bubbling" scheme.

The Netscape model introduces new methods on the Window and Document objects to allow specified events to be captured, giving the script a chance to process an event before the object which actually generated it. When handled, the event can be inspected and then either discarded, forwarded to the source object, or rerouted to another object or handler.

Because IE 4 includes all HTML elements in its DOM event handlers exists on all the elements. The presence of consistent event handlers on all objects in the DOM allows events to be generated and then propagate up through all containing HTML elements to the Document and Window object. At any point during this process the propagation of the event through the DOM can be halted by setting the Event's cancelBubble property.

Instrumentation

The richness of the JavaScript event model and the synergy between JavaScript and the objects occupying the DOM, allows for the creation of a script which can interrogate the DOM for its constituents and then set handlers which provide feedback on the user's interaction with the document. This process is referred to as instrumentation.

All of the properties of any element within a page are available and can be modified regardless of how the page was generated or customized. This means that the instrumentation can be performed during and after download on the client. No server instrumentation is required except the incorporation of the NetEchoes™ script in the page somewhere in the <BODY> of the document to be instrumented.

NetEchoes™ "Tag"

An HTML document is instrumented by the placement of a <SCRIPT> tag (indicating the presence of a JavaScript) within the body of the document. One of the important aspects of this tag is that the JavaScript referenced can be delivered from an alternate web server—it need not be the one that delivered the other document content. The HTML fragment below illustrates the general pattern of the tag and its placement within the document:

```
<BODY BGCOLOR=blanchedalmond topMargin=50>
<SCRIPT SRC="http://stats.klsoft.com/script/Instrumentation.js">
</SCRIPT>
```

In this fashion, the script is delivered from an alternate web server (distinct from the content server), potentially by a partner the producer works with.

Instrumentation of SSL-Delivered Pages and NetEchoes™ "Smart Tag"

Most commonly used web pages are delivered using the HTTP protocol. By default the NetEchoes™ instrumentation script and collected data are sent using HTTP. However, frequently data is deemed sensitive and transmission using a Secure Sockets Layer (SSL) is commonly used. SSL transmission sends only encryption data across the internet. It the primary method used to deliver sensitive information such as credit card numbers and user passwords across the internet. In the case of SSL delivered pages, the NetEchoes™ tag embedded on the page must reference the instrumentation script using SSL and the script must deliver the data using SSL. To simplify this process a "smart" NetEchoes™ Tag has been developed which is suitable for use on both secure (SSL-delivered) pages and unsecure pages. The general pattern of the tag is illustrated below:

```
<SCRIPT LANGUAGE="JavaScriptl.2">
    var kl_siteID = "PUT_SITE_ID_HERE";
    var kl_tagProtocol = "";
    if (location.protocol == "https:")
        kl_tagProtocol = "s";
    var kl_tag = "<SCR" + "IPT LANGUAGE='JavaScriptl.2' " +
        "SRC=http" + kl_tagProtocol +
        "://stats.klsoft.com/script/site_" + kl_siteID + kl_tagProtocol
        + "_ePulse.js" +
        "></SCR" + "IPT>";
    document.write(kl_tag);
</SCRIPT>
```

This smart tag detects the protocol of the page upon which it is embedded: either secure (https) or unsecure (http) and adjusts the URL and script delivered appropriately.

Instrumentation of the Document

Instrumentation requires that the JavaScript "hook into" the event model for the document. This is challenging, because the document may already have JavaScript event handlers in place. The instrumentation script must be able to dynamically insert JavaScript handlers for the necessary events that it wishes to track without disrupting existing handlers. This is one of the most technically challenging aspects of instrumentation. Described below is a technique that allows instrumentation without disruption referred to as "Dynamic Augmentation of Existing Event Handlers."

Dynamic Augmentation of Existing Event Handlers

In the following, we use the "onload" event of a document to illustrate to concept of Dynamic Augmentation of Existing Event Handlers, but the concept applies to dynamically augmenting the handler for any event.

The event handlers of a page can be set up by the producer in one of two patterns. The first is as a attribute of an HTML tag, the second is as the setting for a JavaScript property. These are illustrated in FIGS. 65A and 65B.

Event handlers are commonly specified in commercial web pages using both of these methods. In dynamically augmenting these handlers, NetEchoes™ must replace the existing handler (in this case on LoadHandler( )) with a new event handling method that both preserves existing behavior and adds the necessary NetEchoes™ behavior.

Assume for the moment that NetEchoes™ behavior is embodied in the JavaScript method netEchoesOnLoadHandler( ). Then, in the augmented case, the onload event must execute both the existing on LoadHandler( ) and the new netEchoesOnLoadHander( ).

The Dynamic augmentation arranges for this to occur by dynamically creating a third, anonymous function according to the following pattern:

```
function anonymous( )
{
    onLoadHandler( );
    netEchoesOnLoadHanlder( );
}
```

This new function replaces the original handler (on LoadHandler( )) as the new handler by setting the appropriate JavaScript property:

Window.onload=anonymous;

This example is a simplification of the dynamic augmentation process. Other aspects that must be addressed include:

The effects of the change in scope of the original handler: OnLoadHander( ). Mitigation of these effects may include addition of parameters and substitution of the "this" pointer with an artificially manufactured "kl_this" pointer.

Arguments (if any) of on LoadHandler( )

The return value of on LoadHandler( ), if one exists, must be captured and returned by the anonymous function.

Differences in event handling models of Netscape and Microsoft browsers.

The JavaScript source for the complete handler augmentation is listed below.

```
// Install an event handler, If one already exists, replace it with
// an anonymous function that calls both the original code and the
// iEchoes handler.
function kl_setHandler(kl_method, kl_newFunc, kl_oldFunc) // nf is newFunc, of is oldFunc
{
    // look to see if there is any existing handler in place
    if (kl_oldFunc)
    {
        var kl_ofuncBody = kl_oldFunc.toString( );
        // a stands for arg
        // The regular expression pulls out the argument list of the old
        // function, for example if the function string is "f(a, b, c) {var i ... }",
        // then the match rule pulls out "a, b, c" in a[1]
        var a = kl_ofuncBody.match(new RegExp("\\(([^\\)]*)\\)"));
    // if there were no arguments, manufacture as single argument e, which will
    // become the event argument. The event argument is used by Keylime's code
    // only when the browser is Netscape, but it doesn't hurt to create the argument
    // in all cases.
        a = (a[1].length >0 ? a[1]: "e");
        // replace the arguments in the new event handler to match
        // the original event handler the user set in place.
        if (kl_isNav)
            // The reg expression below matches the argument list and the replace
            // replaces it with the new arg list.
            kl_method = kl_method.replace(new RegExp("\\([^\\)]*\\)","g") , "("+a+")");
        if (kl_ofuncBody.indexOf(kl_method) < 0)
        {
```

```
        // b is bracket character index
           var b = kl_ofuncBody.indexOf("{");
        if ((kl_isNav || kl_ofuncBody.indexOf("anonymous") > 0) && b > 0)
              kl_ofuncBody = kl_ofuncBody.substring(b, kl_ofuncBody.length);
        else if (kl_ofuncBody.indexOf("function") >= 0 && b > 0)
              kl_funcBody= kl_ofuncBody.substring(kl_ofuncBody.indexOf
                 ("function") + 9, b);
     // escape any newline chars in the old function body,
     // to escaped newlines
     kl_ofuncBody = kl_ofuncBody.replace(new RegExp("\n", "g"), "\\n");
     //replace any occurences of the this pointer to kl_this. The newly defined
     // user function will be passed the original this pointer as kl_this.
     // This is
     // necessary since the scope of the original code is being replaced.
     kl ofuncBody =
     kl_ofuncBody.replace(
        new RegExp
           (" ([^a-zA-Z0-9$_])this([^a-zA-Z0-9$_])", "g"), "$1kl1_this$2");
     //kl_ofuncBody = kl_ofuncBody. replace (/\n/g, " ; ");
     // Escape all ' characters
     kl_ofuncBody= kl_ofuncBody.replace(new RegExp(" ' ", "g"). "\\' ");
     // escape all " characters
     kl_ofuncBody = kl_ofuncBody.replace(new RegExp(' " ', "g"). '\\" ');
     // create then function body for the new event handler.
     var kl_newFuncBody =
     "{" +
        "var a0 = ' " + a + " ' ; " +
        "var ofb = ' " + kl_ofuncBody + " ' ; " +
        "var f = new Function( a0 , 'kll_this', ofb);" +
        "var rv = f(" + a + ",this);" +
              kl_method + " ; " +
           "return rv; " +
           "}";
        return new Function (a, kl_newFuncBody);
     }
     else
        return kl_oldFunc;
  }
  return kl_newFunc;
}
```

Interaction between Instrumentation Script and DOM

Figure 66:
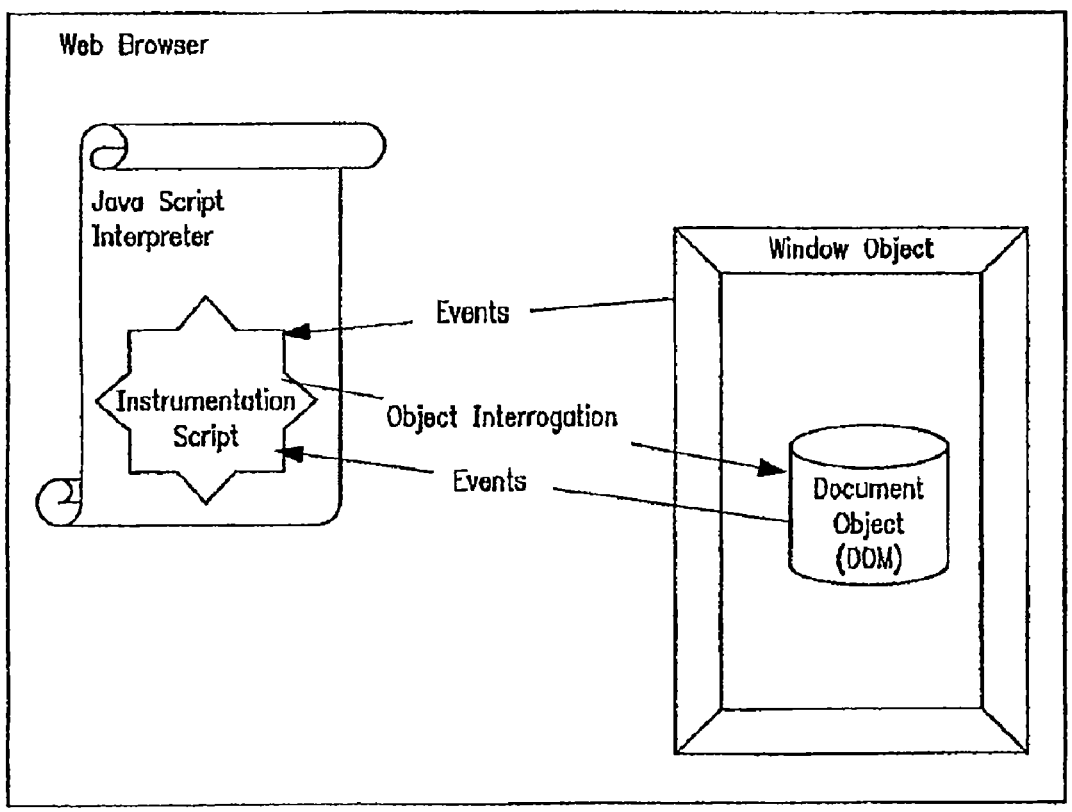
FIG. 66 illustrates the objects involved in an instrumentation script and their interactions.

FIG. 66 illustrates the objects involved in the instrumentation script and their interactions. Given that HTML pages for e-business sites are typically constructed dynamically via CGI execution or other server-side page generation technique, the NetEchoes™ tag will in most cases have to be integrated into the web site's server setup and web page construction process. The most straight forward solution to inserting the instrumentation into each page seems to be server side include statement. Server module side includes are supported by nearly all commercial web servers. They allow a reference to a document to be embedded in other documents. When a document is served to a client the reference is resolved and the additional content written on the stream. This model avoids a secondary request from the client to fetch the contents of the reference.

In a preferred implementation NetEchoes™ is designed to accommodate users of phone modems with speeds as low as 28.8 kbps. Accordingly, the size of profiles downloaded to clients from the server module need to selected appropriately. In addition, the HTTP protocol is "connectionless", and thus requires that a new connection to the remote HTTPD server be made for each request. A request for a user profile therefore requires a new connection across the internet and the download of a potentially large document. Note that the instrumentation of the document takes place immediately after the document is loaded. From the user's perspective, any additional data transfer at this point would have a noticeable effect on the response time of the browser. In light of these issues, the NetEchoes™ product either collects all features and organizes them through post processing or performs a variation on profiling by using a custom instrumentation script that instruments only the portions of the document that are of interest.

Instrumentation of Applets, Plug-ins and ActiveX Controls

The instrumentation of applets, plug-ins and ActiveX Controls is not as straightforward. For Netscape browsers, applets and plug-ins are accessed via Netscape's LiveConnect technology. The plug-ins must be wrapped by a Java API. For Microsoft's Internet Explorer, applets and controls are accessed via ActiveX technology. All ActiveX controls can be accessed directly from JavaScript without modification.

Regardless of the JavaScript implementation, embedded objects such as ActiveX controls and applets are accessible via the document object arrays. The document object has array properties which contain references to applets, embedded objects (ActiveX controls) and in the case of Netscape, plugins.

Feature Tracking

Within HTML pages, features (UI controls) can only appear within the context of HTML forms. Tracking features then, is the same tracking controls on forms. In general, the controls generate JavaScript events when they are used. This makes it especially easy for NetEchoes™ to track the details of what goes on in forms. Table XXXXXVII presents the possible form controls along with the properties and events available from within JavaScript.

TABLE XXXXXVII

| Control | Checked | Defaultchecked | DefaultValue | Form | Length | Name | Options | SelectedIndex |
|---|---|---|---|---|---|---|---|---|
| Button | | | | Y | | Y | | |
| CheckBox | Y | Y | | Y | | Y | | |
| Radio | | | | Y | | Y | | |
| Reset | | | | Y | | Y | | |
| Submit | | | | Y | | Y | | |
| Text | | | Y | Y | | Y | | |
| Textarea | | | Y | Y | | Y | | |
| Password | | | Y | Y | | Y | | |
| FileUpload | | | Y | Y | | Y | | |
| Select | | | | Y | Y | Y | Y | Y |
| Hidden | | | | Y | | Y | | |

| Control | Type | Value | OnBlur() | Onchange() | Onclick() | OnFocus | onSelect |
|---|---|---|---|---|---|---|---|
| Button | Y | Y | Y | | Y | Y | |
| CheckBox | Y | Y | Y | | Y | Y | |
| Radio | Y | Y | Y | | Y | Y | |
| Reset | Y | Y | Y | | Y | Y | |
| Submit | Y | Y | Y | | Y | Y | |
| Text | Y | Y | Y | Y | | Y | Y |
| Textarea | Y | Y | Y | | | Y | Y |
| Password | Y | Y | Y | Y | | Y | Y |
| FileUpload | Y | Y | Y | | | Y | Y |
| Select | Y | | Y | Y | | Y | Y |
| Hidden | Y | Y | | | | | |

As Table XXXXXVII illustrates, most controls have a value and name, plus events such as onclick() or onchange() that make the use of them inherently trackable.

Standard Data Collection

Table XXXXXVIII below lists the client-side data that is collected by the standard instrumentation script.

TABLE XXXXXVIII

NetEchoes ™ Records and Field Descriptions

| Record Type | Field Name | Qualifier | Description |
|---|---|---|---|
| TSTAMP | | First in log entry | The first record of a log entry giving the start time from to which all other records for a page will be relative. The event time for each subsequent log record will be the start time in this record plus a delta time in the event record. |
| | start time | | The start time for the entry. This is in GMT time. Note there is a possibility of inaccuracy if the client's clock is set incorrectly. |
| | time zone | | +/− minutes from GMT. Time zone of the client as reported by the client. |
| | company identifier | | Company identifier for the site. |
| | site identifier | | Site identifier for the page. |
| | session identifier | | Session identifier for the site domain set for duration of the browser session or time interval (30 min). Different sites will have different reported session identifiers. The start of a session is indicated by a + appended to the id. |
| PAGE | | Second in log entry | Description of the page being viewed. This record always follows immediately the time stamp record and does not have a delta time. Its fields are relevant to all subsequent event records within the log entry. |
| | location | | Document URL giving the location of the file for the page. |
| | parent window | Window INFRAME | If present, gives the document URL that holds the frame for this document. |
| | document href | HREF != Location | If present, the URL that was used initially to retrieve this document. This would include the query for example. |
| | referrer | via LINK | If present, the URL that loaded this document. |
| | page view num | | A sequence number for each page view. Starts at 0 for the first page view of the session and increments by 1 for each successive page view. Restarts at 0 for each session. |

TABLE XXXXXVIII-continued

NetEchoes™ Records and Field Descriptions

| Record Type | Field Name | Qualifier | Description |
|---|---|---|---|
| LOAD | | LOAD Event | After timestamp & page records, typically the first event record indicating the start of viewing for the page. Exceptions are scripting errors, image aborts and click throughs that occur before the loading has completed. |
| | delta time | | The delta time in milliseconds from the start time for the record. |
| | load time | | Time in milliseconds to load the page. |
| | last loaded | NAV ONLY | If present, the last loaded image during page load. |
| GOTO | | LINK Event after LOAD | Generated whenever a link is pressed within the document. If this record is not present, then another means was used to go to next document. Click throughs on the page before the document loaded are not recorded. |
| | delta time | | The delta time in milliseconds from the start time for the record. |
| | link | | Go to link giving the next document to be loaded. |
| | advertisement | IE ONLY | Image used to activate link assumed to be an ad. |
| FORM | | Focus Time > 0 | Generated whenever forms are present in the document. This is generated only when the focus time is greater than zero. |
| | delta time | | The delta time in milliseconds from the start time for the record. |
| | reason = SUBMIT, RESET, ABANDON[i] | | Reason the record was generated for the form. For abandoned forms the form index number is given and the abandon form report is generated only if the focus time is greater than 0. |
| | name | Has Name | If present, the name for the form. |
| | number elements | | Number of elements in the form. |
| | number elements set | | Number of elements the user set in the form before this record was generated. |
| | last element | | Last element entered before form was abandoned. |
| | focus time | | Accumulated time in millisecs spent by user in the form. |
| | Site-specific form info fields 0 thru 9. | Optional. Only delivered when reason is SUBMIT and this information is tracked by the form code. | User defined info fields 0 thru 9 for a form submission. These fields contain string values that are the values of input fields on the form. The values are interpreted by the DataMining servers, usually for the purpose of page-view filters. These values are set only for certain forms. They can be set either by a special site-specific instrumentation script or by end-user code the modifies the k1_InfoAry[n] property on the submitted form. |
| UNLOAD | | UNLOAD Event | Last record in entry. |
| | delta time | | The delta time from document load that the document was viewed. |
| | active time | NA | Accumulated time the document had focus. |
| | aborted images | | If present, the number of aborted images at time of document unload. This would occur if the user licked through the page before it completely loaded. |
| | Page specific info | | Page specific info. Usually meaningful only when taken in context with the URL for the page. Most common use is for "bag oftags" whereby the client sets the value "window.epulse_info" on an instrumented page. That value is picked up by the script and placed in this field. Occasionally, a client-side javascript that has been customized for a client will use this field as well. |
| ABORT | | First 5 images | Generated whenever an image has been aborted such as the user pressing the stop button or changing a page before loading has completed. |
| | delta time | | The delta time in milliseconds from the start time for the record. |
| | image | | href for the image aborted image. |
| | link | IE Only | If present, the link associated with the aborted image. |

TABLE XXXXXVIII-continued

NetEchoes ™ Records and Field Descriptions

| Record Type | Field Name | Qualifier | Description |
|---|---|---|---|
| ERROR | | | Generated whenever a error within the document (image loading and scripting errors) has occurred. In some cases, scripting errors cause the script to be abandoned, and prevent the page from being instrumented. |
| | delta time | | The delta time in milliseconds from the start time for the record. |
| | reason | | The reason the error occurred in free text. |
| | document.href | JScript error | The URL of the document that generated the error if different from current document. For image errors this is the image source. |
| | line number | JScript error | The line number where the error occurred. |
| SYSTEM | | | Generated when session id is first created to summarize session environment. Should be used with other header data included in request or post. Will be always the first event record reported from a session. |
| | delta time | | The delta time in milliseconds from the start time for the record. |
| | screen | | Screen dimensions and color depth (<width> x <height> x <pixel-depth>). |
| | window | | Window dimensions (<width> x <height>). |
| | plug-ins | Nav Only | List of client plug-ins and helpers giving mime-types and plug-ins for each mime-type. (NAVIGATOR ONLY). |

From these collected measures, all the questions first proposed can be answered:

How long did the page take to download (from the client's perspective)?

What was the previous page that led the user to this page?

How was the user fed to the site? Was it fed by a search engine, link from within an email, advertisement on another site, link from another site, or bookmark or type in?

How did each visitor behave on the site? Did they make purchases, sign up for newsletters, or behave in other desirable ways?

How did visitors fed from different sources behave differently? Which referral source fed the most visitors who purchased, subscribed or behaved in other desirable ways.

What is the visitor breakdown for the site. How many visitors are returning or new? Of those returning, how many have behaved in desirable ways in the past (i.e. have they purchased, subscribed, or taken another action)?

What advertisements did the user actually view (ad impressions)?

Which elements (images and ads) on the page were the slowest to load?

What were the most commonly clicked on links of page?

How many pages on the site were viewed previously to this one?

How long was the user active on the page?

What advertisements were clicked-thru on the page?

Did the user hesitate during any part of a process or task?

Was any operation, task or form abandoned?

When a form was abandoned, what was the last field filled in by the user?

How the user left the site (advertisement selection, other URL, typed text in the GOTO box, etc.)?

Where did the user go when they left the site?

How long did each page take to load from the user's perspective?

How many of the pages the user viewed came from cache vs. a load from the site?

What path did the user actually take through the site (modified to include cached pages)?

Did the user interrupt the loading of the page by pressing the stop button, clicking on a link, etc.?

Did the user leave the site immediately after interrupting the download of a page (interrupt abandons)?

What browser and platform (operating system) was the user using?

Did any errors occur while the user was interacting with the page?

Did the user make any purchases while on the site?

Data Transmission Methods

Transmitting the data collected by the instrumentation script back to a remote server elsewhere on the internet poses several problems. First, in order to pass through the intervening appliances on the net such as firewalls and routers, the connection must be made on an open port. The solution to this problem is to use port 80, the HTTP protocol port. It is on this port that the user fetched the instrumented page in the first place. It is therefore the logical means to send the collected data back.

Figure 67:
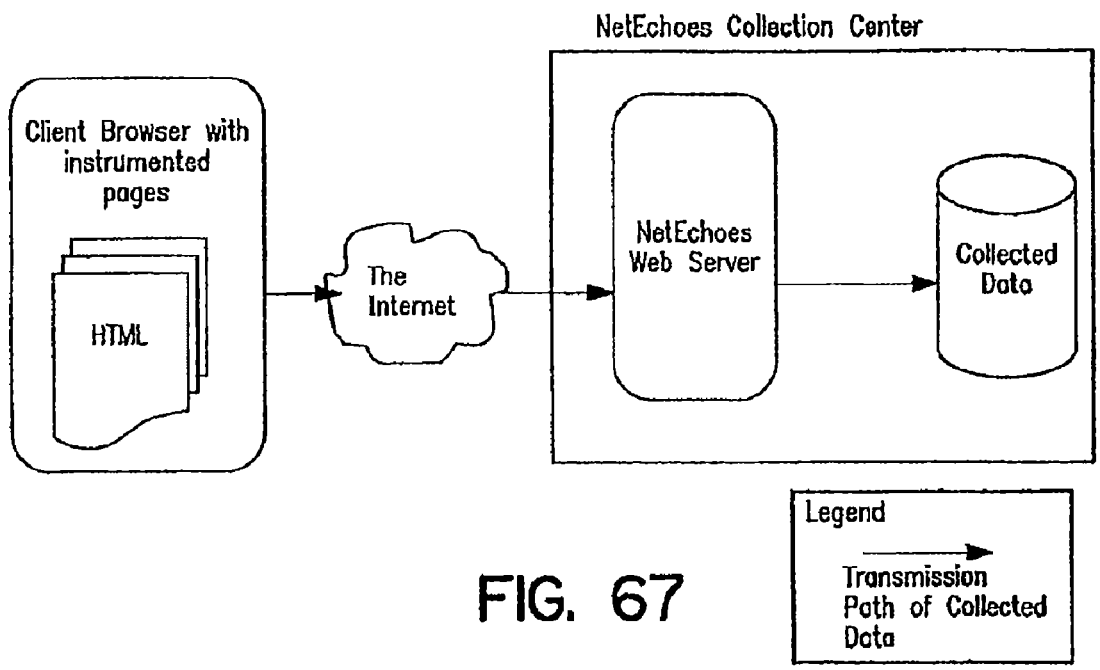
FIG. 67 illustratively represents data transmission from a client browser to a remote server on the internet.

FIG. 67 illustrates the basic problem of data transmission from a client browser to a remote server on the internet. Sending the data requires some creativity. Generally speaking, JavaScript has no network privileges. It cannot simply open a socket connection to the data host on port 80 and transmit the data using the PUT operation of the HTTP protocol. Three indirect means of data transmission have been examined:

Data transmittal using 1×1 pixel image request

Data transmittal with cookies

Data transmittal using hidden form fields

These three alternatives are described below. The most promising of these is the data transmittal by 1×1 pixel image request. This method is currently in use for NetEchoes™

Data Transmittal by 1×1 Pixel Image Request

Generally speaking, a JavaScript operating within an HTML page has very little networking privileges. It cannot arbitrarily send data across the network. In fact, the only networking capabilities available to JavaScript is the ability to request an image from a remote server. A JavaScript fragment illustrating this capability is shown below:

```
...
var picture =    new Image( );      // constructs an image object
//   the following gets the Keylime logo from the remote
//   Keylime web server
picture.src = http://www.keylimesoftware.com/logo.gif";
...
```

The above fragment makes network request of the http server at www.keylimesoftware.com to obtain the image file logo.gif.

Interestingly enough, an inherent capability of URL requests is that they can be accompanied by a parameter specification also known as a "query string" within the URL. The query string is set off in the URL by the use of a '?' character and is of unlimited length. (The details of a URL format can be found in the W3C committee HTTP 1.1 protocol specification.) Therefore, the JavaScript request for an image file can be accompanied by an arbitrary data payload disguised as a query string.

Using this technique, the previous JavaScript fragment used to request an image can be adjusted to deliver a data payload.

```
...
var picture    =    new Image( );        // constructs an image object
var payload   =    "Any payload string you wish to send";
payload   =    escape(payload);      // encode payload string to abide
                                     // by http conventions.
//  The following requests a 1×1 pixel image, but also
//  encodes as part of the request, an arbitrary data
//  payload.
//  Collection.gif is a 1×1 pixel image served up by
//  the stats.klsoft.com web server
picture.src    =
      "http://stats.klsoft.com/Collection.qif" +   "?"   + payload;
...
```

The web server at stats.klsoft.com can be adjusted in a number of ways to record the data payload sent along with the image request. The easiest way is to configure the web server to create logfiles containing the complete text for every URL requested. In this way, the payload data sent as part of the URL will appear in the server log files.

Data Transmittal with Cookies

Cookies are often used to give the illusion of persistence over the connectionless and stateless HTTP protocol. They were originally created to support CGI programming and are implemented as 30 an extension to the HTTP protocol. The data in cookies is automatically transmitted between the browser and the HTTP server without the knowledge of the user.

A cookie consists of a named value, plus four optional properties which control the lifetime, visibility and security of the cookie. The lifetime parameters are defined below:

Expires—Specifies the lifetime of the cookie. By default cookies last for the duration of a web browser session. Setting the Expires property to a future data allows the cookie to be persisted until that time.

Path & Domain—Control the visibility of the cookie. Cookies are automatically transmitted to the servers for which they are deemed visible at the time a connection is made.

Secure—This property specifies how cookies are transmitted over the network. If this property is set the cookie is transmitted only the client connection to the server is secure.

The cookies associated with a particular page are made available to JavaScript through the cookie property of the document object.

Using cookies as a means to transmit data to the server requires that the data be sent in chunks with a size of 4 k bytes or less. The maximum size of a cookie, including the NAME of the cookie, is 4 k. Note also that the visibility of the cookie will have to be adjusted such that the value of the cookie is transmitted when a request is made for any document at the source site.

When the user leaves the site where the instrumented page was encountered, the last block of data must have the Expires property set in order to persist the value of the cookie on the client until the next time the user connects to the source site.

To avoid overflowing the 4 kb limit on cookie size, the instrumentation script could take advantage of compression as well as the use of multiple cookies. The maximum number of cookies that a browser is required to manage is 300, more than enough for the purposes of NetEchoes™.

Data Transmittal with Hidden FORM Fields

Transmittal of monitoring data can also be performed using what is commonly referred to as a hidden FORM. Elements of a FORM defined with <INPUT TYPE=hidden> are not visible to the user. A FORM containing a single hidden element can be used to transmit data to a server without altering the appearance of the HTML page in which it is embedded.

A simple example of a hidden FORM is shown below:

```
<FORM NAME=myform ACTION="/cgi-binJinputdata.pl"
METHOD=GET>
<INPUT TYPE=hidden NAME="mydata">
</FORM>
```

A script may refer to the data item as myform.mydata and set the value to a string containing a compressed stream of monitoring data.

The METHOD tag in the form definition controls whether the data is sent to the server appended to the ACTION URL (GET) or sent in the body of the HTTP request (POST).

Examples are provided blow expressed in HTTP protocol notation.

```
GET http://www.limesoft.com/cgi-bin/inputdata.pl?mydata=<data>
HTTP/1.1
POST http://www.limesoft.com/cgi-bin/inputdata.pl HTTP/1.1
.... [additional header entries here]
  mydata=<data>
```

The hidden FORM approach to data transmission has an advantage over the cookie method in that the instrumenting script has control over when the data is sent. The data may be sent to the server at any time by invoking the submit( ) method of the FORM.

Controlling when data is sent is possibly more important than how. The script embedded in the instrumented page must strive to send monitoring data to the server at a time when the user is not initiating any other server requests otherwise the user has the impression of degraded performance. Ideally the data should be sent during periods of inactivity such as when the user pauses after a document has loaded to view text or images.

Customizing Data Collection

In addition to the standard metrics collected, the instrumentation script can be customized to collect any additional information (visible to JavaScript) for the page view.

Bag Of Tags

In addition to customization of the JavaScript, the basic script itself provides a way for producers to adjust the information delivered by interacting with the script on the page. Simply by setting a property, the client can deliver "free-format" data to the NetEchoes™ server. More specifically, the producer can embed JavaScript like that shown below onto the page:

```
Window.epulse_info= Window.epulse_info + purchaseprice.toString( ) +
    qtyOrdered.toString( );
```

Statements such as these, give the "epulse-info" property values that are transmitted back to the NetEchoes™ server module. The NetEchoes™ server module can then take special, site-appropriate action with this data.

Segmenting Users Based on Behavior

Because the session model for contains all the details of the users segment, the DataMining server can include custom logic for each site that scans user sessions to identify desirable user behavior. Those quality behaviors can then be permanently associated with the user in question. In this way, when the user returns for successive sessions, the user's history (in terms of his quality behavior) can be queried from the DB. There is a variety of use for such information, including incorporation into personalization systems, reports, etc.

Complete NetEchoes™ Instrumentation Script

Appendix A includes the complete Netlichoes™ instrumentation script. Although potentially customized to collect additional data, all other scripts are derived from the basic pattern set forth in Appendix A.

NetEchoes™ Server

The NetEchoes™ server components are independent from both the Producer Web Site and the Browser. They are typically housed in a separate data operations center. The data operations center houses computer hardware that provides the NetEchoes™ server capabilities. NetEchoes™ server components provide a wide variety of capabilities, including serving up the instrumentation script, receiving the collected data, publishing reports showing real-time user activity, etc. However, a significant aspect of the NetEchoes™ server is real-time modeling of user sessions:

Real-Time Modeling of User Sessions

As collected data is received from the Instrumentation Script, it is immediately loaded into the memory of the DataMining server (a NetEchoes™ server sub-component). The purpose of the DataMining server is to take collected page view data and construct an in-memory model of each in progress user-session on the instrumented site. The in-memory model includes all of 3 the relevant information about the session including:

When the session started

The user of the session (based on cookies)

Where was the user feed from, what external site, what email ad, etc.

The pages that have been viewed in the session (in sequence)

The user's experience on each page; e.g. Did he submit a form, press certain links, view certain ads, etc.

Whether or not this user is new or returning user. If returning, what is the user's history.

Information about how a session ends. Did the user click on and external link or ad, or leave the site in some other way.

The information for all active (in-progress) user sessions is kept in-memory for as long as the session is active. However, as the session state changes (new information pours in from the client) the session state is also persisted to a relational data store. In this way, all the information modeled in-memory is also reflected in relational tables. Just as the in-memory session information is updated in real-time, so is the relational database. This is done so that all reporting functionality of the NetEchoes™ server can run reports of the relational database and still reflect real-time producer site statistics.

Handling the session in-memory by active objects enables a variety of capabilities:

The information can be used to give real-time analysis of how the site is being used The information can be taken advantage of by personalization engines to dynamically modify and target the content transmitted.

Although the above application has been described primarily in the context of a system in which client computers are linked to a server computer through a local area network or the internet, one skilled in the art can readily appreciate that the present invention is equally applicable to the monitoring of usage of other types of electronic devices (e.g., cellular phones, personal digital assistants) in wireless and other environments. Thus the application is meant only to be limited by the scope of the appended claims.

What is claimed is:

1. A method for restricting computer usage comprising the steps of:
    receiving at a client computer a monitoring profile which identifies prohibited usage of said client computer from a server computer;
    reviewing said monitoring profile to identify restricted features of an application on said client computer;
    detecting startup of an application program subject to prohibited usage in accordance with said monitoring profile;
    identifying accessible objects associated with the application program;
    when an identified accessible object corresponds to an identified restricted feature, identifying an associated control of the application program and restricting the control so as to be no longer capable of receiving user input, thereby disabling, in accordance with said monitoring profile, at least certain functionality of the application program executing on said client computer.

2. The method of claim 1 further comprising the step of storing said monitoring profiles remote from said client computers, and the step of storing said usage data provided to said server component from each of said client computers.

3. The method of claim 1 further comprising the step of creating each of said monitoring profiles such that each of said monitoring profiles includes a plurality of application profiles, each of said application profiles being associated with one of said associated application programs.

4. The method of claim 1 further comprising the step of associating each user of one or more of said client computers with one of said monitoring profiles.

5. The method of claim 1 further comprising the step of monitoring usage statistics for specified features of said application programs via predefined application programming interfaces of said application programs.

6. A system for restricting computer usage comprising:
a client component installed on a client device, said client component being operative to identify prohibited usage of said client device in accordance with a monitoring profile, to disable at least certain functionality of an application program executing on said client computer, and to generate corresponding usage data, the client component configured to communicate with a remote server component installed on a server device in communication with said client device, to said client device configured to receive said monitoring profile from said server component, said monitoring profile identifying prohibited usage of said client computer, said client computer configured to
  review said monitoring profile to identify restricted features of an application program on said client computer,
  detect startup of an application program subject to prohibited usage in accordance with said monitoring profile,
  identify accessible objects associated with the application program,
  when an identified accessible object corresponds to an identified restricted feature, identifying an associated control of said application program and restricting the identified control so as to be no longer capable of receiving user input,
the client component being further configured to provide said usage data from said client device to said server component.

7. The system of claim 6 further comprising a data management component disposed to store said monitoring profile and to store said usage data provided to said server device.

8. The system of claim 6 wherein said client component includes a client monitoring agent for collecting said usage data in accordance with said monitoring profile and for providing said usage data to said server component, said client component further including a client service for requesting said monitoring profile from said server component and for starting said client monitoring agent upon receipt of said monitoring profile from said server component.

9. The system of claim 6 wherein the client component comprises a hooks dynamic linked library injected into one or more application programs activated by a user.

10. The system of claim 6 wherein the client component comprises an application features dynamic linked library injected into one or more application programs activated by a user.

11. The system of claim 6 wherein said client component includes a usage statistics monitor to monitor specified features of said application programs via predefined application programming interfaces of said application programs.

12. A system for restricting computer usage comprising:
a server component installed on a server device configured for data communication with a remote client device, the server component configured to provide a monitoring profile to a client component operating in conjunction with said client device, said monitoring profile identifying prohibited usage of said client computer and including data and instructions to cause said client component to
  review said monitoring profile to identify restricted features of application programs on said client computer,
  detect startup of an application program subject to prohibited usage in accordance with said monitoring profile,
  identify accessible objects associated with the application program, and
  when an identified accessible object corresponds to an identified restricted feature, identifying an associated control of said application program and restrict the identified control so as to be no longer capable of receiving user input, and
  generate corresponding usage data,
the server component further configured to receive said usage data from said client device.

13. The system of claim 12 further comprising a profile management component for creating said monitoring profile, said monitoring profile including a plurality of application profiles each associated with one of said application programs.

14. The system of claim 12 further comprising a data analysis component for, based upon said usage data, determining usage statistics associated with application programs installed on said client device, wherein said usage statistics include measurements of usage time, number of uses, and sequence of usage of specified one of said application programs.

15. The system of claim 12 further comprising a profile management component for creating and editing said monitoring profile, said monitoring profile specifying which application programs installed on said client device are to be monitored and a frequency with which said usage data is to be reported to said server component.

16. The system of claim 15 wherein said profile management component allows for definition of a set of users of said client device to be monitored in accordance with said monitoring profile.

* * * * *